United States Patent
Oteri et al.

(10) Patent No.: US 11,349,546 B2
(45) Date of Patent: May 31, 2022

(54) METHODS AND SYSTEM FOR MIMO TRANSMISSIONS IN MILLIMETER WAVE WLANS

(71) Applicant: INTERDIGITAL PATENT HOLDINGS, INC., Wilmington, DE (US)

(72) Inventors: Oghenekome Oteri, San Diego, CA (US); Alphan Sahin, Westbury, NY (US); Hanqing Lou, Syosset, NY (US); Li Hsiang Sun, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/621,133

(22) PCT Filed: Jun. 14, 2018

(86) PCT No.: PCT/US2018/037510
§ 371 (c)(1),
(2) Date: Dec. 10, 2019

(87) PCT Pub. No.: WO2018/232101
PCT Pub. Date: Dec. 20, 2018

(65) Prior Publication Data
US 2021/0143887 A1 May 13, 2021

Related U.S. Application Data

(60) Provisional application No. 62/567,348, filed on Oct. 3, 2017, provisional application No. 62/557,573, filed
(Continued)

(51) Int. Cl.
*H04B 7/06* (2006.01)
*H04B 7/0452* (2017.01)
(Continued)

(52) U.S. Cl.
CPC ......... *H04B 7/0695* (2013.01); *H04B 7/0452* (2013.01); *H04B 7/0617* (2013.01);
(Continued)

(58) Field of Classification Search
CPC ...... H04B 7/06; H04B 7/0695; H04B 7/0452; H04B 7/0617; H04B 7/0413;
(Continued)

(56) References Cited

U.S. PATENT DOCUMENTS

| 2015/0289147 A1 | 10/2015 | Lou et al. |
| 2016/0301452 A1 | 10/2016 | Kwon et al. |

(Continued)

FOREIGN PATENT DOCUMENTS

| WO | 2014193475 A1 | 12/2014 |
| WO | 2017/197189 | 11/2017 |

OTHER PUBLICATIONS

Agilent Technologies, "Wireless LAN and 60 GHz—IEEE 802.11ad Explained," pp. 1-28 (May 20, 2013).
(Continued)

*Primary Examiner* — David S Huang
(74) *Attorney, Agent, or Firm* — Volpe Koenig

(57) ABSTRACT

Methods and an apparatus are disclosed for orthogonal frequency division multiplexing (OFDM) and/or single carrier (SC) based multiple input multiple output (MIMO) hybrid beamforming (HBF) including determining the capabilities of a station (STA) such as the capability for hybrid beamforming, single user MIMO (SU-MIMO), and multi user MIMO (MU-MIMO). An announcement frame with a control trailer may be transmitted to signal a transmission configuration. The announcement frame may be a grant frame or a request to send (RTS) frame if the STA is SU-MIMO capable or a RTS frame or a DMG clear to send (CTS)-self frame if the STA is MU-MIMO capable. One or
(Continued)

more directional multi-gigabit (DMG) antennas may be configured based on the announcement frame. One or more sounding symbols may be transmitted and feedback may be provided based on the sounding symbols. An HBF signal may be transmitted based on the sounding symbol(s) and/or feedback.

16 Claims, 38 Drawing Sheets

Related U.S. Application Data on Sep. 12, 2017, provisional application No. 62/519,808, filed on Jun. 14, 2017.

(51) Int. Cl.
*H04W 74/08* (2009.01)
*H04W 84/12* (2009.01)
(52) U.S. Cl.
CPC ...... *H04B 7/0628* (2013.01); *H04W 74/0816* (2013.01); *H04W 84/12* (2013.01)
(58) Field of Classification Search
CPC ... H04B 7/0417; H04B 7/0628; H04W 74/08; H04W 84/12; H04W 74/0816
See application file for complete search history.

(56) References Cited

U.S. PATENT DOCUMENTS

| | | | | |
|---|---|---|---|---|
| 2017/0079031 | A1* | 3/2017 | Maltsev, Jr. | H04B 7/0452 |
| 2017/0127386 | A1* | 5/2017 | Kasher | H04B 7/0413 |
| 2017/0187435 | A1* | 6/2017 | Cariou | H04W 74/0816 |
| 2017/0201992 | A1* | 7/2017 | Cordeiro | H04W 40/244 |
| 2019/0007964 | A1* | 1/2019 | Park | H04W 72/0493 |
| 2019/0068258 | A1 | 2/2019 | Oteri et al. | |
| 2019/0081674 | A1 | 3/2019 | Oteri et al. | |
| 2019/0288763 | A1 | 9/2019 | Oteri et al. | |

OTHER PUBLICATIONS

Alkhateeb et al., "MIMO Precoding and Combining Solutions for Millimeter-Wave Systems," IEEE Communications Magazine, vol. 52, Issue 12 (Dec. 2014).
Chen et al., "MAC and PHY Proposal for 802.11af," IEEE 802.11-10/0258r0 (Mar. 2010).
Draft Standard for Information Technology — Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 7: Enhanced Throughput for Operation in License-Exempt Bands above 45 GHz, IEEE P802.11ay/D1.0 (Nov. 2017).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 4: Enhancements for Very High Throughput for Operation in Bands below 6GHz, IEEE Std. 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) specifications, Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Kasher et al., "PHY CCA and Other CIDs," IEEE 802.11-17/1435r0 (Jun. 8, 2017).
Oteri et al., "Beam Tracking for 802.11ay," IEEE 802.11-17/0040r2 (Jan. 16, 2017).
Oteri et al., "Comment Resolution on CIDs for Hybrid Beamforming (Draft Text for Introduction to HBF)," IEEE 802.11-17/1534r1 (Sep. 9, 2017).
Oteri et al., "Draft Text for Hybrid Beamforming Protocol Design Details," IEEE 802.11-17/1692r1 (Nov. 6, 2017).
Oteri et al., "Hybrid Beamforming for SC and OFDM Transmission in 11ay," IEEE 802.11-17/1533r1 (Sep. 25, 2017).
Oteri et al., "Hybrid Beamforming Protocol Design Details," IEEE 802.11-17/1689r1 (Nov. 6, 2017).
Oteri et al., "Protocols for Hybrid Beamforming in 802.11ay," IEEE 802.11-17/0429r1 (Mar. 12, 2017).
Oteri et al., "Protocols for Hybrid Beamforming in 802.11ay," IEEE 802.11-17/0429r4 (Mar. 12, 2017).
Patil et al., "Proposed resolution for comments related to BSS Color," IEEE 802.11-17/0134r1 (Jan. 16, 2017).
Sun et al., "IEEE 802.11 TGay Use Cases," IEEE 802.11-2015/0625r2 (May 2015).
Third Generation Partnership Project, "Technical Specification Group Radio Access Network; Requirements for further advancements for Evolved Universal Terrestrial Radio Access (E-UTRA) (LTE-Advanced) (Release 14)," 3GPP TR 36.913 V14.0.0 (Mar. 2017).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V14.2.0 (Mar. 2017).
Third Generation Partnership Project, "Technical Specification Group Radio Access Network; Study on Scenarios and Requirements for

(56) References Cited

OTHER PUBLICATIONS

Next Generation Access Technologies; (Release 14)," 3GPP TR 38.913 V14.3.0 (Jun. 2017).

* cited by examiner

FIG. 15

| 1501 | 1502 | 1503 | 1504 | 1505 | 1506 |
|---|---|---|---|---|---|
| L-STF (SC) | L-CEF (SC) | L-Header (SC) | EDMG Header (SC) | EDMG STF (OFDM) | EDMG CEF (OFDM) |

| 1601 | 1602 | 1603 | 1604 | 1605 | 1606 | 1607 |
|---|---|---|---|---|---|---|
| L-STF (SC) | L-CEF (SC) | L-Header (SC) | EDMG Header (SC) | EDMG STF (OFDM) | EDMG CEF (OFDM) | TRN (OFDM) |

| 1701 | 1702 | 1703 | 1704 | 1705 | 1706 | 1707 | 1708 / 1709 |
|---|---|---|---|---|---|---|---|
| L-STF (SC) | L-CEF (SC) | L-Header (SC) | EDMG Header (SC) | EDMG STF (OFDM) | EDMG CEF (OFDM) | PAYLOAD (OFDM) | TRN (OFDM) / TRN (SC) |

Header Indicates the Type of Waveform of TRN

1700

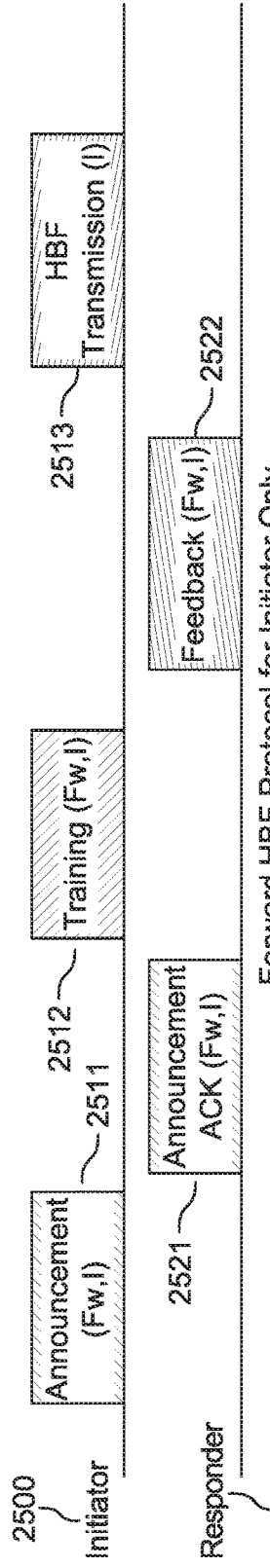
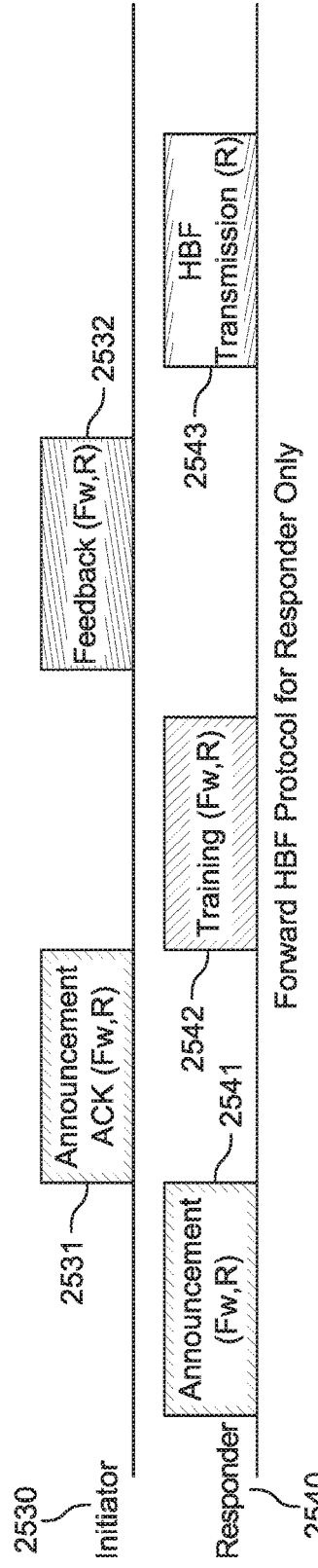
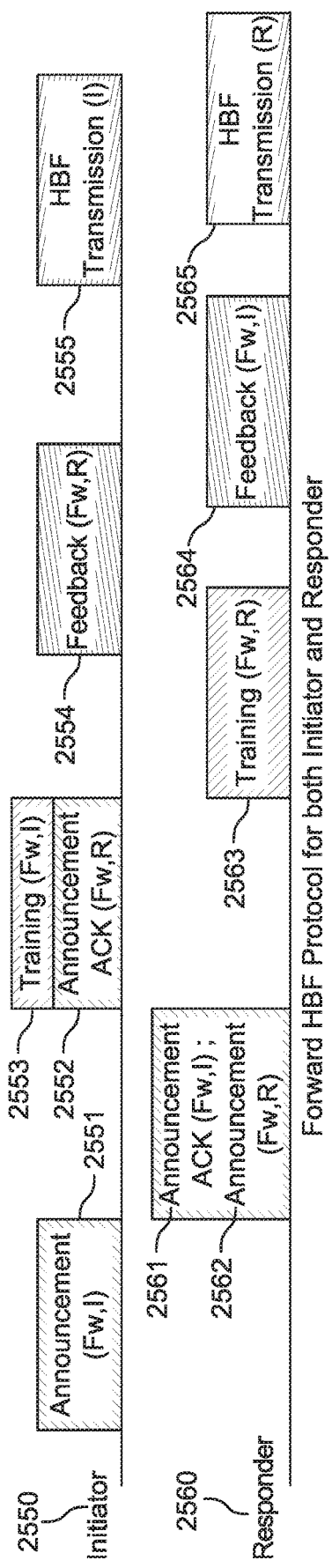
FIG. 25A  Forward HBF Protocol for Initiator Only
FIG. 25B  Forward HBF Protocol for Responder Only
FIG. 25C  Forward HBF Protocol for both Initiator and Responder

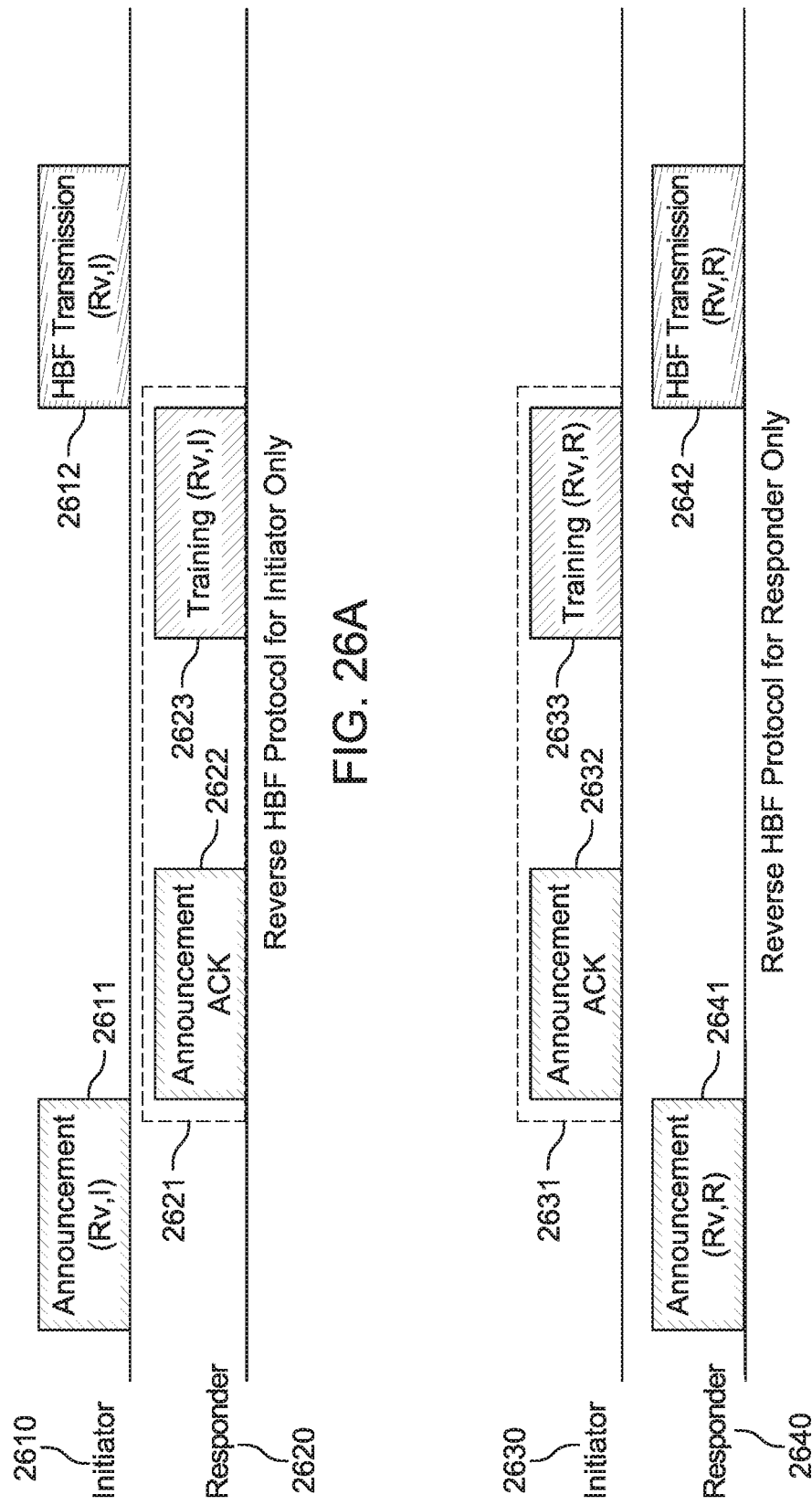

| B0 B4 | B5 | B6 | B7 | B8 | B9 | B10 | B11 | B10-B15 |
|---|---|---|---|---|---|---|---|---|
| Requested BRP SC Blocks | MU-MIMO Supported | SU-MIMO Supported | Grant Required | NoRSS Supported | Hybrid Beamforming Supported | SU MIMO HBF Supported | MU-MIMO HBF Supported | Reserved |
| 5 | 1 | 1 | 1 | 1 | 1 | 1 | 1 | 4 |

FIG. 29

| Field | Bits |
|---|---|
| MU-MIMO No ACK | 1 |
| MU-MIMO Configuration ID | TBD |
| HBF Feedback Carrier Grouping | 4 |
| HBF Compressed Channel Width | 2 |
| HBF Compressed CB Info | 1 |
| HBF Compressed Feedback Type | 1 |
| HBF Compressed Nr Index | 3 |
| HBF Compressed Nc Index | 3 |
| HBF Feedback Number of Taps Present | 2 |
| HBF Feedback Tap Delay Present | 1 |
| HBF Feedback Compression | 1 |
| HBF Information Feedback Type | 1 |
| HBF Information Domain | 1 |
| HBF Protocol Training Type | 2 |
| HBF Protocol Type | 1 |
| HBF Protocol Announcement | 1 |

FIG. 30

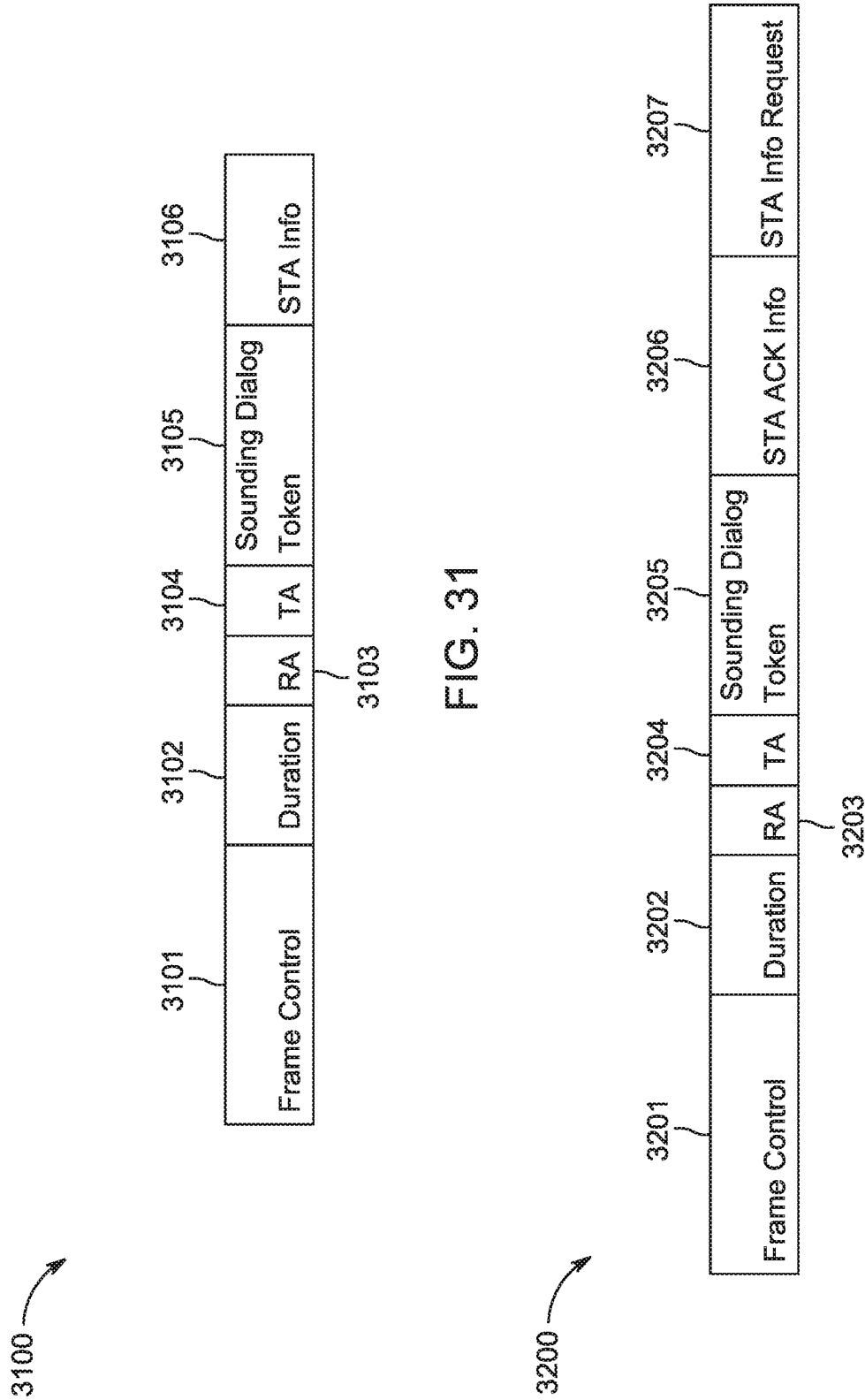

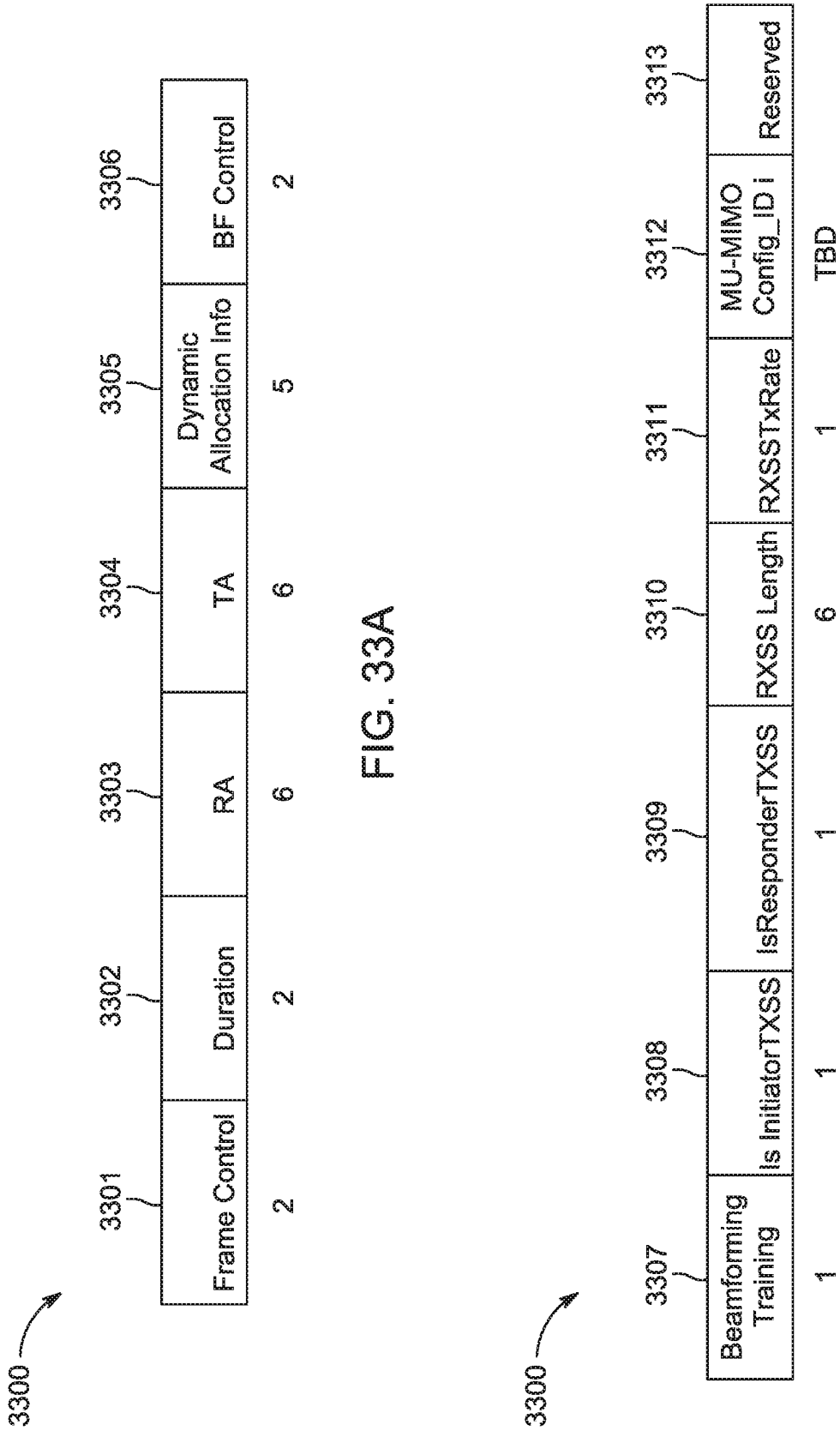

Channel Measurement Feedback Element Format (3510)

| | |
|---|---|
| 3531 — | Element ID |
| 3532 — | Length |
| 3511 — SNR | SNR1 |
| | SNR2 |
| | ... |
| | SN_Nmeas |
| 3513 — Beamforming Feedback Matrix | Channel Measurement Tap 1 |
| | Channel Measurement Tap 2 |
| | ... |
| | Channel Measurement #Ntaps |
| 3515 — Tap Delay | Relative Delay Tap 1 |
| | Relative Delay Tap 2 |
| | ... |
| | Relative Delay Tap #Ntaps |
| 3517 — Sector ID Order | Sector ID 1 |
| | Antenna ID 1 |
| | ... |
| | Sector ID Nmeas/Nbeam |
| | Antenna ID Nmeas/Nbeam |

EDMG Channel Measurement Feedback Element Format (3520)

| | |
|---|---|
| 3533 — | Element ID |
| 3534 — | Length |
| 3535 — | Element ID Extension |
| 3512 — EDMG Sector ID Order | Sector ID$_1$/CDOWN$_1$/AWV Feedback ID$_1$ |
| | TX Antenna ID$_1$ |
| | RX Antenna ID$_1$ |
| | Sector ID$_2$/CDOWN$_2$/AWV Feedback ID$_2$ |
| 3521 — | TX Antenna ID$_2$ |
| 3514 — | RX Antenna ID$_2$ |
| | ... |
| | Sector ID$_{Nmeas}$/CDOWN$_{Nmeas}$/AWV Feedback ID$_{Nmeas}$ |
| 3516 — | TX Antenna ID$_{Nmeas}$ |
| | RX Antenna ID$_{Nmeas}$ |
| 3523 — BRP CDOWN | BRP CDOWN$_1$ |
| | BRP CDOWN$_2$ |
| | ... |
| 3518 — | BRP CDOWN$_{Nmeas}$ |
| 3525 — Tap Delay | Relative Delay Tap #1 |
| | Relative Delay Tap #2 |
| | ... |
| | Relative Delay Tap #Ntaps |

EDMG Precoder Feedback

FIG. 35

| Channel Measurement Feedback Element Format | | |
|---|---|---|
| Element ID | | |
| Length | | |
| SNR | SNR1 | 3711 |
| | SNR2 | |
| | ... | |
| | SN_Nmeas | |
| Precoder/Channel/Beamforming Feedback Matrix | Channel Measurement Subcarrier Index k = scidx(0) | 3712 |
| | Channel Measurement Subcarrier Index k = scidx(1) | 3714 |
| | ... | |
| | Channel Measurement Subcarrier Index k = scidx(last_sc) | 3716 |
| Tap Delay/scidx | scidx(0) | 3715 |
| | scidx(1) | |
| | ... | |
| | scidx(Nsc_idx) | |
| ΔSNR | ΔSNR Stream 1 scidx(0) | 3717 |
| | ... | |
| | ΔSNR Stream Nc scidx(0) | |
| | ... | |
| | ΔSNR Stream 1 scidx(Nsc_idx) | 3718 |
| | ... | |
| | ΔSNR Stream Nc scidx(Nsc_idx) | |
| HBF SC/OFDM Precoder Feedback | | |

METHODS AND SYSTEM FOR MIMO TRANSMISSIONS IN MILLIMETER WAVE WLANS

CROSS REFERENCE TO RELATED APPLICATIONS

This application is the U.S. National Stage, under 35 U.S.C. § 371, of International Application No. PCT/US2018/037510 filed Jun. 14, 2018, which claims the benefit of U.S. Provisional Application Ser. No. 62/519,808 filed Jun. 14, 2017, U.S. Provisional Application Ser. No. 62/557,573 filed Sep. 12, 2017, and U.S. Provisional Application Ser. No. 62/567,348 filed Oct. 3, 2017, the contents of which are hereby incorporated by reference herein.

BACKGROUND

The IEEE Standard for information technology relates to telecommunications and information exchange between systems local and area networks. Wireless LAN (WLAN) Medium Access Control (MAC) and Physical Layer (PHY) specifications may require improvements as new uses and technical abilities are achieved.

Beam refinement is a process where a station (STA) can improve its antenna configuration (or antenna weight vectors) for both transmission and reception.

Precoding at millimeter wave frequencies may be digital, analog or a hybrid of digital and analog. Digital precoding may be precise and can be combined with equalization. Analog beamforming may overcome having a limited number of RF chains by using analog phase shifters on each antenna element. In hybrid beamforming, a precoder may be divided between analog and digital domains.

SUMMARY

Methods and an apparatus for orthogonal frequency division multiplexing (OFDM) and/or single carrier (SC) based multiple input multiple output (MIMO) hybrid beamforming (HBF) including determining the capabilities of a station (STA) such as the capability for hybrid beamforming, single user MIMO (SU-MIMO), and/or multi user MIMO (MU-MIMO). An announcement frame with a control trailer may be transmitted to signal a transmission configuration to be used. The announcement frame may be a grant frame or a request to send (RTS) frame if the STA is SU-MIMO capable or may be a RTS frame or a directional multi-gigabit (DMG) clear to send (CTS)-self frame if the STA is MU-MIMO capable. One or more DMG antennas may be configured based on the announcement frame. One or more sounding symbols may be transmitted and feedback may be provided based on the training symbols. An HBF signal may be transmitted based on the sounding symbol(s) and/or feedback.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 15 is a diagram of an example TRN structure for digital precoding sounding;

FIG. 16 is a diagram of an example TRN structure for digital precoding sounding;

FIG. 17 is a diagram of an example TRN structure for hybrid beamforming sounding;

FIG. 25A is a diagram of an example of forward initiator only HBF protocol frame exchange for SU-MIMO;

FIG. 25B is a diagram of an example forward responder only HBF protocol frame exchange for SU-MIMO;

FIG. 25C is a diagram of an example forward initiator and responder HBF protocol frame exchange for SU-MIMO;

FIG. 26A is a diagram of an example reverse initiator only HBF protocol frame exchange for SU-MIMO;

FIG. 26B is a diagram of an example reverse responder only HBF protocol frame exchange for SU-MIMO;

FIG. 29 is a diagram of an example of beamforming capability fields format;

FIG. 30 is a diagram of an example HBF control field;

FIG. 31 is a diagram of an example HBF frame format;

FIG. 32 is a diagram of an example HBF frame format;

FIG. 33A is a diagram of an example HBF MU-Grant frame format;

FIG. 33B is a diagram of an example HBF MU-Grant frame format;

FIG. 35 is a diagram of an example EDMG Precoder Feedback for PPDU Mode;

FIG. 37 is a diagram of an example HBF Feedback in a frame for SC and OFDM PPDU Modes.

DETAILED DESCRIPTION

Figure 1A:
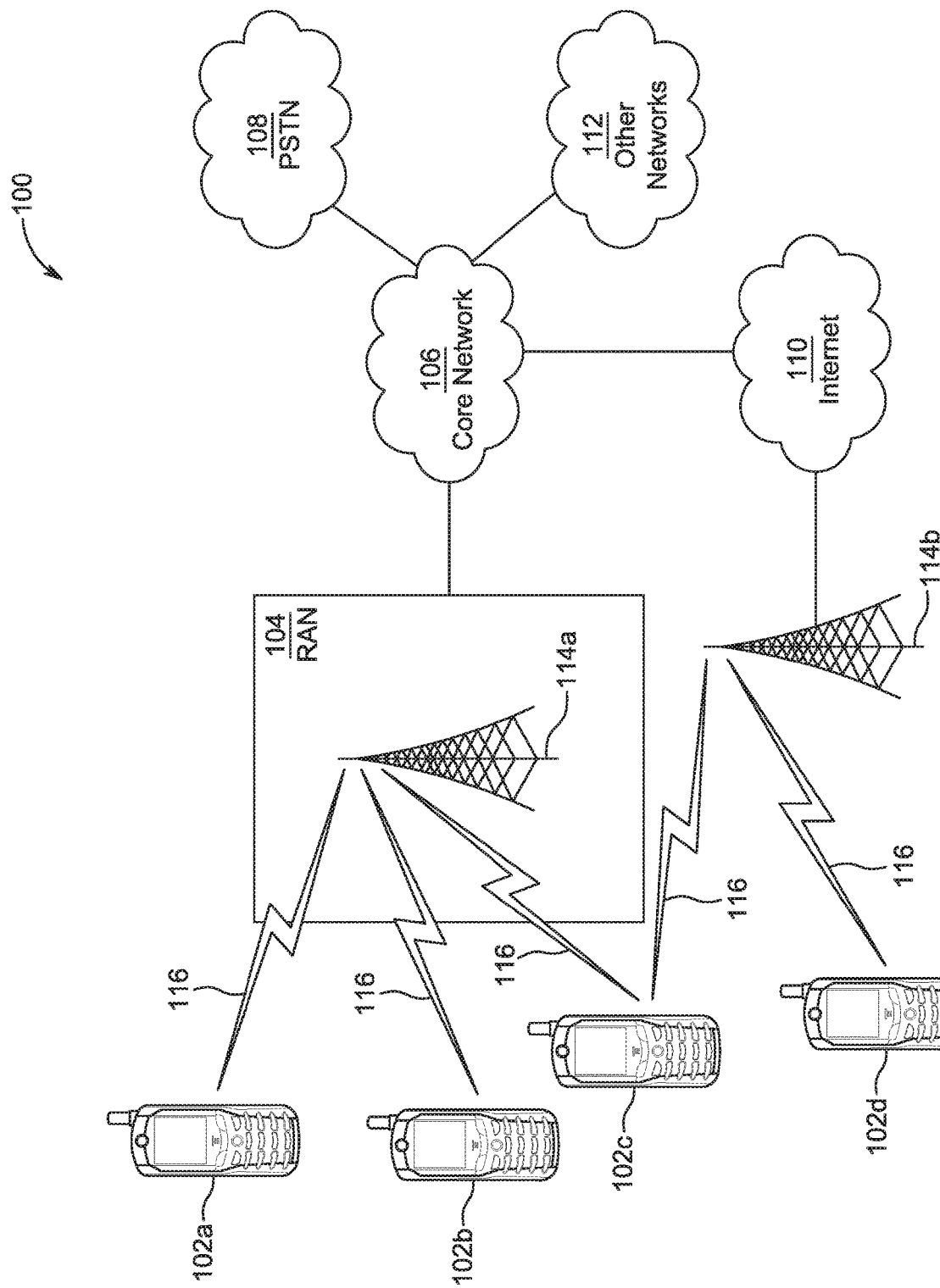
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
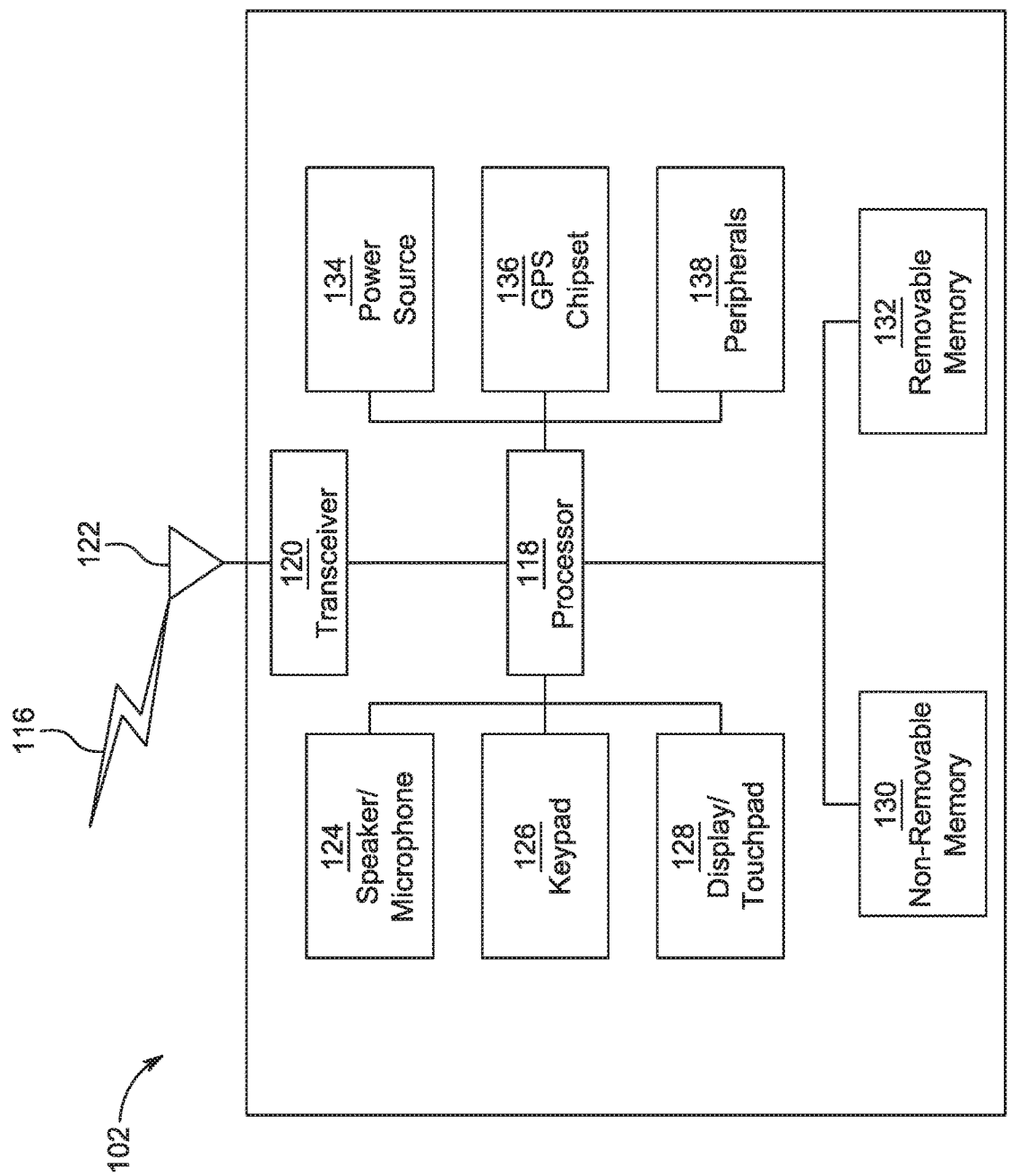
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
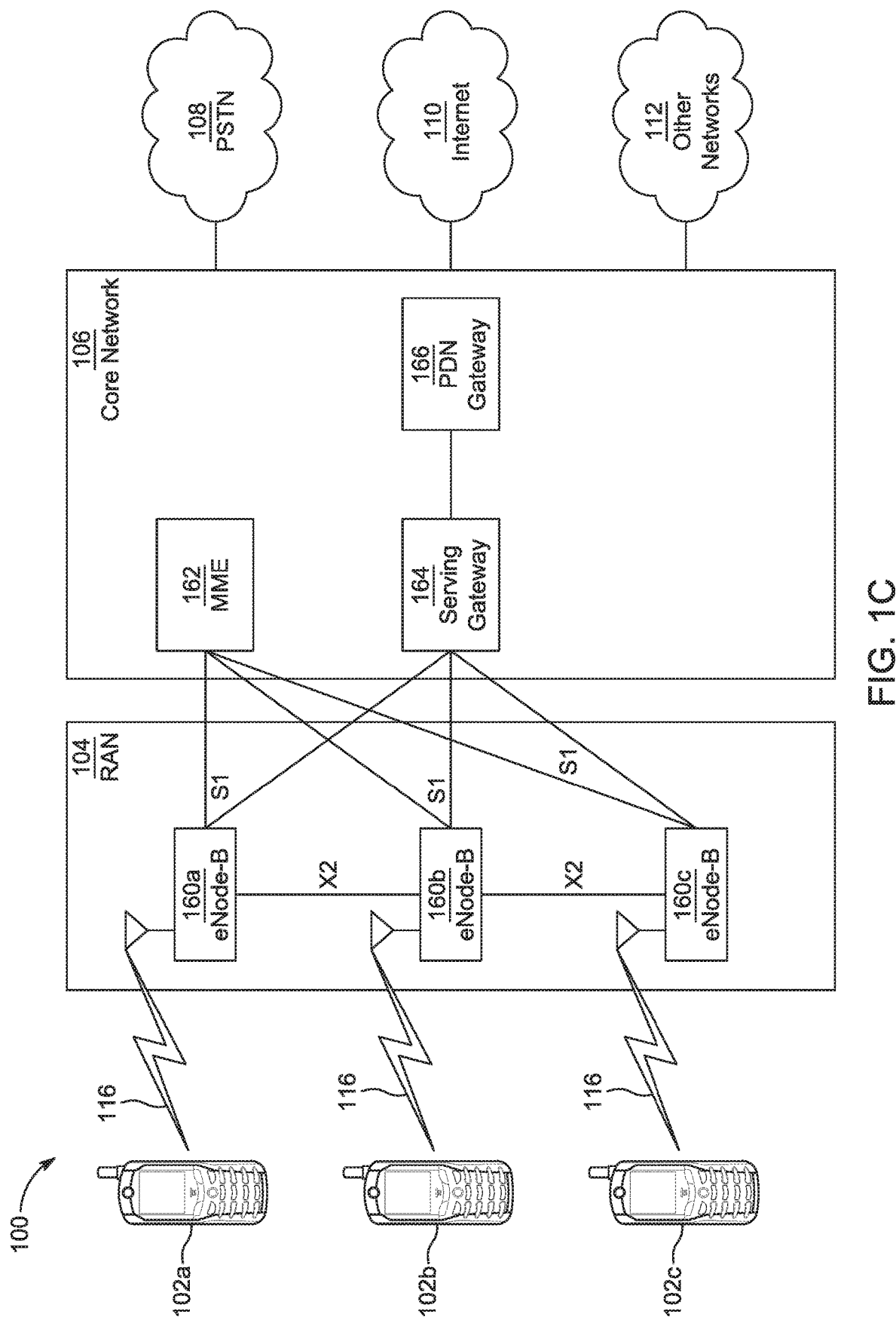
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
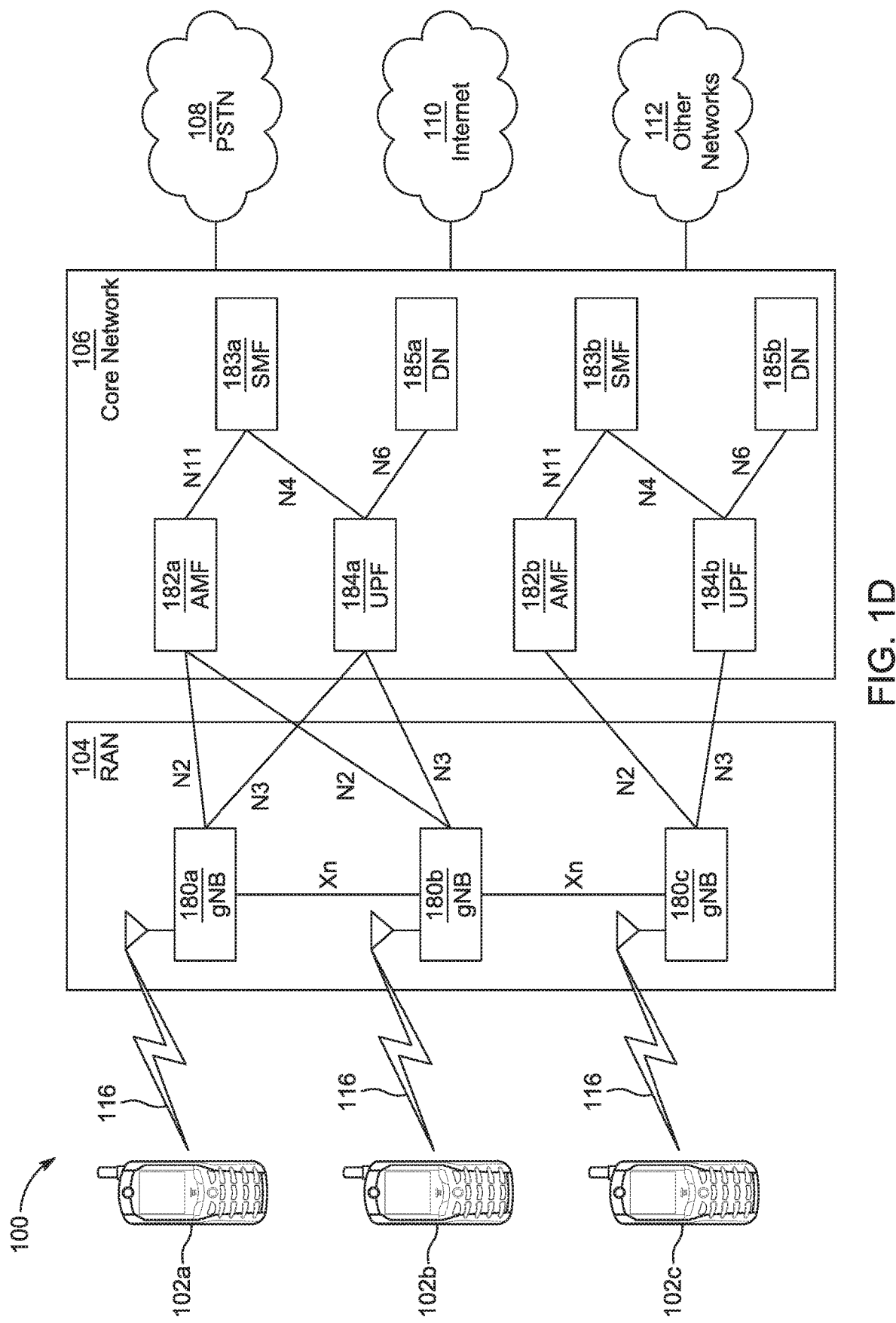
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in infrastructure Basic Service Set (BSS) mode may have an Access Point (AP/PCP) for the BSS and one or more STAs or WTRUs associated with the AP/PCP. The AP/PCP may have access and/or an interface to a Distribution System (DS) or another type of wired/wireless network that carries traffic in and out of the BSS. Traffic to STAs that originates from outside the BSS may arrive through the AP/PCP and is delivered to the STAs. Traffic originating from STAs to destinations outside the BSS may be sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is, in effect, peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode may have no AP/PCP, and/or STAs, communicating directly with each other. This mode of communication is referred to as an "ad-hoc" mode of communication.

Using the 802.11ac infrastructure mode of operation, an AP/PCP may transmit a beacon on a fixed channel, usually the primary channel. This channel may be 20 MHz wide, and may be the operating channel of the BSS. This channel may also be used by the STAs to establish a connection with the AP/PCP. In a given mode of operation, the fundamental channel access mechanism in an 802.11 system is Carrier Sense Multiple Access with Collision Avoidance (CSMA/CA). In this mode of operation, every STA, including the AP/PCP, will sense the primary channel. If the channel is detected to be busy, the STA may back off such that only one STA may transmit at any given time in a given BSS.

In 802.11n, High Throughput (HT) STAs may use a 40 MHz wide channel for communication. This may be achieved by combining a primary 20 MHz channel with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For an 80+80 configuration, the data, after channel encoding, may be passed through a segment parser that divides the channel encoded data into two streams. IFFT and time domain processing may be done on each stream separately. The streams may then be mapped on to the two channels, and the data may be transmitted. At the receiver, this mechanism may be reversed, and the combined data is sent to the MAC.

Sub 1 GHz modes of operation may be supported by 802.11af, and 802.11ah. For these specifications, the channel operating bandwidths and carriers may be reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible application for 802.11ah may be to Meter Type Control (MTC) devices in a macro coverage area. MTC devices may have limited capabilities including only support for limited bandwidths, but may also require a very long battery life.

WLAN systems which support multiple channels and channel widths, such as 802.11n, 802.11ac, 802.11af, and 802.11ah, may include a channel which is designated as the primary channel. The primary channel may have a bandwidth equal to the largest common operating bandwidth supported by all STAs in the BSS. The bandwidth of the primary channel may therefore be limited by the STA, from all operational STAs in a BSS, which supports the smallest bandwidth operating mode. In the example of 802.11ah, the primary channel may be 1 MHz wide if there is an operational STA (e.g. MTC type devices) that only support a 1 MHz mode even if the AP/PCP and other STAs in the BSS may support larger channel bandwidth operating modes. All carrier sensing and network allocation vector (NAV) settings may depend on the status of the primary channel. If the primary channel is busy, for example, due to an STA supporting only a 1 MHz operating mode transmitting to the AP/PCP, then the entire available frequency bands are considered busy even though majority of it stays idle and available.

802.11ac may improve spectral efficiency by using downlink Multi-User MIMO (MU-MIMO) transmission to multiple STA's in the same symbol's time frame, for example, during a downlink OFDM symbol. The potential for the use of downlink MU-MIMO may also be used with 802.11ah. It will be noted that since downlink MU-MIMO, as used in 802.11ac, uses the same symbol timing to multiple STA's, interference of the waveform transmissions to multiple STA's is not an issue. However, all STA's involved in MU-MIMO transmission with the AP/PCP should use the same channel or band, which may limit the operating bandwidth to the smallest channel bandwidth that is supported by the STA's that are included in the MU-MIMO transmission with the AP/PCP.

802.11ad is an amendment to the WLAN standard and specifies the medium access control (MAC) and physical (PHY) layers for VHT implementations in the 60 GHz band. 802.11ad may support data rates up to 7 Gbits/s. 802.11ad may also support three different modulation modes including control PHY with single carrier and spread spectrum, single carrier PHY, and OFDM PHY.

802.11ad may also use 60 GHz unlicensed band, which is available globally. At 60 GHz, the wavelength is 5 mm, which makes compact and antenna or antenna arrays possible. Such an antenna can create narrow RF beams at both transmitter and receiver, which effectively increases the coverage range and reduces the interference.

802.11ad may also support a frame structure that facilitates a mechanism for beamforming sounding such as discovery and tracking. A beamforming sounding protocol may include two components including a sector level sweep (SLS) procedure and a beam refinement protocol (BRP) procedure. The SLS procedure is used for transmit beamforming sounding and the BRP procedure enables receive beamforming sounding and iterative refinement of transmit and receive beams. As used herein, where applicable, the term beamforming may correspond to beamforming sounding.

MIMO transmissions, including both SU-MIMO and MU-MIMO, may not be supported by 802.11ad.

Figure 2:
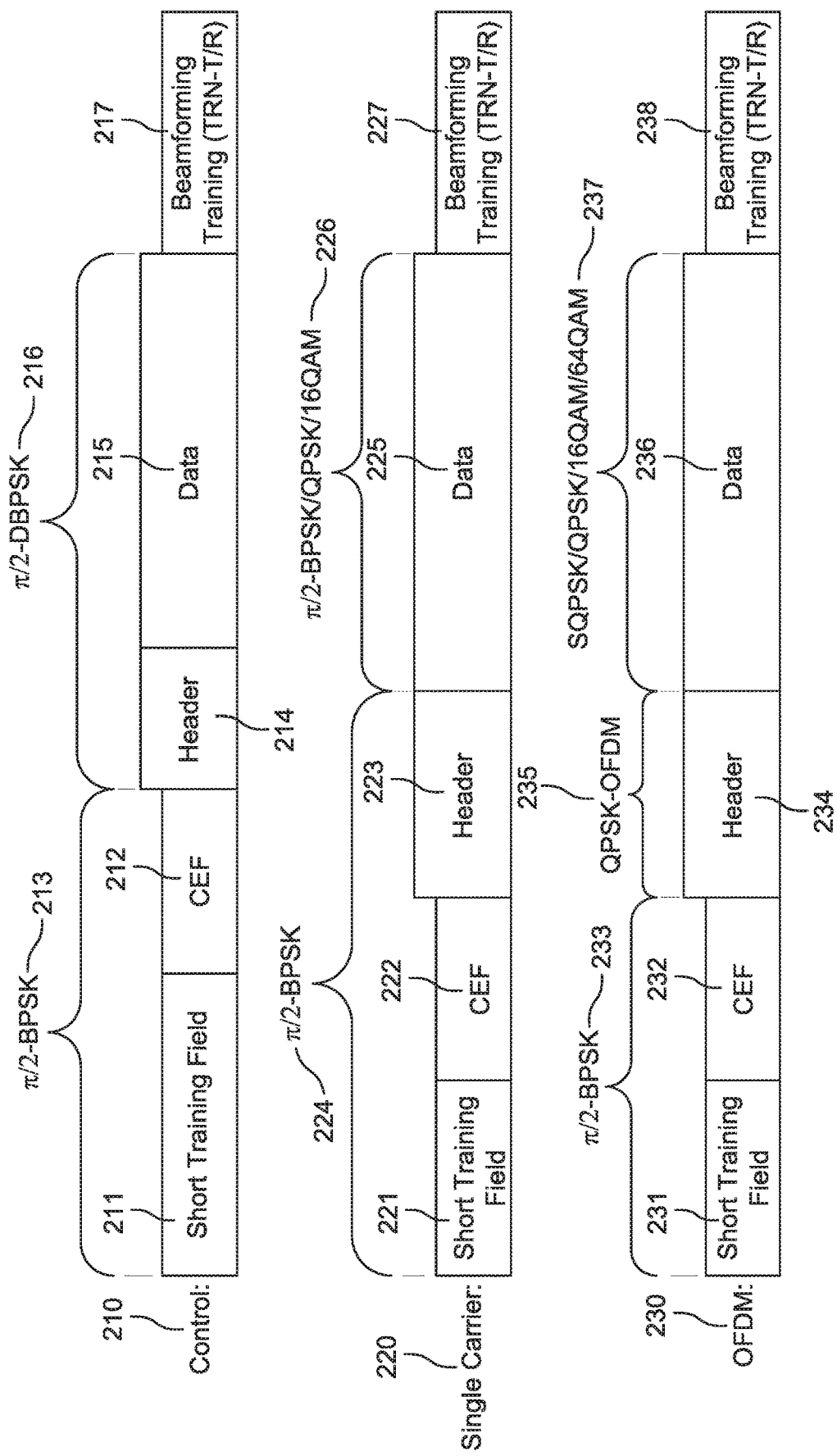
FIG. 2 is a diagram of an example of PPDU formats.

As shown in FIG. 2, 802.11ad may support three physical layer convenience procedure (PLCP) protocol data unit (PPDU) formats including Control PHY 210, Single Carrier (SC) PHY 220, and OFDM PHY PPDUs 230.

Control PHY 210 is defined in 802.11ad as the lowest data rate transmission and may include a short training field (STF) 211 and a channel estimation field (CEF) 212 via a π/2-BPSK 213. As referenced herein, BPSK corresponds to binary phase-shift keying, DBPSK corresponds to a differential BPSK, QPSK corresponds to quadrature phase-shift keying, and QAM corresponds to quadrature amplitude modulation. The Control PHY 210 may also include a header 214 and data 215 via a π/2-DBPSK 216 as well as a beamforming training (TRN-T/R) component 217 when applicable. Frames transmitted before beamforming training may use Control PHY PPDU.

As shown in FIG. 2, single carrier (SC) 220 may include an STF 221, a CEF 222 and a header 223 via a π/2-BPSK 224, a data block 225 via a π/2-BPSK/QPSK/16QAM 226, and beamforming training (TRN-T/R) component 227, when applicable. The orthogonal frequency division multiplexing (OFDM) 230 may include a STF 231 and CEF 232 via a π/2-BPSK 233. The OFDM 230 may also include a header 234 via a QPSK-OFDM, a data block 236 via a SQPSK/QSPK/16QAM/64QAM 231, and beamforming training (TRN-T/R) component 238, when applicable.

Figure 3:
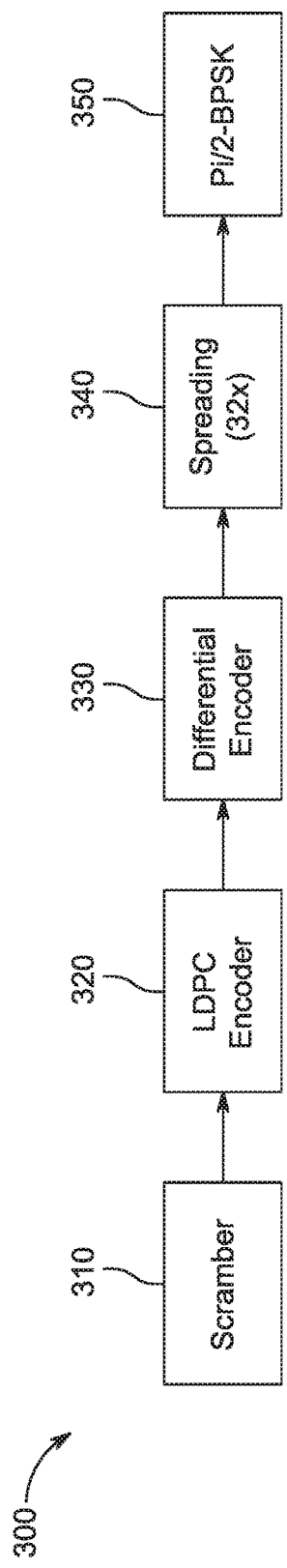
FIG. 3 is diagram of an example of transmission block diagram Control PHY.

A transmission diagram of Control PHY, as applied in 802.11ad, is provided in FIG. 3. As shown, the control PHY PPDU 300 transmission may include a scrambler 310, a Low Density Parity Check (LDPC) Encoder 320, a differential Encoder 330, spreading (e.g., at 32×) 340, and π/2-BPSK modulation 350.

Figure 4:
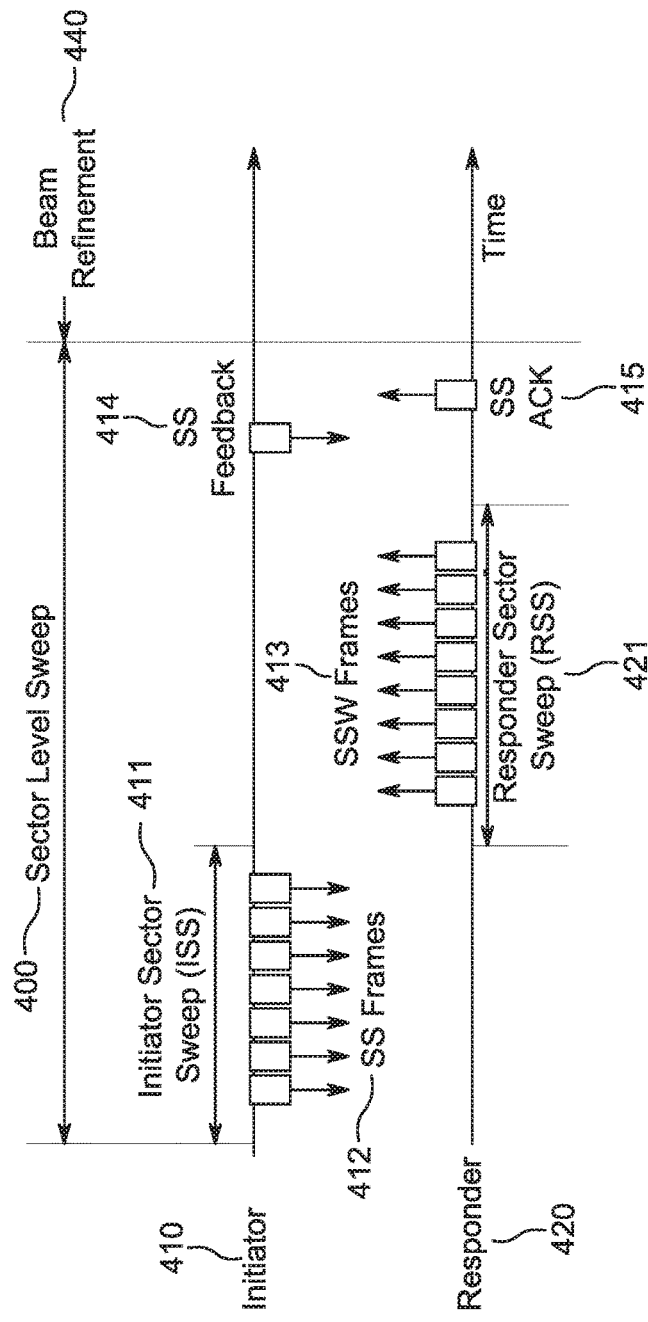
FIG. 4 is a diagram of an example of sector level sweep.

An example sector level sweep (SLS) 400 sounding procedure is shown in FIG. 4. Note that the terms training and sounding are used interchangeably herein. As shown, the SLS 400 may include an initiator 410 conducting an initiator sector sweep (ISS) and transmitting SS frames 412 to a responder 420. The responder 420 may conduct a responder sector sweep (RSS) 421 and transmit SS frames 413 to the initiator 410. The initiator 410 may provide SS feedback 414 and the responder 420 may provide a synchronization signal (SS) acknowledgement 415. A beam refinement process 440 may follow the SLS 400.

Figure 5:
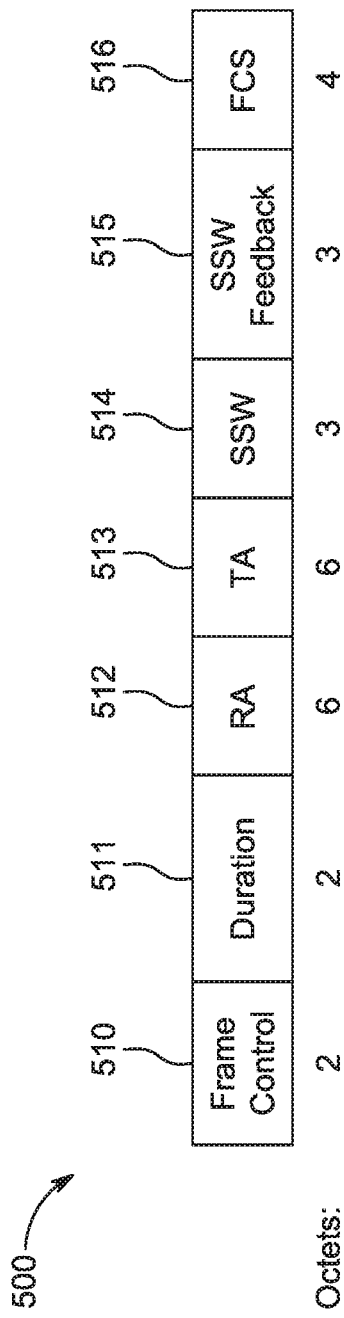
FIG. 5 is a diagram of an example of SSW frame format.

FIG. 5 shows a diagram of an example sector sweep (SSW) frame format 500 when a SSW frame may be transmitted using control PHY. As shown, the SSW frame format 500 may include a frame control 510 for two octets, a duration 511 for two octets, a receiver address (RA) 512 for six octets, a transmitter address (TA) 513 for six octets, SSW frames 514 for three octets, SSW feedback 515 for three octets, and frame check sequence (FCS) 516 for four octets. SLS sounding may be performed using Beacon frames or SSW frames. When Beacon frames are utilized, an AP may repeat the Beacon frame with multiple beams/sectors within each Beacon interval (BI) and multiple STAs may perform beamforming sounding simultaneously. However, based on the size of the beamforming sounding, the AP may not sweep all the sectors/beams within one BI. Thus, an STA may wait multiple BIs to complete ISS sounding, which may cause latency. An SSW frame may be utilized for point-to-point beamforming sounding.

Figure 6:
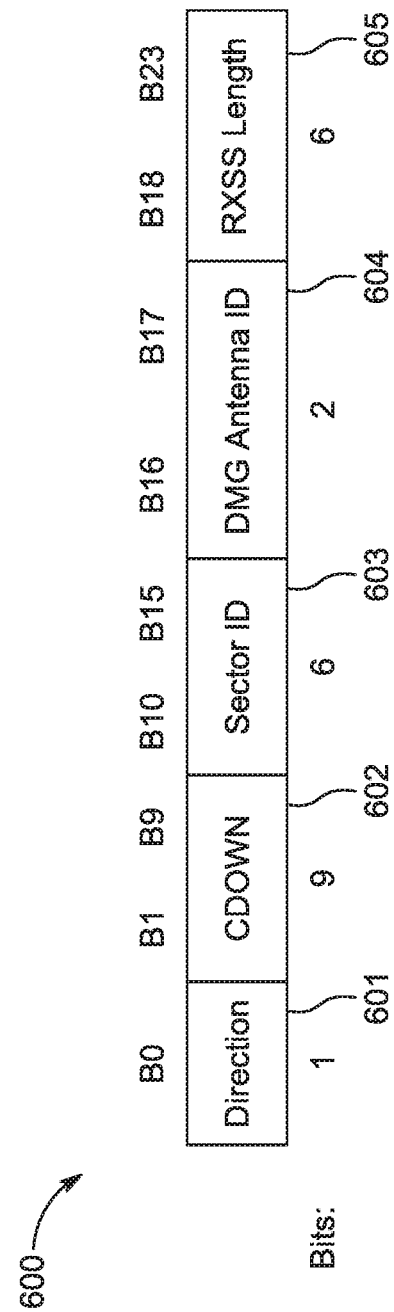
FIG. 6 is a diagram of an example of SSW field format.

FIG. 6 shows a diagram of an example of the SSW field 514 of FIG. 5. As shown, the field may contain 24 bits where the first bit b0 corresponds to the direction 601, the next nine bits correspond to the countdown (CDOWN) 602, the next 6 bits correspond to a sector ID 603, the next two bits correspond to a directional multi-gigabit (DMG) Antenna ID 604, and the last six bits correspond to the receive sector sweep (RXSS) Length 605.

Figure 7A:
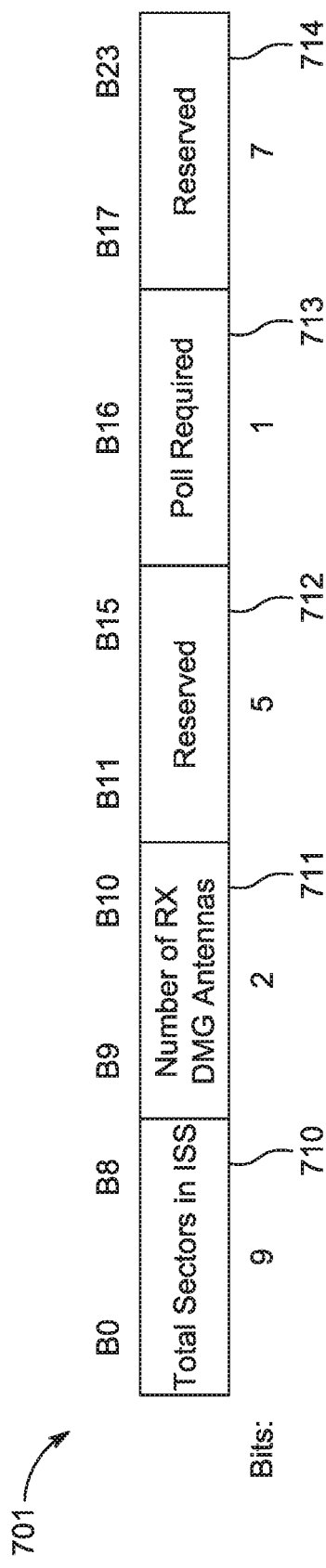
FIG. 7A is a diagram of an example of SSW feedback field format when transmitted as part of an ISS.

FIG. 7A shows a diagram of an example SSW feedback field format when transmitted as a part of ISS 701. As shown, the field may contain 24 bits where the first nine bits correspond to a the total sectors in ISS 710, the next two bits correspond to the number of RX DMG antennas 711, the next five bits are reserved bits 712, the next bit is a poll required bit 713 and the last seven bits are reserved bits 714.

Figure 7B:
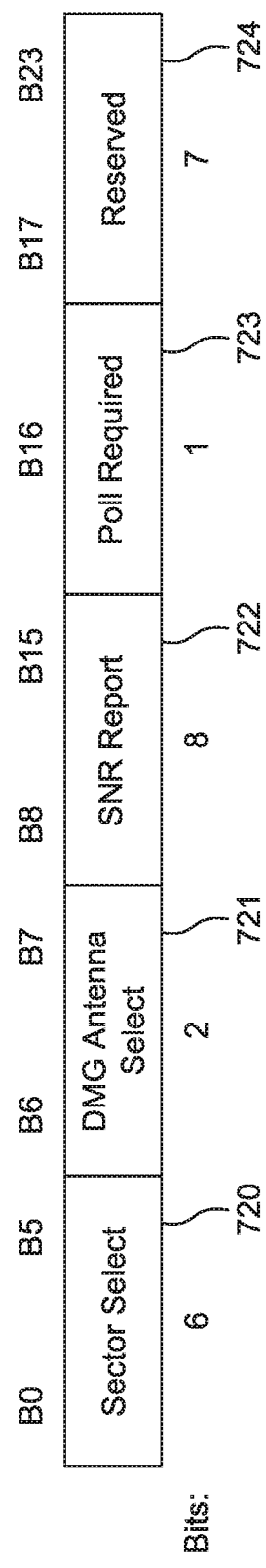
FIG. 7B is a diagram of an example of SSW feedback field format when not transmitted as part of an ISS.

FIG. 7B shows a diagram of an example of SSW feedback field format when not transmitted as part of the ISS 702. As shown, the field may contain 24 bits where the first six bits correspond to a sector select 720, the next two bits correspond to a DMG antenna select 721, the next eight bits correspond to SNR Report bits 722, the next bit is a poll required bit 723 and the last seven bits are reserved bits 724.

Figure 8:
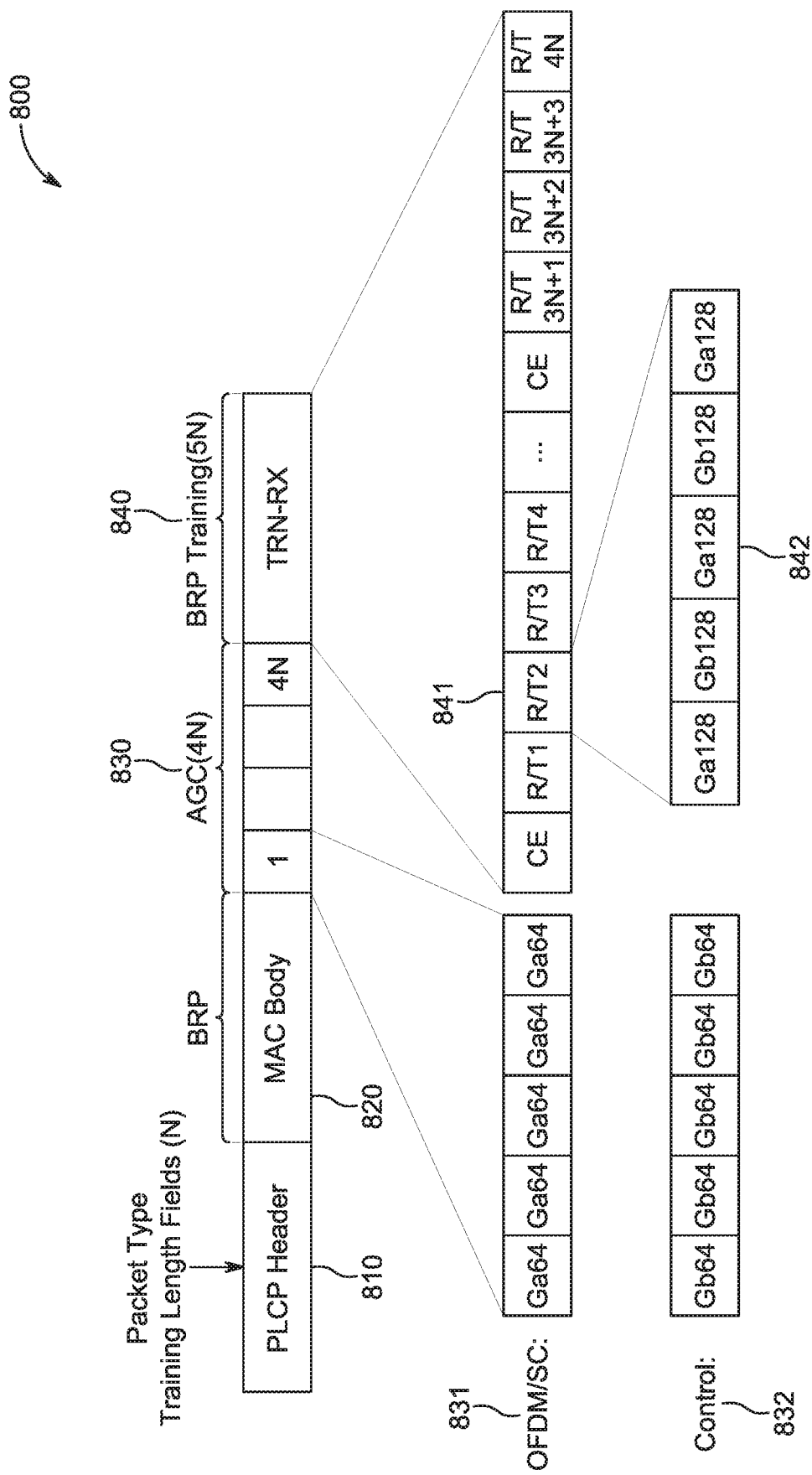
FIG. 8 is a diagram of an example of a BRP TRN-RX packet.

FIG. 8 shows a diagram of an example of beam reinforcement protocol (BRP) TRN-RX packet 800. During beam reinforcement, an STA may improve its antenna configuration, such as its antenna weight vectors, for transmission and reception. During a beam refinement procedure, BRP packets may be used to train the receiver and transmitter antenna. There may be two types of BRP packets: BRP-RX packets and BRP-TX packets. As shown in FIG. 8, a BRP TRN-RX packet may include a PLCP Header 810, a BRP MAC body 820, AGC automatic gain control (AGC) field 830, and BRP sounding (5N) TRN-RX field 840. A BRP packet 800 may be carried by a DMG PPDU followed by a training field containing the AGC field 830 and a transmitter or receiver training field 840, as shown in FIG. 8.

A value of N in FIG. 8 may be a training length given in the PLCP header 810, which indicates that the AGC 830 has 4N subfields and that the TRN-RX field 840 has 5N subfields. The channel estimation (CE) subfield within the subfields 841 of TRN-RX field 840 may be the same as or similar to the CEF 212 of the Control PHY 210 of FIG. 2. All subfields 841 in the BRP TRN-RX field 840 may be transmitted using rotated π/2-BPSK modulation. All subfields 831 and 832 of the AGC 830 may be Gb64 such that the OFDM/SC subfields and Control subfields are all Gb64.

The BRP MAC frame 820 may be an action No ACK frame, which may include one or more of a category field, an unprotected DMG action field, a dialog Token field, a BRP request field, a DMG Beam Refinement element, and/or Channel Measurement Feedback element 1 . . . k fields.

Task Group ay (TGay) may define standardized modifications to both the IEEE 802.11 PHY and MAC and may enable at least one mode of operation capable of supporting a maximum throughput of at least 20 gigabits per second measured at the MAC data service access point, while maintaining or improving the power efficiency per station. The amendment may also define operations for license-exempt bands above 45 GHz while ensuring backward compatibility and coexistence with legacy directional multi-gigabit stations, such as those in the IEEE 802.11ad-2012 amendment, operating in the same band. Such an amendment may achieve higher maximum throughput as well as mobility and outdoor support.

802.11ay may operate in the same band as legacy standards and, accordingly, backward compatibility and coexistence with legacies in the same band may be provided.

Figure 9:
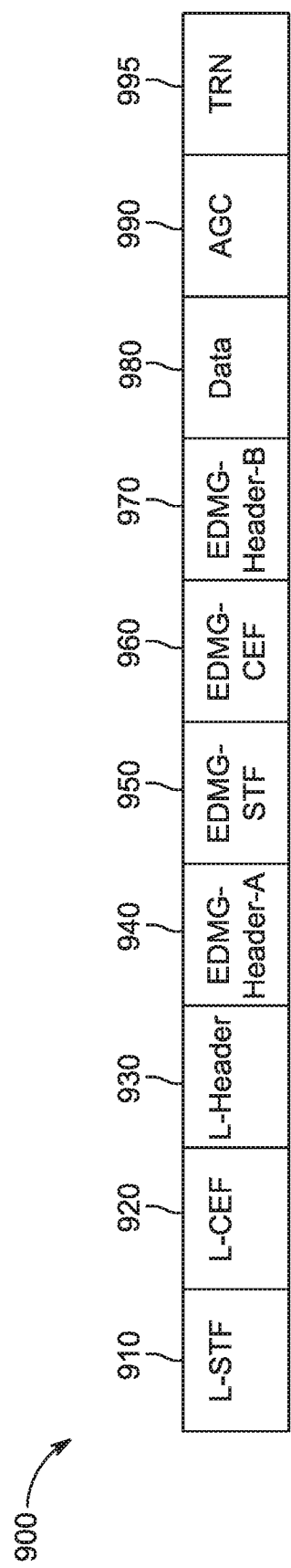
FIG. 9 is a diagram of an example 802.11ay PPDU format.

FIG. 9 shows a diagram of an example of an 802.11ay PPDU format. 802.11ay PPDU may contain a legacy part and an enhanced directional multi-gigabit (EDMG) part. The legacy-short training field (L-STF) 910, legacy-channel estimation field (L-CEF) 920, legacy-header (L-Header) 930, and EDMG-Header-A 940 fields may be transmitted using SC mode for backward compatibility. For a control mode PPDU, the reserved bits 22 and 23 may be both set to an affirmative value, such as 1, to indicate the presence of the EDMG-Header-A field 940. For a SC mode PPDU or an OFDM mode PPDU, the reserved bit 46 may be set to an affirmative value, such as 1, to indicate the presence of the EDMG-Header-A field 940. The 802.11ay PPDU format may also contain an EDMG-CEF field 960, a EDMG Header-B 970, a data field 980, an AGC 990 and a TRN field 995.

Figure 10:
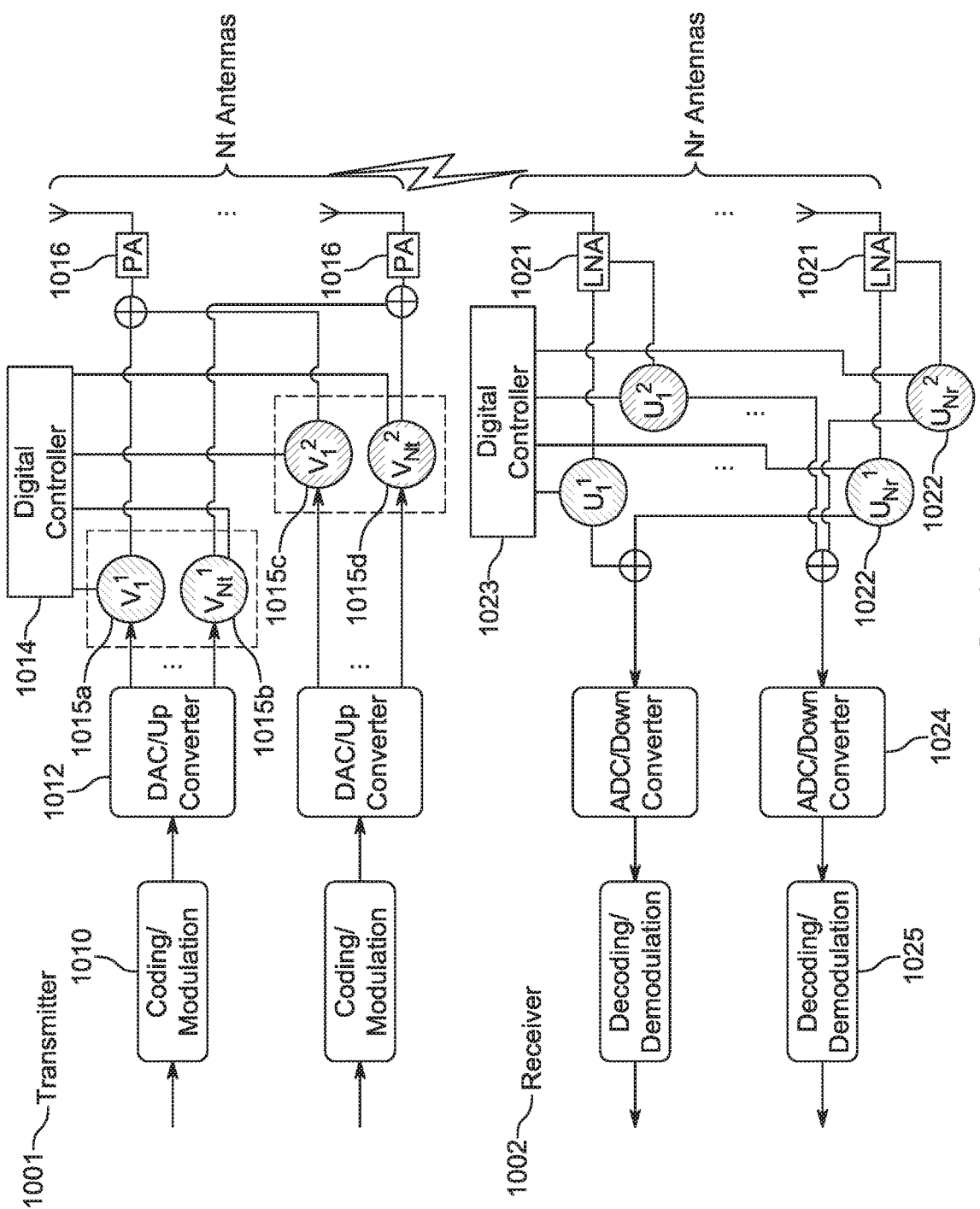
FIG. 10 is a diagram of an example where all PAs excited by all the weights.

802.11ad+/802.11ay may include and/or utilize methods including spatial diversity with beam switching, diversity with a single beam, weighted multipath beamforming sounding, beam division multiple access, single user spatial multiplexing, and/or reduced beamforming sounding overhead. According to an implementation, all physical antennas (PA) may be excited by all the weights, as shown in FIG. 10. According to another implementation, different PAs may be excited by separate weights, as shown in FIG. 11.

As shown in FIG. 10, a signal may be input into transmitter 1001's coding/modulation components 1010. The signal may be converted at the transmitter 1001's digital to analog (DAC)/Up-converters 1012 and may be passed through weights 1015 controlled via a digital controller 1014 such that all the transmit antennas 1016 are excited by all the weights 1015a-1115d. A receiver 1002 may receive the transmitted signal via receive antennas 1021 and the signal may be passed through weights 1022 controlled via a digital controller 1023 and converted via ADC/Down converters 1024 and may be decoded and/or demodulated via decoding/demodulation components 1025.

Figure 11:
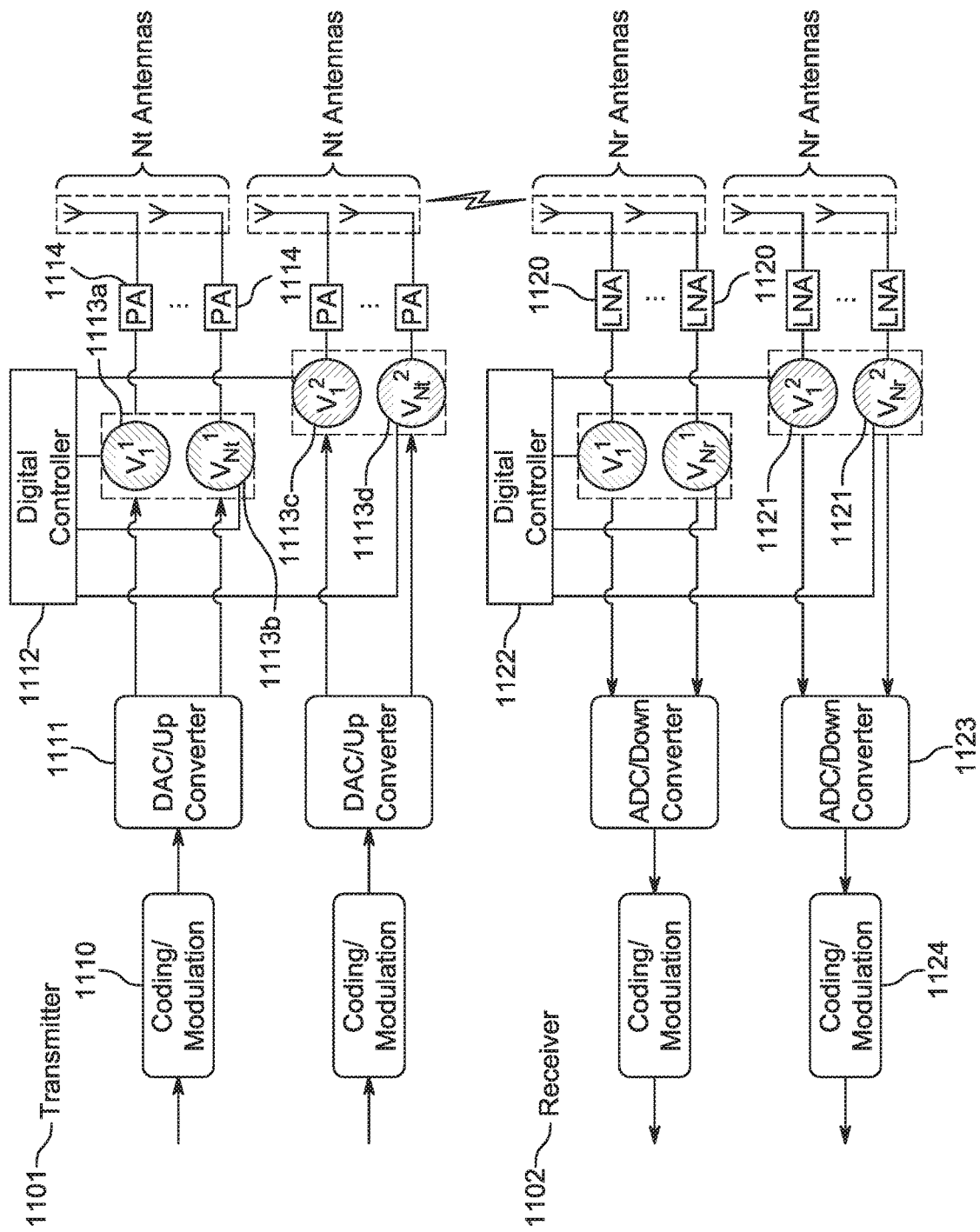
FIG. 11 is a diagram of an example where different PAs excited by separate weights.

As shown in FIG. 11, a signal may be input into transmitter 1101's coding/modulation components 1110. The signal may converted at the transmitter 1101's DAC/Up-converters 1111 and may be passed through weights 1113 controlled via a digital controller 1112 such that all the transmit antennas 1114 may be excited by separate weights 1113a-1113d. A receiver 1102 may receive the transmitted signal via receive antennas 1120 and the signal may be passed through weights 1121 controlled via a digital controller 1122 and converted via ADC/Down converters 1123 and may be decoded and/or demodulated via decoding/demodulation components 1124.

802.11ay may also have EDMG CEF sequences. The EDMG OFDM PHY may use the pairs of $Seq^{iSTS}_{left,N}$ and $Seq^{iSTS}_{right,N}$ sequences, $i_{STS}$=1, 2, . . . , 8, of length N=176 to generate EDMG-CEF fields in frequency domain for single channel. Three DC tones may also be included between left and right sequences. Table 1 below shows an example of EDMG CEF sequences.

TABLE 1

EDMG CEF Sequences

The Sequence $Seq^1_{left, 176}(k)$, to be transmitted from left to right, up to down −1 −j −j +1 +j −j +1 −1 +1 −j −1 +1 −1 +1 −j −1 −1 +j +j +j −1 −1 +1 +j +j −1 −j +j −1 +1 −1 +j +1 +1 −1 +1 −j −1
−1 +j +j +j −1 −1 +j −1 −1 −j +1 −1 −j +j −j −1 +j −j +j −1 +j +j +1 +1 +1 +j +j +j −1 −1 −j +1 −1 −j +j −j −1 +j
+j −j +j +1 −j −1 −1 −1 −j −j +j −1 −1 −j +1 −1 −j +j −j −1 +j −j +j −j −1 +j +j +1 +1 +1 +j +j −j +1 +1 +j −1 +1
+j −j +j +1 −j −j +j −j −1 +j +j +1 +1 +1 +j +j −1 −j −j +1 +j −j +1 −1 +1 −j −1 +1 −1 +j −1 −1 +j +j +j −1 −1 −1
−j −j +1 +j −j +1 −1 −1 +1 −1 +1 −1 +j +1 +1 −j −j −j +1 +1

The Sequence $Seq^2_{left, 176}(k)$, to be transmitted from left to right, up to down +j −1 −1 −j +1 −1 −j +j −j −1 +j +1 −1 +1 −j −1 −1 +j +j +j −1 −1 +j −1 −1 −j +1 −1 −j +j −j −1 +j −1 +1 −1 +j +1
+1 −j −j −j +1 +1 −1 −j −j +1 +j −j +1 −1 +1 −j −1 +j −j +j +1 −j −j −1 −1 −1 −j +1 +j +j −1 −j +j −1 +1 −1 +j +1
+j −j +j +1 −j −1 −1 −1 −j −j +j +j +j −1 −j +1 −1 −1 −j −j +1 +1 +1 +j +j +j −1 +j +j +1 +1 +1 +j +j +j +j −1 −j +j
−1 +1 −1 +j +1 +j −j +j +1 −j −j −1 −1 −1 −j −j +1 +1 +j −1 +1 +1 −j +j +1 −j −1 +1 −1 +j +1 +1 −j −j −j +1 +1 +j
−1 −1 −j +1 −1 −j +j −1 +j −1 +1 −1 +j +1 +1 −j −j −j +1 +1

The Sequence $Seq^3_{left, 176}(k)$, to be transmitted from left to right, up to down −1 −j −j +1 +j −j +1 −1 +1 −j −1 +1 −1 +1 −j −1 −1 +j +j +j −1 −1 −j +1 +1 +j −1 +1 +j −j +j +1 −j +j −j −1 +j
+1 +1 +1 +j +j −1 −j −j +1 +j −j +1 −1 +1 −j −1 +1 −1 +1 −j −1 −1 +j +j −1 +j −1 −1 −j +1 −1 −j +j −j −1 +j
−j +j +1 −j −1 −1 −1 −j −j +j −1 −1 −j +1 −1 +j −j +j −j −1 +j +j +1 +1 +1 +j +j −1 −j −j +1 +j −j +1
−1 +1 −j −1 −1 +1 −1 +j +1 +1 −j −j +1 +1 −j +1 +1 +j −1 +1 +j −j +j +1 +j −j +j +1 −j −1 −1 −1 −j −j −1 −j
−j +1 +j −j +1 −1 +1 −1 +1 −1 +j +1 +1 −j −j −j +1 +1

TABLE 1-continued

EDMG CEF Sequences

The Sequence Seq$^4_{left, 176}$(k), to be transmitted from left to right, up to down −j +1 +1 +j −1 +1 +j −j +j +1 −j −j +j −j −1 +j +j +1 +1 +1 +j +j −j +1 +1 +j −1 +1 +j −j +j +1 −j +j −j +j +1 −j −j −1
−1 −1 −j −j +j −1 −1 +j +1 −1 −j +j −1 +j +j −j +j +1 −j −j −1 −1 −1 −j −j +1 +1 +j −1 +1 +j −j +j +1 −j +j −j
+j +1 −j −j −1 −1 −1 −j −j −1 −j +j +1 +j −1 +1 −1 −j −1 −1 +1 −1 +j +1 +1 −j −j +1 +1 −1 −j +1 +j −j +1
−1 +1 −j −1 +1 −1 +1 −j −1 −1 +j +j +j −1 −1 −1 −j −j +1 +j −j +1 −1 +1 −j −1 −1 +1 −1 +j +1 +1 −j −j +1 +1 +1
+j +j −1 −j +j −1 +1 −1 +j +1 −1 +1 +1 −j −j +1 +1

The Sequence Seq$^5_{left, 176}$(k), to be transmitted from left to right, up to down −1 −j −j +1 +j −j +1 −1 +1 −j −1 +1 −1 +1 −j −1 −1 +j +j +j −1 −1 +j −1 −1 −j +1 −1 −j +1 +j −j +1 +j −j +j +1 −j −j
−1 −1 −1 −j +j +j −1 +j +1 −j +j −1 +1 −1 +1 +j −1 −1 +j +1 +1 −1 +1 +j −1 −1 −1 −j +j +1 +1 +j −1 +1 +j −j +j +1 −j +j
−j +j +1 −j −j −1 −1 −1 −j −j +j −1 −1 −j +1 −1 −j +j −j −1 +j −j +j −1 +j +j +1 +1 +1 +j +j +1 +j +j −1 −j +j −1
+1 −1 +j +1 +1 −1 +1 −j −1 −1 +j +j −j −1 +j −1 −1 −j +1 −1 −j +j −1 +j +j −j −1 +j +j +1 +1 +j +j −1 −j
−j +1 +j −j +1 −1 +j −1 −1 +1 −1 +j +1 +1 −j −j −j +1 +1

The Sequence Seq$^6_{left, 176}$(k), to be transmitted from left to right, up to down −1 −j −j +1 +j −j +1 −1 +1 −j −1 −1 +1 −1 +j +1 +1 −j −j +1 +j −1 −1 −j +1 −1 −j −j +j −j +1 −j −j +j −1 +j +j
+1 +1 +1 +j +j −1 −j +1 +j −j +1 −1 +1 −j −1 −1 +1 −1 +j +1 +1 −j −j +1 −j +1 +1 +j −1 +1 +j −j +j +1 −j +j
−j +j +1 −j −j −1 −1 −1 −j −j +j −1 −1 −j +1 −1 −j +j −j −1 +j −j +j +1 −j −1 −1 −1 −j +j +1 +j −1 −j +j
−1 +1 −1 +j +1 −1 +1 −1 +j +1 −j −j −j +1 −1 +1 +1 +j −1 +1 +j −j +j −1 −j +j −j −1 +j +j +1 +1 +1 +j +j +1 +j
+j −1 −j +j −1 +1 −1 +j +1 −1 +1 +1 −j −j +1 +1

The Sequence Seq$^7_{left, 176}$(k), to be transmitted from left to right, up to down −1 −j −j +1 +j −j +1 −1 +1 −j −1 +j −j −1 +j +j +1 +1 +1 +j +j −j +1 +1 +j −1 +1 +j −j +j +1 −j +1 −1 +j +1
+1 −j −j −j +1 −j −1 +j +1 +1 +j −1 +1 +j −j +j +1 −j −1 −1 −1 −j +j +j −1 −1 −1 −j −j +1 +j −j +j +1 −1 +1 −j −1
+j −j +j +1 −j −j −1 −1 −1 −j +j +j −1 −1 −j +1 −1 −j +j −j −1 +j −1 −j +1 −1 +j +1 −1 −j +1 +1 −1 −j +1 +j −j
+1 −1 +1 −j +1 −j +j +1 +j +j −1 −j +1 −1 −1 −j +1 +j +j −1 −j +j −1 +1 −1 +j +1 +j −j +j +1 −j −1 −1 −1 −j −j
+1 +1 +j −1 +1 +j +j −j −1 +1 +1 −1 +1 +1 −j −j +1 +1

The Sequence Seq$^8_{left, 176}$(k), to be transmitted from left to right, up to down +1 +j +j −1 −j +j −1 +1 +j +1 −1 +1 −1 +j +1 +1 −j −j +j +1 +1 +j −1 −j +j −1 +1 −1 +j +1 +1 −1 +1 −j −1
−1 +j +j +j −1 −j +1 +1 +j +1 −1 +j +1 −j +j +1 −j −j +j −1 −j −j −1 −1 −1 −j +j −1 −1 −j +1 −1 −j +j −j −1 +j
+j −j +j +1 −j −j −1 −1 −1 −j −j +1 +1 +j −1 +1 +j −j +j +1 −j −j +j +1 −j −1 −1 −1 −j −j −j +1 +1 +j −1 +1
+j −j +j +1 −j −j +j −j −1 +j +j +1 +1 +1 +j +j −1 −j +j +1 −1 +j +1 −1 +1 −j +1 +1 −j +j +1 −j −j +j +1 +1
−1 −j −j +1 +j −j +1 −1 +1 −1 +j +1 +1 −j −j +j +1 +1

The Sequence Seq$^1_{right, 176}$(k), to be transmitted from left to right, up to down −1 −j −j +1 +j −j +1 −1 +1 −j −1 −1 +1 −1 −1 +j +j −j −1 +1 +j +j −1 +j −1 −1 +1 −1 +j +1 +1 −1 +j −1 −j −1
−1 +j +j +j −1 +j −1 −1 −j +1 −1 +j −j −1 +j +j −j −1 +j +j +1 +1 +j +j −1 −1 −j +1 −1 −j +j −j −1 +j
+j −j +j +1 −j −j −1 −1 −1 −j −j +1 +1 +j −1 +1 +j −j +j +1 −j −1 −1 −1 −j −j +j −1 −1 −j +1 −1 −j +1 −1
−j +j −j −1 +j −j +j +1 −j −j −1 −1 −1 −j +j +j −1 −j +j −1 −1 +j −1 +1 −j −j +j +1 −1 +j −j −j +1 +1 +1
+j +j −1 −j +j −1 +1 −1 +j +1 −1 +1 −1 +j +j −1 −1

The Sequence Seq$^2_{right, 176}$(k), to be transmitted from left to right, up to down +j −1 −1 −j +1 −1 +j −j −1 +j +1 −1 +1 −j −1 −1 +j +j +j −1 −1 +j −1 −1 −j +1 −j +j −j −1 +j −1 +1 −1 +j +1
+1 −j −j −j +1 +1 −1 −j +j +1 −1 −1 +1 −j −j −j +1 −j −j −1 −1 −1 −j +j +1 −1 +j −1 +1 −1 +j +1
+j −j +j +1 −j −j −1 −1 −1 −j −j −1 −j +j +1 −1 +1 −j −1 −j +j −1 −1 −j +1 −j −j +1 −j +1 +j
−j +1 −1 −1 −1 −j +j −j −1 +j +j +1 +1 +1 +j +j −1 −1 −j +j −1 +j +1 +1 +j −1 +1 −1 −j +1 −1 −1 +j +j +j −1
−1 −j +1 +1 +j −1 +1 +j −j +j +1 −j +1 −1 −1 +j +j +j −1 −1

The Sequence Seq$^3_{right, 176}$(k), to be transmitted from left to right, up to down −1 −j −j +1 +j −j +1 −1 +1 −1 +1 −j −1 −1 +j +j −1 −1 +j +1 +1 +j −1 +j −1 +j +1 −j +j −j −1 +j +j
+1 +1 +1 +j +j −1 −j +1 +j −j +1 −1 +1 −1 −1 +1 −1 −j −1 −1 +j +j −1 +j +1 −1 −1 −j +1 −j +j −j −1 +j
−j +j +1 −j −j −1 −1 −1 −j −j +j +1 +j −1 +1 +j −j +j +1 −j −j +j +1 −j −1 −1 −1 −j +j −1 −j +j −1 −j +j −1
+1 −1 +j +1 +1 −1 +1 −j −1 −1 +j +j −j −1 +j −1 −1 −j +1 −1 +j −1 −1 −j +1 −1 +j −j +j −1 +j +j +1 +1 +j +j +1 +j
+j −1 −j −j +1 +j +1 +1 −1 −1 −j −1 −1 +j +j +j −1 −1

The Sequence Seq$^4_{right, 176}$(k), to be transmitted from left to right, up to down −j +1 +1 +j −1 +1 +j −j +j +1 −j +j −j −1 +j +j +1 +1 +1 +j +j −1 +1 +j −1 +1 +j −j +j +1 −j +j −j +j +1 −j −j −1
−1 −1 −j +j −1 −1 −j +1 −1 +j −j −1 +j +j −j +1 −j −j −1 −1 −1 −j −j +1 +1 +j −1 +1 +j −j +j +1 −j +j −j
+j +1 −j −j −1 −1 −1 −j +1 +j +j −j +j +1 −1 −1 +j +j +1 −1 −1 +j +1 +j −j +1 −1 +1 +j −j −j −1 +1
−1 +1 −1 +1 −1 +1 −j −j −j −1 +j +j +1 +1 +j +j +1 −1 +j +1 +1 +j +j −j −1 −1 +j −j −1 −1 −1 −j
−j +1 +j −j +1 +1 −1 −1 +1 −j −1 −1 +j +j +j −1 −1

The Sequence Seq$^5_{right, 176}$(k), to be transmitted from left to right, up to down −1 −j −j +1 +j −j +1 −1 +1 −j −1 −1 +1 −1 −1 +j +j −j +1 −j −1 −1 +j −1 +j −j +j −1 −j −j +1 +j +1 −j
−1 −1 −1 −j +j +j −1 +j +j +1 −1 +1 −1 +1 −1 −j +1 +j −1 +1 −1 +j +1 +1 −j −1 +1 −j +j −j −1 +j
−j +j +1 −j −j −1 −1 −1 −j −j +1 +j −1 +1 +j −1 −j +j +1 −j −j +j −1 −1 −1 +j +j −j −1 +j −1 +j +j −j +j +1
−1 +1 −j −1 −1 +1 −1 +j +1 +1 −j −j −j +1 −1 +1 +j −j +j +1 −j −j +1 +j −1 +1 +j +j +j −j +j +1 −j −j −1 −1 −j +j
+j −1 −j +j −1 +1 −1 +j +1 −1 +1 −1 +j +j +j −1 −1

The Sequence Seq$^6_{right, 176}$(k), to be transmitted from left to right, up to down −1 −j −j +1 +j +j −1 +1 −j −1 −1 +1 −1 +j +1 +1 −j −j +j +1 −1 −j +1 −1 −j +1 +j −j +j −j −1 +j +j
+1 +1 +1 +j +j −1 −j +1 +j −j −1 +1 −1 +1 −1 −j +1 +1 +1 −j +1 +1 +1 +j −1 +1 +j −j +j +1 −j +j
−j +j +1 −j −j −1 −1 −1 −j −j +1 +j −1 +1 +j −j +j +1 −j +j +1 +1 +1 +j +j −1 −j +1 −j +j +1
−1 +1 −j −1 −1 +1 −1 +j +1 −j −j −j +1 −1 +1 +j −1 +1 +j −j +j −1 +j +j −1 −j −j +j +1 −1 +j +j +j +1 −j −j −1
−j −j +1 +j −j +1 −1 +1 −1 +1 −1 −1 +j +j +j −1 −1

TABLE 1-continued

EDMG CEF Sequences

The Sequence $\text{Seq}^7_{right, 176}(k)$, to be transmitted from left to right, up to down −1 −j −j +1 +j −j +1 −1 +1 −j −1 −j +j −j −1 +j +j +1 +1 +1 +j +j −j +1 +1 +j −1 +1 +j −j +j +1 −j −1 +1 −1 +j +1
+1 −j −j −j +1 +1 −j +1 +1 +j −1 +1 +j −j +j +1 −j +1 −1 +1 −j −1 −1 +j +j +j −1 −1 −1 −j −j +1 +j −j +1 −1 +1 −j −1
+j −j +j +1 −j −j −1 −1 −1 −j −j −j +1 +1 +j −1 +1 +j −j +j +1 −j +1 −1 +1 −j −1 −1 +j +j +j −1 −1 +1 +j +j −1 −j +j
−1 +1 −1 +j +1 −j +j −j −1 +j +j +1 +1 +1 +j +j −1 −j −j +1 +j −j +1 −1 +1 −j −1 −j +j −j −1 +j +j +1 +1 +1 +j +j −1
−1 −j +1 −1 −j +j −j −1 +1 −1 +1 −j −1 −1 +j +j +j −1 −1

The Sequence $\text{Seq}^8_{right, 176}(k)$, to be transmitted from left to right, up to down +1 +j +j −1 −j +j −1 +1 −1 +1 +1 −1 +j +1 +1 −j −j −j +1 +1 +1 +j +j −1 −j +j −1 +1 −1 +j +1 +1 −1 +1 −j −1
−1 +j +j +j −1 −1 −j +1 +1 +j −1 +1 +j −j +j +1 −j +j −j +j +1 −j −j −1 −1 −1 −j +j −1 −1 −j +1 −1 −j +j −j −1 +j
+j −j +j +1 −j −j −1 −1 −1 −j −j +j −1 −1 −j +1 −1 −j +j −j −1 +j −j +j −1 +j +j +1 +1 +1 +j +j +j −1 −1 −j +1 −1
−j +j −j −1 +j +j −j +j +1 −j −j −1 −1 −1 −j −j −1 −j −j +1 +j −j +1 −1 +1 −j −1 +1 −1 +1 −j −1 −1 +j +j +j −1 −1
+1 +j +j −1 −j +j −1 +1 −1 +j +1 +1 −1 +1 −j −1 −1 +j +j +j −1 −1

Millimeter wave (mmWave) precoding may be utilized in next generation wireless networks (e.g., WLAN) and cellular systems. Precoding at mmWave frequencies may be digital such that, for example, an appropriate spatial mapping matrix may be used, analog such as, for example, by setting appropriate Analog Weight Vectors, AWVs, for the DMG antennas, or a hybrid of digital and analog such as, for example, by setting a combination of AWVs and spatial mapping matrices.

Digital precoding may be precise, may be combined with equalization and may enable single user (SU), multi-user (MU), and multi-cell precoding. Digital precoding may be used in sub 6 GHz, for example, in IEEE 802.11n and beyond and in 3GPP LTE Release 8 and beyond. However, in mmWave frequencies, the presence of a limited number of RF chains compared with antenna elements and the sparse nature of the channel may add complexities when using digital beamforming.

Analog beamforming may overcome the limited number of RF chains issue by using analog phase shifters on each antenna element. It may be used in IEEE 802.11ad during a Sector Level Sweep procedure during which the best sector is identified, a Beam Refinement procedure during which the sector to an antenna beam is refined, and a beam tracking procedure during which the sub-beams are adjusted over time to take into account any change in the channel procedures. Analog beamforming may also be used in IEEE 802.15.3 where a binary search beam sounding algorithm using a layered multi-resolution beamforming codebook is used. Analog beamforming may be typically limited to single stream transmission.

In hybrid beamforming, the precoder may be divided between analog and digital domains. Each domain may include precoding and combining matrices with different structural constraints such as, for example, a constant modulus constraint for combining matrices in the analog domain. Such an implementation may result in a compromise between hardware complexity and system performance. Hybrid beamforming may allow a system to achieve digital precoding performance due to the sparse nature of the channel and support for multi-user/multi-stream multiplexing. The number of available RF chains may limit hybrid beamforming. However, this limitation may not be a factor as mmWave channels are sparse in the angular domain.

According to implementations disclosed herein, hybrid-precoding procedures for ODFM may be addressed. In 802.11ay for the OFDM based PPDU, the packet structure may be different from that of a Single Carrier (SC) PPDU. The use of OFDM may allow for implementation of frequency domain precoding and equalization. Accordingly, frequency domain channel estimation and precoding information are needed, respectively. For channel estimation, a design for the EDMG CEF structure for channel estimation and modification to the TRN fields may be provided. For precoding in SU/MU-MIMO transmission, a modification to the BRP procedure and a design for the associated packet structures may be provided. An update to the hybrid precoding procedure, as compared with SC PPDUs, may also be provided.

According to the procedure, an initiator and responder may train the Tx and Rx sectors and antennas using a MIMO Beamforming Setup/sounding procedure. This procedure may identify the analog beams used for the MIMO transmission and may be specific for SU or MU MIMO. During the BF sounding subphase an EDMG BRP-Rx/Tx packet may be used for SU/MU-MIMO. The EDMG BRP-Rx/Tx packet may use waveform specific TRN fields. The initiator and responder may identify if the transmitted packet is an SC PPDU or an OFDM PPDU. For SC PPDUs, TRN-fields may be used as defined herein in relation to Table 1. For OFDM PPDUs TRN-fields may be used as further defined herein.

According to the procedure for hybrid precoding for OFDM based mmWave MIMO, the link decision maker, such as the transmitter, may then transmit a MIMO-setup frame/grant frame to indicate the desired analog beams to be used. The link decision maker may be defined as the node in the transmission that makes decisions regarding the antenna configuration to be used, estimates the precoder, determines a need for feedback, and/or determines the type of feedback.

According to an implementation, the MIMO-setup frame/grant frame may be used to set up the parameters/capabilities of the STAs in the SU/MU-MIMO hybrid beamforming transmission. Alternatively or in addition, the parameters for the SU/MU-MIMO hybrid beamforming transmission may be set in a capabilities subframe. The capabilities may include an ability to perform hybrid beamforming, precoder Estimation/Feedback, waveform preference for hybrid precoding, and/or precoder Parameters. Capability information may be exchanged during an association procedure may be transmitted in the beacon. For example, capability information may be found in one or more of the following frames: (1) Association Request Frame format (2) Association Response Frame Format (3) Reassociation Request frame format (4) Reassociation Response frame format (5) Probe Request frame format and/or (6) Probe Response frame format (7) DMG beacon.

The ability for precoder estimation and/or feedback may indicate if the STA can estimate a baseband precoder, can facilitate feedback for the baseband channel only, can both estimate and facilitate feedback for the baseband precoder and the baseband channel, or none of these features such that, if none, then the hybrid beamforming may require channel estimation of the reverse channel only. The waveform preference for hybrid precoding may be SC, ODFM, or both and the packet mode may determine the EDMG-CEF of the appropriate type and dimension. Precoder parameters may be time domain channel feedback such as, for example, the number of taps of the time domain channel to be fed back and/or frequency domain channel feedback such as, for example, the number of sub-carriers per feedback).

A setup/grant frame may be transmitted in SU mode to one or multiple STAs. The grant may be sent in SU mode by successive single sectors to each STA in the transmission or based on a desired configuration. Interframe spacing (IFS) between successive grant frames may be set to short interface space (SIFS) or any appropriate interframe spacing such as, for example, BRP interframe space (BRPIFS), Medium Beamforming Inter-frame Spacing (MBIFS), Short Beamforming Inter-frame Spacing (SBIFS), etc.

The grant may be transmitted using the control PHY or may be transmitted using the desired PHY, for example SC verses OFDM. If the control PHY is used, the grant frame may explicitly indicate the desired PHY mode (SC or OFDM PPDU). If the grant frame is transmitted using an SC or OFDM PPDU, this may implicitly signal the type of measurement and feedback to be used.

The grant may signal the parameters of a current measurement procedure. For example, the signal may indicate if feedback is needed. A forward link measurement, in the case where there is no reciprocity, may need some form of feedback to the transmitter whereas a reverse link measurement, in the case where there is reciprocity, may not. If feedback is needed such that the measurement is made in the forward link, then the type of feedback needed may be indicated. For example, the indication may include a precoder feedback or baseband channel. The baseband channel estimate feedback may be a time domain channel estimate or a frequency domain channel estimate. The type of channel estimate may depend on the capability of the receiver or on the decision maker, as described herein, in the measurement setup. Additionally, sampling rate/granularity of feedback may be indicated and may depend on the capability of the receiver or on the decision maker in the measurement setup or on the frequency selectivity of the channel. Signaling the granularity of the feedback may be explicit or implicit. As an implicit example, the OFDM EDMG-CEF per-symbol duration may be reduced to 1/n, by sampling every n tones in OFDM EDMG-CEF, and then truncating the first period per symbol in time domain. The symbol duration used may then be signaled in the EDMG Header-A or other field in the preamble. The granularity of the feedback may be set to the same sampling rate used for the EDMG-CEF.

Further, when a MIMO-step frame/grant frame is received, the STA may perform multi-sector clear channel assessment, as discussed herein. The STA may perform a preamble detection or energy detection on one or more of the sectors, such as beam-pair and/or antenna, to establish that the sector(s) are free to transmit/receive information without impacting their own, or other, transmissions. The feedback information may include the status of each sector, such as beam-pair and/or antenna, to allow for rank adaptation in SU-MIMO transmission or rank and STA adaptation in MU-MIMO. The feedback frame may be sent on a single SU sector, MU sectors, or both SU and MU sectors. The STA may not send feedback for a sector/channel clear frame and an absence of hybrid precoding feedback may indicate that that channel/sector was not clear.

Further, a transmitter may then acquire the hybrid beamforming information. The hybrid beamforming information may be the baseband channel for a specific sector/beam/beam-pair/antenna configuration in a SU-MIMO transmission between the transmitter and responder or in an MU-MIMO transmission between a transmitter and a specific set of STAs. When the information is acquired by the transmitter and then used to design the baseband precoder, then the acquisition may be by explicit feedback of the channel or a compressed version of the channel and/or by acquisition of the reverse channel from the receiver to the transmitter in the case of reciprocity.

Alternatively or in addition, the hybrid beamforming information may be the baseband precoder for a specific sector/beam/beam-pair/antenna configuration in a SU-MIMO transmission between the transmitter and responder or in an MU-MIMO transmission between a transmitter and a specific set of STAs. When the information is derived from measurement of the baseband channel, then the acquisition may be explicit feedback of the derived precoder or a compressed version of the derived precoder.

The hybrid precoding information may differ for SC verses OFDM PPDUs. In a scenario where there is an SC PPDU, information for a single precoder may be acquired such as the time domain channel estimate of the channel. The receiver may design the precoder.

In a scenario where there is an OFDM PPDU, information for multiple precoders may be acquired to enable accurate precoders across the frequency domain. In this scenario the information may be the time domain channel estimate of the channel or the frequency domain channel estimate, such as the effective baseband MIMO channel, for each sub-carrier or a group of subcarriers. The receiver, such as the effective baseband MIMO channel, may design the precoder for each sub-carrier or group of sub-carriers.

For either scenario, one or more significant taps of the time domain channel may be acquired (fed back or acquired by reciprocity) and as the number of taps increases, the accuracy of the design precoder may improve.

Further, for both SC and OFDM PPDU, it may be necessary for the baseband channel to be measured. According to an implementation, the transmitter may measure the baseband channel as part of a beam tracking procedure. The tracking request may be sent as part of the configuration frame (using the DMG and EDMG Header-A fields) or may be sent as an independent transmission.

The channel measurement for tracking may be based in several examples. In one example, SC or OFDM TRN fields may be appended to the end of the frame with multiple TRN fields using different adaptive weight vectors (AWVs) to identify optimal beams/sectors/antennas and the corresponding hybrid beamforming feedback. This method may allow the tracking of both the analog beams and the digital baseband channel. The EDMG-CEF may be set appropriately for the waveform (SC or OFDM).

In another example, SC or OFDM TRN fields may be appended to the end of the frame with multiple TRN fields using the same AWV used for the SU-MIMO or MU-MIMO transmission to identify the hybrid beamforming feedback for the current transmission. This method may allow reducing the appended TRN-units in the case that the analog beams are fixed. The EDMG-CEF may be set appropriately for the waveform (SC or OFDM).

In another example, the appended TRN-units may be eliminated from the BRP tracking frame and the SC EDMG-CEF or OFDM EDMG-CEF may be used in the transmitted packet to measure the effective channel. This method may further reduce the overhead. Note that the EDMG-CEF may be set appropriately for the waveform (SC or OFDM) and may be of the appropriate dimension such as to enable measurement of the desired transmit antenna/beam/beam-pair/sector configuration.

The beam tracking procedure may measure the forward channel from the transmitter to the receiver by using EDMG initiator transmit beam tracking; this may then require feedback of the hybrid precoder information to the initiator (transmitter). The beam tracking procedure may measure the reverse channel from the receiver to the transmitter. The reverse channel may be estimated by having the EDMG responder transmit beam tracking or having the EDMG initiator receive beam tracking; this assumes channel reciprocity.

Alternatively or in addition, the transmitter may measure the baseband channel as part of a BRP procedure. The BRP request may use the appropriate TRN fields for the transmitted EDMG waveform. The channel measurement for the BRP procedure may be based on appending SC or OFDM TRN fields to the end of the frame with multiple TRN fields using different AWVs to identify the best beams/sectors/antennas and the corresponding hybrid beamforming feedback. This technique may allow the flexibility of allowing the tracking of both the analog beams and the digital baseband channel. Note that the EDMG-CEF may be set appropriately for the waveform (SC or OFDM). Additionally, in the BRP method, the receiver may respond with an ACK and feedback for the information at a more appropriate time.

According to an implementation, the transmitter may acquire the hybrid precoding information as part of a null data packet exchange with the receiver. At a SIFS duration after the configuration frame, the transmitter may send a dedicated EDMG frame that contains no data (an EDMG Null Data Packet Frame) to request for hybrid precoding information. The EDMG packet may contain data (and EDMG baseband measurement packet) but the dimensions of the EDMG-CEF must be sufficient to measure the desired channel.

If feedback is needed, the port control protocol (PCP)/AP and STAs may switch antenna configurations back to the SU for single stream transmission for each STA. Alternatively, the feedback may be piggybacked on any transmission to the transmitter. The interframe spacing between measurement frame null data packet (NDP) and the feedback frame from the first STA may range between SIFS and BRPIFS. Additionally, the order of feedback may be different from the order of the grant frame transmission and the specific order of feedback may be signaled.

The STAs may send feedback hybrid precoding information, if needed. This may be the effective baseband channel or may be an estimated precoder. The channel or estimated precoder may be fed back in full detail or it may be fed back in compressed form.

Further, the transmitter may use hybrid precoding information with analog beams to construct the hybrid beamform/precoder and transmit data to the receiving STA(s).

Figure 12:
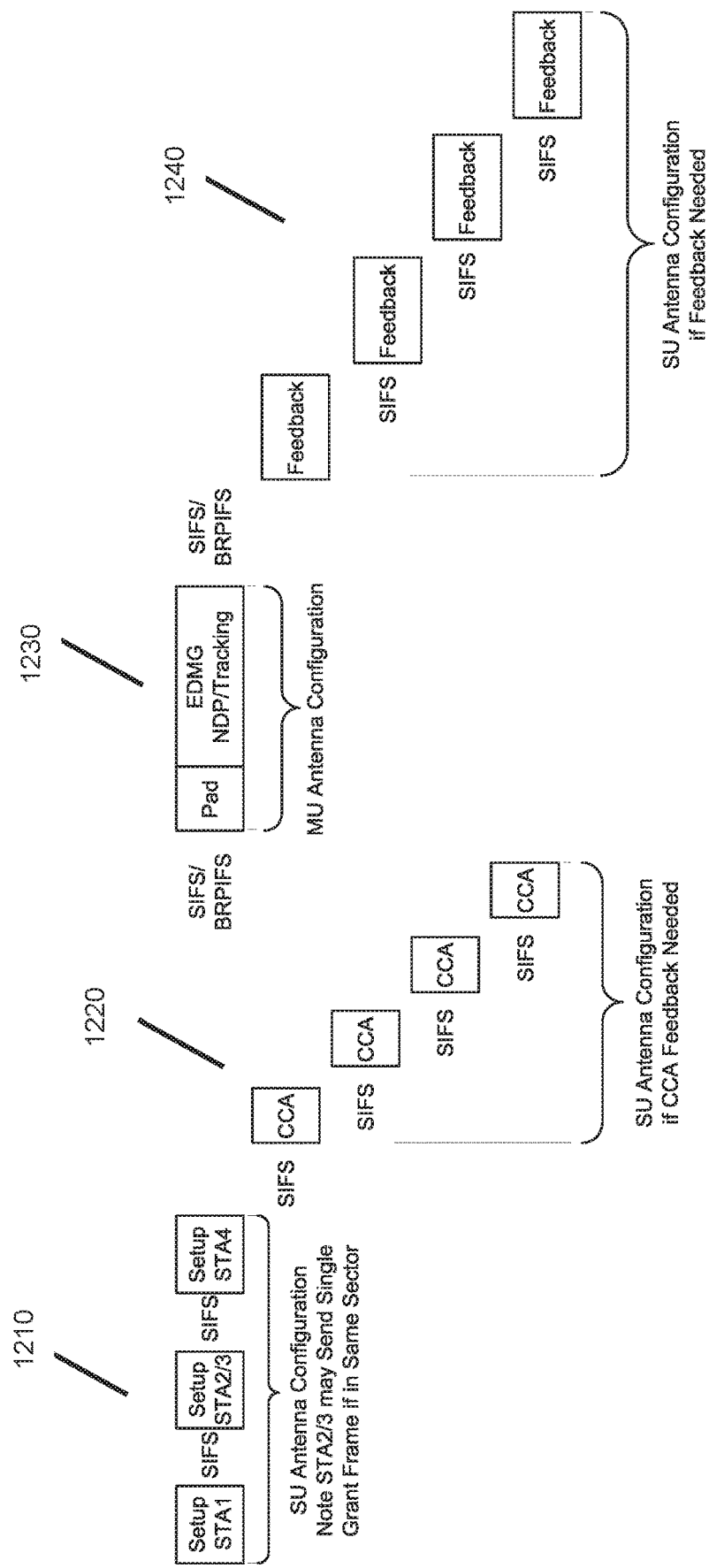
FIG. 12 is a diagram of an example procedure hybrid precoding for OFDM-based mmWave MIMO.

FIG. 12 shows an example procedure according to an implementation disclosed herein. As shown in FIG. 12, at 1210 one or more STAs may be setup, including their SU Antenna Configuration. As noted, STA⅔ may send a signal grant frame if it is within the same sector as the other STAs. Additionally, STAs may be setup with an applicable interval, such as a SIFS. At 1220, the SU antennas may be configured with SIFS intervals, as shown, if CCA feedback is needed. 1230 shows an MU antenna configuration that is preceeded and followed by an applicable interval such as a SIFS or BRPIFS interval. The MU antenna configuration fields include a Pad field as well as an EDMG NDP/Tracking Field. At 1240, the SU antennas may be further configured with SIFS intervals, as shown, if feedback is needed.

According to an implementation, the BRP frame structure may be used for hybrid beamforming sounding in an OFDM system. A BRP procedure may be a request response based procedure and the OFDM feedback request/response may be implemented using BRP frame exchanges. A BRP frame may need to be modified to request and carry feedback information for an OFDM system. An example of a BRP frame is shown table 2 below. Fields that may be provided and/or updated may be a BRP Request field and/or EDMG BRP request element, a DMG Beam Refinement element, and Channel Measurement Feedback elements or EDMG Channel Measurement Feedback elements.

TABLE 2

BRP Frame Format

| Order | Information |
|---|---|
| 1 | Category |
| 2 | Unprotected DMG Action |
| 3 | Dialog Token |
| 4 | BRP Request field |
| 5 | DMG Beam Refinement element |
| 6 | Zero or more Channel Measurement Feedback elements |
| 7 | EDMG Partial Sector Sweep element |
| 8 | EDMG BRP Request element (optional) |
| 9 | Zero or more EDMG Channel Measurement Feedback elements |

BRP feedback request and/or configuration signaling may be applied such that a BRP frame may be transmitted from STA1 to STA2 where BRP feedback request related signaling and/or BRP feedback configuration signaling may be contained. The BRP feedback request signaling may be set by STA1 to indicate what kind of feedback may be requested from STA2. The BRP feedback configuration signaling may be set by STA1 to indicate the format and length of the DMG/EDMG channel measurement fields presented in the current BRP frame.

OFDM baseband tracking requests, OFDM baseband feedback types, and feedback request details may be specified as BRP feedback requests when OFDM time/frequency domain channel state information (CSI) is preferred.

For OFDM baseband tracking request the choice of OFDM or SC digital baseband tracking may be implicit. For example, if the PPDU that carries the BRP frame is an OFDM PPDU, then the digital baseband tracking/sounding field may indicate that it is for OFDM digital baseband tracking/sounding and OFDM feedback may be requested. If the PPDU that carries the BRP frame is an SC PPDU, then the digital baseband tracking/training field may indicate that it is for SC digital baseband tracking/sounding and SC feedback may be requested. Alternatively, OFDM baseband tracking request may be replaced by digital baseband tracking/training.

OFDM baseband feedback type may be time domain feedback or frequency domain feedback. Alternatively, an OFDM baseband feedback type may not be explicitly signaled, and instead it may be implicitly signaled. For example, if an OFDM feedback may be requested, then frequency domain feedback may be requested. If a SC feedback may be requested, then time domain feedback may be requested.

The feedback request detail for frequency domain OFDM feedback requests may include Ng, which indicates that one feedback for every N adjacent sub-carrier may be requested. For example, N may be [4,8,16,24,32,64]. The number of bits for each feedback coefficient may indicate the requested feedback coefficients resolution. For example, if the given rotation may be used to compress a V matrix, two angle sets may be provided as feedback. Angles may be quantized using the number of bits indicated for each angle set. Digital MIMO channel dimensions may be the number of Tx streams/chains (Ntx) to be trained, and the number of Rx streams/chains (Nrx) to be trained. Alternatively, Nrx or Ntx may not be requested, and may be determined by the STA, which may perform the measurement, e.g., STA2.

OFDM baseband feedback type and feedback detail configurations may be specified as BRP feedback configurations in the case that OFDM time/frequency domain channel state information (CSI) may be preferred.

OFDM baseband feedback type may indicate the feedback type used in the channel measurement element or EDMG channel measurement element such as time domain feedback or frequency domain feedback. Alternatively, OFDM baseband feedback type may not be explicitly signaled, and instead may be implicitly signaled. For example, if an OFDM feedback is requested, then frequency domain feedback is requested. If a SC feedback is requested, then time domain feedback is requested. The channel measurement or EDMG channel measurement element may be replaced by the EDMG baseband precoder element that feeds back the elements of one or more time domain or frequency domain precoders derived by the receiver from the estimated channel. The precoder may be designed based on the baseband channel only, or it may be jointly designed with the analog beams based on an estimate of the millimeter wave channel.

The feedback detail configurations for frequency domain OFDM feedback requests may include Ng, which indicates that one feedback for every N adjacent sub-carrier may be requested. For example, N may be [4,8,16,24,32,64]. The number of bits for each feedback coefficient may indicate the requested feedback coefficients resolution. For example, if the given rotation may be used to compress V matrix, two angle sets may be provided as feedback. Angles may be quantized using the number of bits indicated for each angle set. Digital MIMO channel dimensions may be the number of Tx streams/chains (Ntx) to be trained, and the number of Rx streams/chains (Nrx) to be trained.

Some or all of the signaling discussed herein may be indicated in the BRP Request field, EDMG BRP request element and/or the DMG beam refinement element. In one example, OFDM baseband tracking request or a baseband tracking request field may be carried using reserved bit in BRP Request field and/or EDMG BRP request element. In another example, OFDM baseband feedback type field may be carried using reserved bit in BRP Request field, and/or EDMG BRP request element.

In another example, OFDM feedback request details and/or feedback detail configurations may be carried in DMG Beam Refinement element. For example, DMG Beam Refinement element may be modified from FIG. 13 to FIG. 14.

Figure 13:
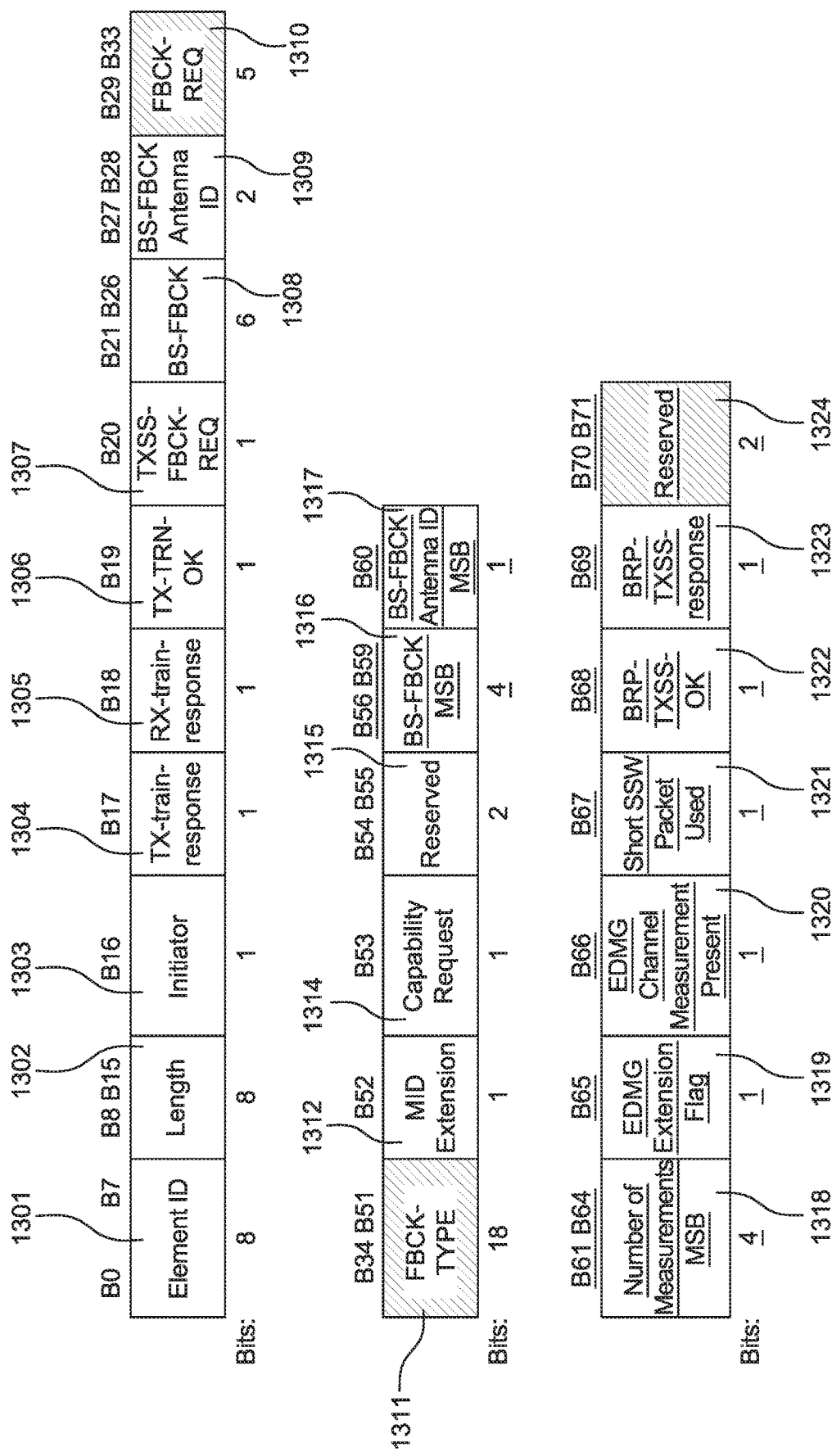
FIG. 13 is a diagram of an example existing DMG beam refinement element.

As shown in FIG. 13, an existing DMG beam refinement element may include an Element ID 1301 (8 bits), a length 1302 (8 bits), an initiator 1303 (1 bit), a TX-train-response 1304 (1 bit), a RX-train-response 1305 (1 bit), a TX-TRN-OK 1306 (1 bit), a TXSS-FBCK-REQ 1307 (1 bit), a BS-FBCK 1308 (6 bits), a BS-FBCK Antenna ID 1309 (2 bits), a Digital FBCK-REQ 1310 (5 bits), a FBCK-TYPE 1311 (18 bits), a MID Extension 1312 (1 bit), a Capability Request 1314 (1 bit), a Reserved field 1315 (2 bits), a BS-FBCK MSB 1316 (4 bits), a BS-FBCK Antenna ID MSB 1317 (1 bit), a Number of Measurements MSB 1318 (4 bits), an EDMG Extension Flag 1319 (1 bit), a EDMG Channel Measurement Present 1320 (1 bit), a Short SSW Packet Used 1321 (1 bit), a BRP-TXSS OK 1322 (1 bit), a BRP-TXSS response 1323 (1 bit) and a reserved field 1324 (2 bits).

Figure 14:
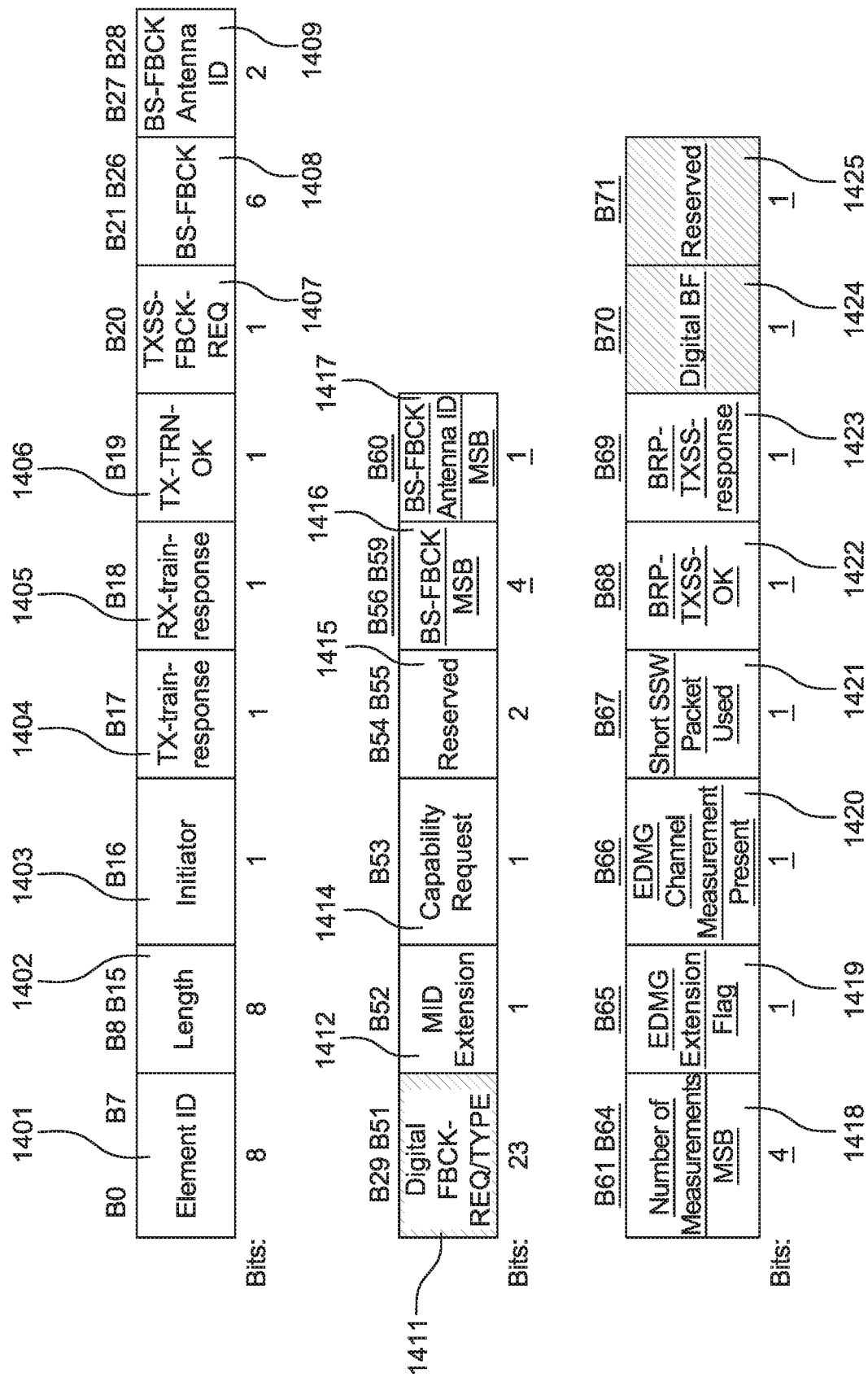
FIG. 14 is a diagram of an example of a modified DMG beam refinement element.

As shown in FIG. 14, a modified DMG beam refinement element may include an Element ID 1401 (8 bits), a length 1402 (8 bits), an initiator 1403 (1 bit), a TX-train-response 1404 (1 bit), a RX-train-response 1405 (1 bit), a TX-TRN-OK 1406 (1 bit), a TXSS-FBCK-REQ 1407 (1 bit), a BS-FBCK 1408 (6 bits), a BS-FBCK Antenna ID 1409 (2 bits), a combined Digital FBCK-REQ/Type 1411 (23 bits), a MID Extension 1412 (1 bit), a Capability Request 1414 (1 bit), a Reserved field 1415 (2 bits), a BS-FBCK MSB 1416 (4 bits), a BS-FBCK Antenna ID MSB 1417 (1 bit), a Number of Measurements MSB 1418 (4 bits), an EDMG Extension Flag 1419 (1 bit), a EDMG Channel Measurement Present 1420 (1 bit), a Short SSW Packet Used 1421 (1 bit), a BRP-TXSS OK 1422 (1 bit), a BRP-TXSS response 1423 (1 bit), a Digital BF 1424 (1 bit) and a reserved field 1425 (1 bit).

As shown, one reserved bit 1425 from FIG. 14 may be used to indicate whether Digital BF related feedback Request/Type may be included. If this bit is set, then feedback FBCK-REQ 1310 and FBCK-TYPE 1311 fields of FIG. 13 may be overwritten as FBCK-REQ/TYPE field 1411 of FIG. 14.

The FBCK-REQ/TYPE field 1411 may be defined based on one or more implementations. In accordance with a first implementation, M bits may be used as OFDM/Digital FBCK-REQ field 1310 of FIG. 13 and N bits may be used as OFDM/Digital FBCK-TYPE field 1411 of FIG. 14. For example, M+N<=23. The M bit OFDM/Digital FBCK-REQ field 1310 may carry OFDM feedback request detail information. The N bit OFDM/Digital FBCK-TYPE field 1411 may carry OFDM feedback configuration information. According to this implementation, the BRP frame may be used to carry feedback configuration information that indicates the length and format of the channel measurement element carried in the same BRP frame. At the same time, it may carry request information for the later BRP sounding. In accordance with another implementation, one bit in the OFDM/Digital FBCK-REQ/TYPE field 1411 may indicate the field that may be used to carry either OFDM/Digital FBCK-REQ field 1310 or OFDM/Digital FBCK-TYPE field 1311. OFDM/Digital FBCK-REQ field 1310 or OFDM/Digital FBCK-TYPE field 1311 may be limited by a total of 23 bits. The OFDM/Digital FBCK-REQ field may carry OFDM feedback request details information if the first bit is set. If the first bit is not set, OFDM feedback configuration information may be carried. According to this implementation, the BRP frame may carry either feedback requesting information or the feedback configure information, but may not carry both. A benefit form this configuration may be that more detailed information is carried and more bits may be used as reserved bits. Alternatively, according to another implementation, more bits may be overwritten and reused to carry OFDM/Digital tracking/sounding information. For example, Number of Measurements most significant bit, MSB field, EDMG Extension flag field, etc.

According to an implementation, clear channel assessment (CCA) during SU and MU MIMO BF training may be addressed. CCA may be important in 802.11 as it may prevent non-transmitting STAs from interrupting on-going transmissions. Methods to implement CCA during the use of multiple directional antennas are needed especially during sounding. TRN refers to the TRN field appended at the end of a PPDU, any other portion of a PPDU, or an entire PPDU or series of PPDUs that is or are used for BF training or beam refinement/tracking.

For SU/MU MIMO BF training or beam tracking, there may be limitations that certain AWVs in the TRN may interfere with other ongoing receptions of non-intended STAs. Additionally, the intended STA such as the responder's reception of certain AWV may be interfered by the transmissions of other STAs' ongoing transmissions. This may negatively impact either the result of the BF training or the ongoing communication of other STAs. An STA, such as an initiator, may perform one or more CCAs based on the antennas/AWV/RF chains that are used to transmit or receive TRN. The CCA may be based on any of the disclosed criteria performed on a channel that occupies the same or a subset of BW of TRN to be transmitted/received.

The CCA may be based on NAV setting per antenna/AWV/RF chain where it may be assumed that there are several NAV timers each of which keep track of the NAV of an antenna/AWV/RF chain combination. The Rx pattern of the antenna/AWV/RF chain combination used for maintaining a NAV timer may be a super set of the antenna pattern of the antenna/AWV/RF chain used in transmitting/receiving TRN. Also, the NAV timer corresponding to a Tx antenna/AWV/RF chain may be set based on the duration field of a decoded MAC protocol data unit (MPDU) which is received in an antenna pattern that covers the Tx/Rx pattern of the antenna/AWV/RF chain that is used for transmitting/receiving TRN.

Alternatively, the CCA may be based on energy detection per antenna/AWV/RF chain where the detection is performed in an antenna pattern that covers the pattern of the antenna/AWV that is used for transmitting/receiving TRN. The detection may be based on the received energy in an interframe space, xIFS, duration. If TRN comprises different antenna/AWV combinations of the same RF chain that cannot be activated at the same time, then the energy detection may involve a receive sector sweep (RXSS) of the RF chain that changes its antenna configuration every xIFS duration for the energy detection.

The initiator may not transmit TRN on the antenna/AWV/RF chain where the CCA is indicated as busy. An indication may be included in a frame/PPDU to the responder indicating that the BF sounding only includes a subset of transmit/receive settings that the initiator intends to test. Such indication may be used by responder not to commit to an Rx/Tx pattern that is only optimized for the TRN received/transmitted in this sounding. The indication may also be used by the responder not to provide complete feedback until all transmit settings of the initiator have been tested. The responder may also use the indication such that the responder does not expect a complete feedback until all received settings of the initiator have been tested.

One or more NAV setting frames may be sent to protect the TRN to be transmitted or to be received by the initiator. A duplicated NAV setting frame may be sent in different antennas/AWVs/RF chains that are used to transmit or receive TRN. The duplicated NAV setting frame may not be sent on antenna/AWV/RF chain that has CCA indicated as busy The duplicated frame may be sent with a cyclic shift diversity (CSD) from different antennas/AWVs/RF chains.

The NAV setting frame may be transmitted in a duplicated format that covers the entire BW used by TRN. If TRN comprises different antenna/AWV combinations of the same RF chain that cannot be activated at the same time, then consecutive NAV setting frames may be sent, with the RF chain switching antenna configuration for each frame, and/or with each frame separated with an interframe space duration yIFS. The NAV setting frame sent by the initiator may be a MIMO BF setup frame, request to send (RTS) or clear to send (CTS)-to-self frame.

The NAV setting frame may solicit a NAV setting frame from a responder. The responding NAV setting frame may be used to protect the TRN to be transmitted or to be received by the responder; this may be enabled only when the responder has already enabled an Rx setting that is used for CCA at the Rx side before the transmission of the NAV setting frame from the initiator, and the BF training does not test a different Rx setting at the responder. In case multiple consecutive NAV setting frames are sent by the initiator, an implicit or explicit time offset may be specified in the PPDU for the timing of the NAV setting frame from the responder. In case the NAV setting frame is addressed to more than one STA, an implicit or explicit time offset may be specified in the PPDU for the timing of the NAV setting frame from the responder. The NAV setting frame from the responder may be MIMO BF setup frame or DMG CTS frame.

The responder may not respond to the NAV setting frame from the initiator, which solicits a responding NAV setting frame from the responder, if the one or more or all of the antenna/AWV/RF chain(s) at the responder indicate(s) that the CCA is busy. The criteria of determining whether the CCA is busy may be the same as discussed herein regarding the initiator, such that it is based on the TRN to be transmitted or received by the responder.

If the responder determines to respond with the solicited NAV setting frame, then the criteria of sending a duplicated frame in the antenna/AWV/RF chain, and channel, may be the same as described for the initiator.

The responder may not transmit TRN on the antenna/AWV/RF chain that has the CCA indicated as busy. An indication may be included in a frame/PPDU to the initiator indicating that the BF training only includes a subset of transmit/receive settings that the responder intends to test. Such indication may be used by the initiator not to commit to an Rx/Tx pattern that is only optimized for the TRN received/transmitted in this sounding. The indication may also be used by the initiator to not provide complete feedback until all transmit settings of the responder have been tested. The indication may also be used by the initiator to not expect a complete feedback until all receive settings of the responder have been tested.

After an initiator or responder transmits TRN, the initiator or responder may perform feedback. In the feedback, an indication may be used to indicate that when sounding is performed for a particular Tx/Rx setting, for example a TRN index/spatial stream, the receiver reports the CCA to be busy. The reported SNR/RSSI/channel measurement may be considered inaccurate for this Rx/Tx setting based on this busy indication. This CCA busy report may be based on the total received energy and the quality of expected sounding signals from the transmitter.

According to an implementation, the TRN structure and design for OFDM may address the TRN structure for digital/analog/hybrid beam sounding, the flexibility of TRN structure, and the TRN structure for hardware non-linearities. In order to extend the coverage during the TRN field transmission, the TRN field may have low peak average power ratio (PAPR). However, the available sequences, such as those used for EDMG CEF for OFDM, have approximately 3-3.5 dB PAPR, which may limit the coverage range. Further, 802.11ay SC PHY may introduce flexibility to the size of the TRN fields. However, it may not be trivial to achieve a similar flexibility to the TRN for SC as described herein, for example the disclosure relating to table 1, since number of samples at the output of the inverse discrete Fourier transform (IDFT) for OFDM is constant. Also, the OFDM symbol may have a higher PAPR regardless of the modulation symbols in the payload. Hence, OFDM PHY may be sensitive to hardware non-linearities, especially for millimeter wave communications.

The PPDU related to TRN for OFDM may have a structure for digital precoding sounding and hybrid beamforming sounding. According to an implementation, for digital precoding sounding, the PPDU 1500 may not include data packets or TRN, as shown in FIG. 15. As shown, the PPDU 1500 may include a L-STF (SC) 1501, a L-CEF (SC) 1502, a L-Header (SC) 1503, an EDMG Header (SC) 1504, an EDMG STF (OFMD) 1505, and an EDMG CEF (OFMD) 1506. The header 1503/1504 may indicate the PPDU 1500 does not include data packets or TRN. The receiver may send feedback based on the estimated channel based on the EDMG CEF 1506 field for OFDM. According to this implementation, analog beamforming may be fixed. Additionally or alternatively, as shown in FIG. 16, digital precoding sounding PPDUs may not have data packet, the header may indicate this structure, and the receiver may send feedback of the estimated channel based in the TRN field. As shown, the PPDU 1600 may include a L-STF (SC) 1601, a L-CEF (SC) 1602, a L-Header (SC) 1603, an EDMG Header (SC) 1604, a EDMG STF (OFMD) 1605, an EDMG CEF (OFMD) 1606, and a TRN (OFDM) 1607.

According to an implementation for hybrid beamforming sounding, PPDU SC sounding may be used for OFDM based sounding for analog beamforming sounding. If the channel response is fed back to the initiator, the transmit and receive filter(s) may be predefined or signaled so that the initiator removes the impact of filters from the effective channel to learn the actual mmWave multipath channel for OFDM transmission.

FIG. 17 shows a PPDU 1700 including a L-STF (SC) 1701, a L-CEF (SC) 1702, a L-Header (SC) 1703, an EDMG Header (SC) 1704, a EDMG STF (OFMD) 1705, an EDMG CEF (OFMD) 1706, a Payload (OFDM) 1707, a TRN (OFDM) 1708, and a TRN (SC) 1709. According to an implementation, as shown in FIG. 17 for a hybrid beamforming sounding PPDU, the EDMG Header (SC) 1704 may indicate the type of waveform for the TRN (SC) field 1709. For SC, the feedback may only contain the quality information, such as the SNR/SINR or ID of best beams, corresponding to the beams that have been swept. For OFDM, the feedback may also be related to the channel frequency for a group of beams that have been swept. The content of information may be the baseband precoding matrix, for example, derived based on singular value decomposition (SVD), the channel coefficients in time (on a group of taps) or frequency (on a group of subcarriers), and/or the rank information for multibeam sounding.

Figure 18:
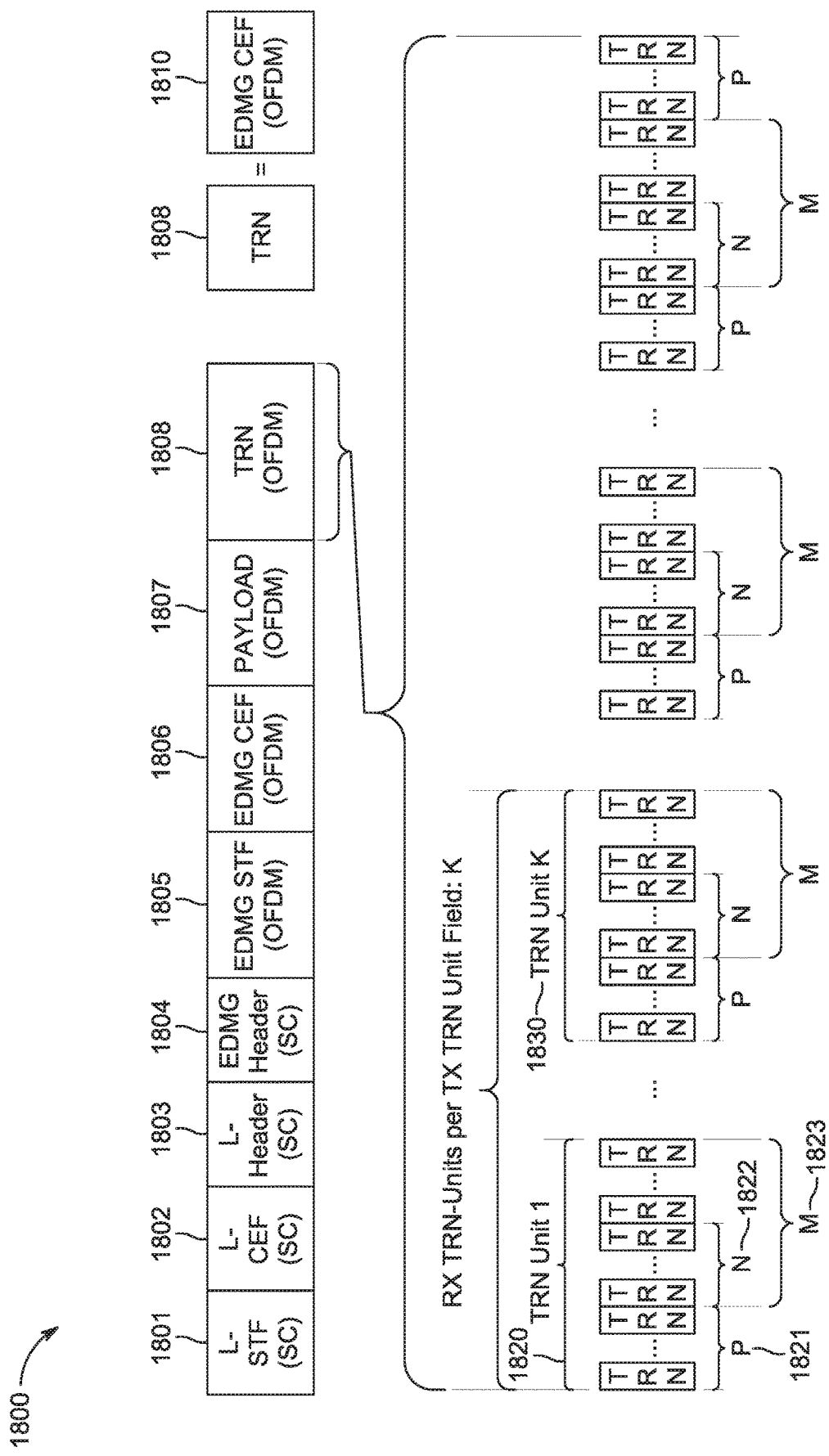
FIG. 18 is a diagram of an example TRN structure.

According to an implementation, the TRN may have a structure such that the OFDM TRN field and SC TRN field may be configured with identical parameters. For example, 802.11ay defines P, N, M, K, which correspond to RX-TRN units per TX TRN unit field, and the number of TRN units in the header. The same structure may be employed for OFDM while the TRN field is an OFDM symbol, and not an SC symbol. According to an implementation, the TRN field may use exactly the same sequences defined for 802.11ay EDMG CEF OFDM. This option is shown in the example diagram of FIG. 18. As shown, PPDU 1800 includes an L-STF (SC) 1801, a L-CEF (SC) 1802, a L-Header (SC) 1803, an EDMG Header (SC) 1804, a EDMG STF (OFMD) 1805, an EDMG CEF (OFMD) 1806, a Payload (OFDM) 1807, a TRN (OFDM) 1808, TRN Units including TRN Unit 1 1820 through TRN Unit K 1830 where RX TRN-Units per TX TRN Unit Field: K and which include parameters P 1821, N 1822, and M 1823. As shown in FIG. 18, the TRN field 1808 uses exactly the same sequences defined for 802.11ay EDMG CEF (OFDM) 1810.

According to an implementation, the TRN field may use computer generated constant amplitude sequences to reduce the PAPR. The computer generate sequences may be or include an element of M-PSK constellation. The time cyclic shift of the time-domain footprint of these sequences may be employed for different streams. In the frequency domain, modulating the base/original sequence may generate these shifts. For example, one may consider a sequence for left and right sequences where M=64 and phases=exp(1i*2*pi*[:M−1]/M). Then, Sleft from Table 3 may be chosen for a given channel bounding size Ncb and IFFT size. Then, Sright from Table 3 may be chosen for a given channel bounding size Ncb and IFFT size. The Total Sequence may result in: [phases(Sleft); 0; 0; 0; phase(Sright)]. Table 3 shows an example for 64 PSK sequences that achieves low PAPR.

TABLE 3

| Nifft = (Nominal IFFT size) | Sleft | Sright | PAPRN (N is the IFFT size used at transmitter) |
|---|---|---|---|
| Ncb = 1, Nifft = 512 | 1 13 56 60 31 11 61 25 54 49 6 50 47 8 25 44 21 31 58 39 63 40 28 9 17 51 17 54 12 6 6 49 3 57 27 33 22 63 51 39 63 16 44 31 53 16 26 53 3 5 62 22 31 13 44 28 46 48 46 29 52 51 58 52 63 10 64 2 45 56 25 21 54 54 56 4 52 59 33 56 42 16 23 51 16 27 58 46 24 15 43 40 3 27 3 59 3 12 26 58 28 29 19 32 46 48 11 16 36 30 8 39 45 57 36 62 52 5 16 51 3 38 40 58 42 9 31 40 29 61 2 28 49 18 35 42 52 27 51 4 54 63 30 35 24 61 13 15 31 40 53 48 36 10 55 6 46 28 22 15 11 39 11 52 4 11 56 22 11 16 13 10 44 12 13 63 | 63 52 37 56 12 33 46 50 46 4 27 37 37 1 40 50 39 14 58 14 14 13 38 62 58 4 18 46 31 31 34 55 17 35 34 15 34 6 54 45 51 39 45 44 45 30 63 17 36 8 36 61 11 19 57 47 33 56 54 37 37 39 32 15 11 47 16 25 34 58 19 3 49 11 18 10 48 2 59 20 9 35 56 38 43 8 1 12 61 17 8 49 47 43 23 13 57 7 54 16 44 37 1 56 45 12 46 14 11 7 33 53 17 14 18 62 61 8 64 41 20 30 58 13 4 63 21 2 55 6 50 21 26 57 18 24 32 7 36 49 25 5 32 16 36 23 61 8 14 13 1 43 42 36 31 1 38 4 56 60 45 17 9 53 21 2 57 47 12 18 18 56 7 5 32 26 | PAPR512: 1.1715 |
| Ncb = 1, Nifft = 1024 | 1 19 31 57 27 53 3 47 6 59 21 36 60 32 24 5 57 30 56 48 21 52 54 11 10 26 13 9 6 26 46 1 28 30 12 27 55 15 55 39 41 25 26 43 51 48 48 53 1 47 50 5 1 7 48 5 30 19 26 25 14 53 41 2 55 48 17 22 4 45 64 56 50 12 58 14 53 56 | 58 61 45 23 28 5 53 37 50 27 4 38 3 57 11 54 13 54 29 45 1 55 23 1 8 46 12 49 51 53 18 1 18 51 56 9 28 10 46 36 2 58 2 20 34 37 55 3 31 38 32 37 51 61 12 9 22 44 34 14 28 35 56 29 2 44 17 11 39 48 27 42 15 52 25 20 11 | PAPR512: 2.2562 PAPR1024: 2.3574 PAPR1536: 2.5067 PAPR2048: 2.4063 PAPR4096: 2.5121 |

TABLE 3-continued

| Nifft = (Nominal IFFT size) | Sleft | Sright | PAPRN (N is the IFFT size used at transmitter) |
|---|---|---|---|
| | 42 4 55 4 25 39 29 | 19 43 32 20 54 33 41 | |
| | 26 21 44 18 7 59 7 | 35 39 26 8 41 59 13 | |
| | 28 46 15 16 23 53 62 | 28 58 32 15 38 38 34 | |
| | 17 43 1 38 60 26 49 | 38 29 26 58 15 60 22 | |
| | 54 44 46 53 38 38 8 | 10 62 62 63 29 57 61 | |
| | 54 3 36 45 27 10 55 | 44 24 21 47 55 38 12 | |
| | 14 64 6 19 54 39 10 | 6 33 57 55 57 2 19 | |
| | 60 52 18 52 17 15 6 | 62 51 4 50 40 39 36 | |
| | 6 54 60 24 35 54 27 | 55 39 35 36 48 3 12 | |
| | 31 3 20 18 2 12 57 | 21 41 8 14 23 62 49 | |
| | 40 62 34 45 14 50 10 | 41 30 11 63 41 27 24 | |
| | 62 56 44 11 13 28 39 | 18 19 17 57 55 17 8 | |
| | 17 58 52 64 12 15 35 | 27 63 5 19 32 27 11 | |
| | 13 47 3 62 17 16 63 | 56 6 57 37 6 30 9 | |
| | | 47 | |
| Ncb = 2, Nifft = 1024 | 1 25 64 23 8 45 46 | 57 49 13 5 6 31 7 | PAPR1024: 1.0710 |
| | 18 31 1 48 19 13 53 | 58 46 64 48 58 60 23 | |
| | 62 18 12 51 26 60 37 | 30 25 3 39 57 33 52 | |
| | 26 24 22 11 55 63 19 | 22 61 16 61 63 21 59 | |
| | 56 58 32 55 45 22 46 | 50 43 50 3 40 2 55 | |
| | 34 37 33 22 19 45 46 | 3 57 42 53 38 43 37 | |
| | 47 50 28 60 9 52 45 | 6 49 16 62 24 12 61 | |
| | 52 15 33 18 41 2 14 | 13 23 8 7 53 2 52 | |
| | 8 16 38 60 54 43 17 | 46 45 12 52 9 1 9 | |
| | 37 24 29 63 22 26 48 | 49 21 9 27 55 46 61 | |
| | 14 2 51 17 35 41 17 | 19 55 21 36 30 22 2 | |
| | 16 50 21 42 50 41 8 | 1 40 48 53 9 39 15 | |
| | 50 55 21 24 22 6 36 | 11 27 6 56 49 53 3 | |
| | 51 43 26 58 19 5 7 | 48 51 1 45 49 12 61 | |
| | 47 41 1 14 21 15 23 | 49 49 6 24 49 33 16 | |
| | 45 44 23 54 41 16 47 | 27 54 58 52 32 43 51 | |
| | 38 50 50 22 8 38 59 | 29 58 56 32 42 64 34 | |
| | 64 57 55 59 17 43 50 | 1 16 1 13 11 39 20 | |
| | 50 62 54 11 35 22 41 | 6 42 6 7 47 38 55 | |
| | 6 51 11 49 59 41 17 | 29 41 32 36 49 61 47 | |
| | 19 58 53 17 58 55 45 | 19 13 37 60 56 15 7 | |
| | 45 21 3 22 12 7 16 | 35 33 31 16 27 35 60 | |
| | 14 32 51 6 43 39 45 | 41 3 29 47 53 47 55 | |
| | 9 14 13 44 18 19 4 | 19 23 17 42 45 60 26 | |
| | 10 36 7 15 47 51 7 | 53 59 4 40 9 42 46 | |
| | 45 63 15 20 33 37 59 | 50 10 42 1 51 1 36 | |
| | 55 43 64 29 39 38 15 | 46 24 14 14 17 19 32 | |
| | 52 17 19 43 4 55 35 | 26 35 7 36 29 30 24 | |
| | 26 2 7 27 9 53 9 2 | 59 41 62 2 51 30 25 | |
| | 22 57 39 27 45 46 25 | 10 62 48 2 35 23 60 | |
| | 38 43 53 40 17 28 37 | 58 10 41 4 6 51 58 | |
| | 16 49 25 25 6 32 29 | 40 38 10 56 22 43 63 | |
| | 44 42 17 16 52 51 58 | 44 13 62 36 21 49 50 | |
| | 53 17 25 27 31 53 18 | 30 64 55 16 21 25 2 | |
| | 23 4 4 3 32 15 23 | 47 32 35 28 4 6 13 | |
| | 45 4 12 4 47 50 20 | 19 26 11 8 30 33 47 | |
| | 61 35 57 9 54 43 36 | 27 63 6 38 20 21 22 | |
| | 57 13 10 51 53 55 45 | 43 22 59 50 8 49 38 | |
| | 9 1 5 61 16 48 21 59 | 28 54 61 48 25 26 2 | |
| | 27 52 50 61 46 25 2 | 41 11 22 29 52 35 52 | |
| | 12 5 28 5 27 44 22 | 9 32 61 5 36 9 54 | |
| | 42 62 49 36 29 27 1 | 53 11 8 10 47 38 25 | |
| | 39 44 18 60 7 41 37 | 48 10 34 20 25 48 32 | |
| | 22 64 44 1 48 39 61 | 20 41 39 7 56 2 24 | |
| | 30 46 50 29 35 31 14 | 20 33 33 5 2 45 10 | |
| | 29 35 41 36 44 2 32 | 14 9 26 64 31 49 3 | |
| | 56 63 37 23 23 54 21 | 52 30 9 13 18 37 49 | |
| | 14 35 43 10 31 14 39 | 60 13 38 29 54 5 45 | |
| | 3 47 62 11 37 53 30 | 62 45 34 27 2 32 58 | |
| | 24 46 44 20 23 43 58 | 14 18 47 24 25 32 21 | |
| | 59 56 54 8 56 20 60 | 17 32 22 46 14 45 44 | |
| | 10 18 44 52 36 23 41 | 43 26 60 12 46 37 46 | |
| | 48 20 33 36 5 11 39 | 40 58 36 63 41 35 7 | |
| | 45 12 59 4 38 2 4 | 25 6 64 18 60 2 55 | |
| | 20 41 25 4 61 | 55 44 10 30 60 11 31 | |
| Ncb = 2, Nifft = 2048 | 1 7 27 63 50 47 15 | 45 44 26 1 64 26 30 | PAPR1024: 2.3596 |
| | 62 38 64 27 26 34 12 | 45 58 39 9 11 25 59 | PAPR1536: 2.9179 |
| | 8 22 54 32 10 10 59 | 22 34 32 33 30 31 10 | PAPR2048: |
| | 18 33 30 62 24 5 58 | 22 35 28 60 56 16 22 | |
| | 52 31 32 48 15 36 7 | 7 58 14 5 14 35 41 | |
| | 37 18 22 3 49 22 26 | 4 6 11 14 64 26 21 | 2.3596 |
| | 13 62 6 22 2 52 28 | 55 38 25 48 9 17 54 | PAPR4096: 2.9864 |
| | 50 15 30 44 36 12 39 | 54 3 3 22 31 61 53 | |
| | 25 10 33 14 48 42 41 | 49 37 34 41 54 21 44 | |
| | 20 24 58 2 61 38 41 | 46 11 11 45 39 31 30 | |
| | 8 31 17 4 38 9 26 64 | 44 53 60 24 49 42 47 | |
| | 16 39 47 13 28 19 49 | 55 42 63 6 46 43 13 | |
| | 32 27 32 27 19 57 47 | 37 62 53 21 26 11 16 | |
| | 53 15 20 33 45 49 62 | 3 19 12 63 27 28 9 | |
| | 38 38 33 17 57 7 52 | 15 63 13 1 33 15 24 | |
| | 5 58 39 41 43 54 17 | 17 22 34 15 51 16 46 | |
| | 18 64 46 62 8 61 46 | 48 24 57 13 59 15 23 | |
| | 28 51 43 33 55 30 3 | 15 8 45 25 25 29 10 | |
| | 2 37 50 46 1 30 23 3 | 28 59 38 57 2 64 7 | |
| | 26 6 62 49 12 63 54 | 62 2 29 46 61 27 60 | |
| | 47 26 26 13 38 22 62 | 58 6 17 19 44 9 7 | |
| | 62 35 50 45 4 63 34 | 17 46 48 34 42 56 20 | |
| | 29 2 60 31 53 24 51 | 64 6 48 57 2 29 50 | |
| | 2 21 8 13 36 19 11 | 56 31 27 35 36 7 59 | |
| | 13 12 31 44 13 54 36 | 29 5 18 30 15 10 52 | |
| | 9 19 42 48 60 54 28 | 22 62 30 39 32 6 16 | |
| | 43 30 38 43 60 33 8 | 60 57 52 61 53 8 3 | |
| | 26 27 11 50 27 31 16 | 14 59 16 43 29 52 51 | |
| | 51 12 17 63 17 11 30 | 46 14 24 51 41 21 6 | |
| | 63 22 48 8 39 17 45 | 39 64 14 33 23 17 9 | |
| | 38 32 36 14 40 5 30 | 38 40 33 52 11 9 10 | |
| | 4 46 23 24 52 34 1 | 16 10 19 53 37 14 62 | |
| | 58 11 30 27 23 4 44 | 9 51 38 39 62 28 44 | |
| | 11 19 43 62 36 19 15 | 12 38 12 57 28 35 12 | |
| | 31 30 22 31 19 3 61 | 64 4 43 58 39 49 53 | |
| | 4 46 49 48 53 31 19 | 59 53 17 15 17 28 38 | |
| | 47 48 19 33 14 13 50 | 31 27 45 64 22 52 22 | |
| | 11 22 19 58 54 4 25 | 52 2 55 18 8 33 6 | |
| | 34 27 62 15 1 50 8 | 38 13 54 13 63 25 22 | |
| | 17 36 5 54 53 44 30 | 44 32 57 63 50 46 10 | |
| | 57 13 36 35 6 48 7 | 39 44 26 56 25 18 5 | |
| | 31 34 48 26 30 32 6 | 35 31 59 30 61 56 26 | |
| | 60 41 43 61 32 64 31 | 56 13 12 35 49 43 16 | |
| | 1 4 59 7 37 5 47 17 | 15 49 9 60 10 32 54 | |
| | 41 13 49 42 24 26 35 | 5 41 28 32 55 45 33 | |
| | 13 36 63 50 39 1 49 | 54 27 13 20 64 37 26 | |
| | 43 64 35 43 40 24 52 | 54 62 60 8 57 14 13 | |
| | 63 64 25 29 35 60 52 | 26 34 34 31 23 1 46 | |
| | 42 18 24 47 64 29 10 | 42 22 10 34 6 7 43 | |
| | 51 37 39 37 14 34 40 | 11 57 11 45 13 27 26 | |
| | 33 9 36 13 27 45 27 | 24 34 43 31 44 55 64 | |
| | 36 39 49 16 39 51 26 | 53 44 12 48 14 52 48 | |
| | 36 51 28 9 46 1 61 | 51 33 19 61 23 52 50 | |
| | 50 14 32 36 52 8 25 | 17 40 50 42 13 24 59 | |
| | 64 64 32 51 | 57 27 62 12 62 21 61 | |
| Ncb = 3, Nifft = 1536 | 1 3 57 35 3 5 10 22 | 42 34 39 23 15 59 56 | PAPR1536: 2.4730 |
| | 55 35 18 62 44 4 50 | 9 51 8 23 29 50 4 | PAPR2048: 2.4867 |
| | 9 44 59 27 8 42 14 | 25 50 39 64 36 6 57 | PAPR4096: 2.4867 |
| | 60 4 24 12 51 7 7 | 4 30 50 25 15 61 53 | |
| | 16 36 47 12 1 21 4 | 58 1 25 4 26 32 1 | |
| | 32 63 23 2 14 7 41 | 4 22 22 28 16 48 12 | |
| | 56 53 37 29 44 5 34 | 54 10 21 59 17 52 53 | |
| | 53 40 4 37 46 31 64 | 9 57 58 38 35 20 36 | |
| | 41 23 32 42 26 15 18 | 4 9 59 63 7 60 40 | |
| | 14 63 6 59 62 18 1 | 23 51 30 56 60 12 1 | |
| | 17 15 63 14 48 23 56 | 19 50 48 21 44 11 22 | |
| | 23 1 55 15 53 12 43 | 60 37 38 48 40 19 45 | |
| | 36 10 22 56 7 43 15 | 19 6 54 38 8 7 56 | |
| | 1 7 34 62 25 2 43 31 | 61 19 52 11 49 52 44 | |
| | 64 62 28 61 41 9 63 | 53 33 58 38 54 7 8 | |
| | 28 44 34 46 43 62 6 | 12 24 18 48 44 37 51 | |
| | 20 27 28 49 12 64 14 | 38 8 6 9 37 48 59 | |
| | 59 26 10 63 43 17 31 | 1 23 36 25 33 60 43 | |
| | 39 16 1 41 31 10 6 | 44 41 32 11 33 58 6 | |
| | 42 45 41 8 63 56 54 | 23 30 27 24 12 45 34 | |
| | 5 44 60 48 58 60 56 | 63 35 12 4 24 8 5 | |
| | 3 50 63 27 21 62 37 | 13 14 46 48 36 30 13 | |
| | 18 57 1 15 48 7 39 | 25 55 31 58 11 38 50 | |
| | 3 44 62 22 59 44 22 | 17 25 55 36 15 46 16 | |
| | 5 14 1 9 39 16 8 62 | 64 28 25 6 17 25 28 | |

TABLE 3-continued

| Nifft = (Nominal IFFT size) | Sleft | Sright | PAPRN (N is the IFFT size used at transmitter) |
|---|---|---|---|
| | 21 31 49 2 3 30 59 | 56 38 53 59 16 56 6 | |
| | 45 44 11 56 34 1 21 | 42 52 50 18 51 3 10 | |
| | 40 50 1 48 29 63 51 | 20 33 58 18 64 48 28 | |
| | 49 8 41 53 38 33 29 | 51 8 49 41 15 40 59 | |
| | 59 12 48 46 36 13 32 | 63 8 28 26 9 19 8 | |
| | 53 11 12 49 24 4 2 | 40 40 59 18 35 21 3 | |
| | 16 7 33 39 51 58 10 | 27 40 54 4 54 64 2 | |
| | 57 29 23 64 59 32 13 | 34 20 43 24 35 13 64 | |
| | 25 51 55 24 6 22 39 | 12 40 59 56 12 25 26 | |
| | 39 45 23 3 34 10 2 | 9 36 21 62 14 20 62 | |
| | 19 31 58 22 55 4 5 | 33 13 33 41 41 37 48 | |
| | 16 30 41 22 10 20 40 | 39 37 16 21 27 56 64 | |
| | 50 1 50 36 27 63 59 | 42 46 44 55 6 12 51 | |
| | 54 27 64 9 43 55 3 | 58 41 34 36 43 36 39 | |
| | 63 57 46 39 40 35 29 | 38 41 12 2 14 52 60 | |
| | 54 42 30 19 47 28 46 | 46 16 36 64 12 40 53 | |
| | 59 9 53 31 8 57 29 | 22 22 45 35 38 1 29 | |
| | 54 16 63 11 50 24 3 | 46 6 1 4 21 13 10 | |
| | 36 21 37 63 1 23 55 | 10 10 19 33 61 25 11 | |
| | 23 49 1 16 44 47 4 | 64 10 54 28 7 31 62 | |
| | 14 10 26 63 2 14 3 | 14 35 44 30 48 33 9 | |
| | 44 8 52 23 42 63 56 | 14 63 59 58 59 19 20 | |
| | 60 1 18 8 54 35 51 | 21 43 52 5 4 2 9 | |
| | 37 25 8 48 11 37 8 | 37 8 29 22 16 58 29 | |
| | 25 29 43 45 53 50 56 | 29 45 18 29 61 34 33 | |
| | 61 36 37 1 2 36 33 | 18 20 17 57 62 42 37 | |
| | 19 16 4 10 12 49 4 | 16 17 22 48 32 56 11 | |
| | 7 19 17 63 14 52 63 | 12 31 52 45 18 9 30 | |
| | 40 56 55 7 34 60 63 | 46 30 36 64 38 22 31 | |
| | 41 29 17 57 57 16 22 | 18 44 40 64 22 41 45 | |
| | 26 34 51 18 33 17 47 | 17 60 48 59 53 39 12 | |
| | 14 46 51 35 46 18 11 | 26 53 18 52 57 32 4 | |
| | 57 59 9 1 57 34 40 | 26 52 31 2 3 7 61 | |
| | 43 31 19 18 64 54 36 | 30 31 18 48 30 6 16 | |
| | 24 50 59 31 41 4 41 | 46 63 35 28 29 60 38 | |
| | 35 25 5 47 25 6 18 | 28 64 10 5 7 55 36 | |
| | 55 26 7 48 28 64 7 | 42 17 36 27 22 42 58 | |
| | 52 34 16 51 41 28 12 | 44 55 1 34 9 14 50 | |
| | 28 29 39 36 42 14 59 | 37 22 8 4 44 35 63 | |
| | 41 41 40 51 64 58 9 | 58 51 48 33 55 32 32 | |
| | 60 19 19 56 4 16 48 | 4 23 10 51 9 58 58 | |
| | 43 11 26 60 1 28 1 | 60 50 7 44 22 39 62 | |
| | 48 24 38 58 19 9 27 | 36 53 33 62 19 61 49 | |
| | 12 21 46 48 5 62 22 | 21 39 56 56 5 39 32 | |
| | 50 8 2 44 62 31 23 | 44 4 35 49 38 37 21 | |
| | 13 35 23 56 45 1 53 | 16 48 3 37 54 44 35 | |
| | 51 57 29 51 53 48 48 | 55 3 48 21 56 51 12 | |
| | 27 20 57 23 47 60 4 | 26 52 31 50 49 55 63 | |
| | 32 62 24 30 20 11 | 43 47 25 62 15 20 47 | |
| | 41 20 32 13 22 37 40 | 1 31 20 43 4 9 45 | |
| | 16 15 24 64 49 33 40 27 | 62 60 42 49 7 62 48 | |
| | 45 52 28 43 56 12 10 | 17 1 12 15 39 43 37 | |
| | 7 7 31 36 9 38 62 43 | 32 35 29 29 2 58 5 | |
| | 2 17 16 41 3 19 6 50 | 24 16 43 50 5 36 39 | |
| | 18 24 17 25 26 14 32 | 55 45 11 58 39 52 16 | |
| | 8 25 25 61 52 20 58 | 12 23 62 16 59 18 2 | |
| | 48 19 18 6 61 63 50 | 31 3 6 55 37 19 52 | |
| | 18 3 9 64 50 15 47 | 32 8 10 25 19 5 62 | |
| | 58 21 38 24 38 53 13 | 7 12 57 4 29 26 26 | |
| | 50 43 | 49 50 3 59 3 27 13 | |
| Ncb = 3, Nifft = 2048 | 1 60 62 13 54 60 11 | 41 28 3 15 5 42 7 | PAPR1536: 2.6508 |
| | 62 33 24 29 27 63 24 | 17 6 9 44 63 33 15 | PAPR2048: 2.5587 |
| | 63 57 1 10 22 22 19 | 60 55 58 37 60 18 45 | PAPR4096: 2.5587 |
| | 35 39 49 38 62 48 29 | 19 17 55 6 62 2 38 | |
| | 5 50 9 18 61 52 45 | 7 23 60 6 39 33 24 | |
| | 54 15 16 25 38 58 10 | 28 32 4 32 3 60 46 | |
| | 13 33 8 50 22 64 29 | 12 10 5 60 10 55 8 | |
| | 47 33 30 33 38 48 16 | 9 64 44 58 30 38 16 | |
| | 23 27 61 37 55 10 1 | 37 41 45 20 39 21 16 | |
| | 38 56 34 53 40 26 54 | 18 45 28 1 10 33 29 | |
| | 49 57 22 4 54 51 10 | 17 5 30 32 59 53 22 | |
| | 45 7 13 60 32 61 8 | 44 37 33 3 33 51 51 | |
| | 64 13 8 51 49 49 3 | 64 10 23 32 17 39 44 | |
| | 58 18 3 22 42 4 28 | 61 54 9 16 48 10 33 | |
| | 1 55 9 16 39 19 63 | 53 61 9 59 9 64 26 | |
| | 46 31 54 14 40 37 10 | 8 39 63 61 51 46 45 | |
| | 63 40 25 22 23 51 10 | 29 43 47 28 21 29 64 | |
| | 12 13 14 33 57 48 1 | 31 18 1 57 60 57 40 | |
| | 41 22 23 11 7 23 38 | 49 20 41 12 58 36 9 | |
| | 22 46 40 6 30 63 30 | 61 53 43 12 24 37 52 | |
| | 34 30 1 26 46 33 59 | 34 62 15 48 52 52 60 | |
| | 64 23 1 27 31 48 34 | 49 35 51 37 1 62 30 | |
| | 59 34 53 30 58 45 55 | 46 61 6 48 51 64 27 | |
| | 50 10 20 19 21 61 32 | 51 62 62 11 57 29 35 | |
| | 19 48 61 27 42 46 16 | 31 20 51 24 3 17 2 | |
| | 20 12 12 59 15 55 18 | 43 46 44 2 60 54 29 | |
| | 23 32 7 54 38 34 46 | 35 57 15 32 38 54 28 | |
| | 37 58 30 29 28 36 53 | 42 33 36 19 53 5 1 | |
| | 40 57 43 61 1 63 18 | 63 64 2 44 33 53 11 | |
| | 9 61 28 9 16 48 15 | 4 9 34 5 43 35 8 4 | |
| | 63 13 33 52 61 61 43 | 48 56 45 44 26 59 27 | |
| | 49 49 53 3 18 9 2 8 | 4 7 48 39 27 8 37 | |
| | 11 46 10 12 11 34 34 | 57 54 36 8 31 18 51 | |
| | 26 38 18 19 36 14 35 | 30 30 32 1 34 54 63 | |
| | 16 45 40 36 46 56 63 | 24 57 61 17 58 22 50 | |
| | 23 22 62 9 18 43 47 | 47 60 41 34 39 53 49 | |
| | 36 61 26 4 13 48 23 | 3 28 61 17 19 40 62 | |
| | 59 17 22 34 17 52 27 | 22 28 24 4 4 40 55 | |
| | 6 3 51 51 34 47 49 | 3 50 55 21 4 61 5 | |
| | 26 9 1 18 48 56 42 | 58 37 55 27 26 1 64 | |
| | 37 11 62 36 6 51 3 | 5 44 26 33 49 29 3 | |
| | 62 60 49 13 21 63 7 | 33 14 22 38 42 20 16 | |
| | 17 12 12 64 62 45 24 | 56 29 54 46 33 18 45 | |
| | 53 3 37 2 2 56 10 | 4 17 40 30 5 64 63 | |
| | 41 54 61 41 19 37 15 | 20 58 27 12 3 28 11 | |
| | 46 32 50 31 32 38 7 | 4 58 58 10 3 1 32 | |
| | 6 56 8 7 13 36 37 16 | 12 42 56 40 46 42 2 | |
| | 63 14 35 17 33 55 29 | 20 10 55 26 62 11 47 | |
| | 54 30 26 53 54 9 56 | 61 5 34 47 51 11 17 | |
| | 45 14 58 7 40 30 51 | 42 46 20 41 50 35 63 | |
| | 9 59 31 46 64 47 40 | 60 54 4 11 55 39 43 | |
| | 4 9 26 50 19 42 3 12 | 31 11 60 64 33 34 4 | |
| | 7 44 31 14 6 32 42 | 34 16 57 58 8 13 40 | |
| | 17 31 45 40 50 33 22 | 31 43 32 1 13 20 60 | |
| | 15 52 5 35 45 48 45 | 39 62 26 38 13 57 40 | |
| | 8 60 7 54 45 62 35 | 31 6 53 23 2 43 45 | |
| | 19 40 41 20 27 31 16 | 13 47 18 25 20 61 30 | |
| | 52 31 21 32 10 52 54 | 27 7 6 57 28 55 15 | |
| | 23 10 31 28 57 41 12 | 4 36 20 24 19 22 60 | |
| | 2 54 64 18 64 60 21 | 55 39 22 57 52 10 14 | |
| | 43 29 55 38 6 25 30 | 63 1 4 52 32 46 45 | |
| | 64 40 53 41 47 34 46 | 7 9 21 51 14 41 21 | |
| | 25 49 63 3 19 42 41 | 7 14 44 19 26 22 19 | |
| | 54 32 13 40 61 51 23 | 44 24 6 33 63 35 18 | |
| | 21 6 49 1 7 32 33 4 | 14 47 13 15 31 4 6 | |
| | 39 61 19 16 17 30 15 | 49 7 44 62 28 27 29 | |
| | 63 23 58 1 49 16 16 | 16 64 5 31 2 60 7 | |
| | 27 36 7 14 37 7 27 | 22 21 41 61 31 55 44 | |
| | 25 59 56 35 8 9 54 | 35 16 59 60 26 32 25 | |
| | 41 9 14 29 3 33 29 | 10 18 18 55 33 53 10 | |
| | 35 61 28 64 49 12 34 | 62 5 15 39 53 58 28 | |
| | 9 19 57 44 35 11 5 | 26 53 55 27 35 63 33 | |
| | 46 28 19 54 3 6 30 | 12 45 38 56 15 3 12 | |
| | 45 30 14 55 56 51 60 | 64 35 45 48 16 5 56 | |
| | 41 44 41 6 33 26 20 | 24 42 44 17 3 42 47 | |
| | 52 8 5 10 13 42 3 | 37 43 42 27 45 33 59 | |
| | 34 51 60 48 4 29 8 | 30 27 25 3 41 26 46 | |
| | 2 46 58 64 46 35 26 | 45 33 50 12 31 14 23 | |
| | 25 56 19 53 11 34 48 | 28 20 26 21 30 55 19 | |
| | 64 22 17 8 43 60 35 | 37 5 14 37 4 13 17 | |
| | 54 16 46 50 64 19 56 | 9 34 21 1 45 9 42 | |
| | 63 30 19 3 44 54 11 | 58 6 43 34 10 50 10 | |
| | 47 12 15 31 6 44 47 | 1 61 32 23 20 15 56 | |
| | 61 7 40 42 58 62 61 | 53 41 55 6 12 11 43 | |
| | 21 1 1 | 42 56 13 22 43 43 | |
| Ncb = 4, Nifft = 2048 | 1 10 4 40 27 50 47 | 2 11 58 48 48 53 25 | PAPR2048: 0.9784 |
| | 53 17 58 7 16 25 43 | 1 27 43 62 29 11 15 | |
| | 7 32 27 17 34 52 10 | 61 23 53 24 42 50 58 | |
| | 43 16 33 3 35 32 50 | 9 11 39 37 5 23 29 | |
| | 23 34 31 60 60 14 14 | 39 32 52 23 16 46 15 | |

TABLE 3-continued

| Nifft = (Nominal IFFT size) | Sleft | Sright | PAPRN (N is the IFFT size used at transmitter) |
|---|---|---|---|
| | 17 53 15 26 25 12 21 | 50 30 20 4 35 31 30 | |
| | 52 2 35 40 43 57 26 | 57 11 49 19 21 44 26 | |
| | 19 3 60 9 1 29 27 8 | 54 58 35 58 50 64 43 | |
| | 49 20 15 27 57 21 45 | 49 17 41 20 45 50 33 | |
| | 18 3 34 46 47 12 63 | 46 21 62 64 34 50 4 | |
| | 57 25 56 52 32 17 13 | 41 56 10 49 16 35 21 | |
| | 12 50 5 17 15 38 17 | 2 1 1 10 48 63 8 | |
| | 20 5 15 47 10 15 25 | 26 4 41 59 48 36 54 | |
| | 39 39 29 44 60 53 42 | 21 38 20 12 39 53 25 | |
| | 26 10 25 3 20 46 60 | 62 56 15 61 30 34 38 | |
| | 41 13 12 41 19 50 49 | 54 43 6 15 4 62 4 | |
| | 61 28 56 3 23 20 57 | 36 4 53 59 40 35 49 | |
| | 29 29 15 15 52 4 26 | 36 38 58 42 34 58 39 | |
| | 16 55 17 8 41 45 32 | 19 33 18 13 19 54 11 | |
| | 34 55 58 64 27 44 3 | 34 37 10 61 15 5 47 | |
| | 59 22 33 15 14 15 32 | 21 16 47 54 16 41 9 | |
| | 49 35 57 26 51 39 26 | 40 48 58 39 56 64 43 | |
| | 49 34 1 52 29 35 27 | 12 42 21 38 37 34 41 | |
| | 5 56 9 50 64 33 47 5 | 20 8 20 60 59 36 20 | |
| | 13 18 44 31 9 12 3 | 30 25 46 4 44 7 13 | |
| | 10 23 10 26 3 30 28 | 28 47 54 33 4 42 5 | |
| | 47 4 13 42 30 49 17 | 47 15 54 36 47 29 25 | |
| | 39 22 58 59 25 43 60 | 36 8 53 46 54 59 47 | |
| | 47 32 39 25 18 8 35 | 6 1 41 22 16 40 54 | |
| | 22 26 63 60 16 41 3 | 5 44 10 46 8 44 23 | |
| | 45 44 37 22 51 64 41 | 58 27 64 33 19 6 43 | |
| | 55 53 35 50 27 27 6 | 21 24 3 9 62 53 58 | |
| | 13 59 37 31 25 11 6 | 38 30 45 37 44 35 51 | |
| | 11 50 10 50 33 51 35 | 42 31 8 36 37 47 8 | |
| | 5 41 39 26 6 17 25 | 39 23 19 18 34 42 24 | |
| | 48 45 1 60 64 37 13 | 31 41 17 16 25 58 36 | |
| | 36 25 54 14 27 39 58 | 11 61 3 9 10 25 44 | |
| | 23 50 56 30 23 30 40 | 6 63 51 2 28 56 33 | |
| | 41 52 7 14 29 54 58 | 41 59 16 6 11 10 18 | |
| | 64 55 50 16 15 35 8 | 39 46 36 22 48 23 45 | |
| | 35 61 50 55 53 8 33 | 39 35 29 14 33 43 44 | |
| | 9 42 44 10 15 44 30 | 20 42 55 25 39 12 8 | |
| | 2 60 56 20 5 47 62 | 7 56 20 9 50 25 18 | |
| | 54 6 51 43 35 63 1 | 16 27 51 14 11 57 58 | |
| | 34 56 33 58 33 25 38 | 58 30 31 5 31 6 22 | |
| | 34 30 51 16 35 50 44 | 52 38 53 7 12 49 16 | |
| | 37 35 37 64 8 10 39 | 22 9 9 37 35 33 62 | |
| | 28 18 18 19 12 16 41 | 14 55 10 62 50 25 9 | |
| | 44 26 15 28 40 43 32 | 45 31 31 46 52 39 31 | |
| | 14 9 42 63 47 30 58 | 2 42 56 44 26 21 31 | |
| | 32 35 18 32 21 11 43 | 9 41 48 36 5 24 44 | |
| | 55 64 55 11 12 27 20 | 30 44 28 63 55 24 64 | |
| | 55 38 23 50 59 21 24 | 5 34 20 14 58 27 38 | |
| | 62 48 9 25 48 4 21 | 16 25 17 34 43 31 32 | |
| | 40 22 16 8 18 21 12 | 9 27 32 48 42 49 57 | |
| | 37 39 9 10 20 55 62 | 40 46 16 55 36 47 19 | |
| | 1 28 13 28 29 26 59 | 11 11 45 9 44 19 6 | |
| | 31 7 33 21 30 3 32 | 21 33 9 46 1 55 62 | |
| | 35 17 45 21 17 2 19 | 25 51 30 53 7 56 19 | |
| | 42 10 20 31 30 39 60 | 34 27 24 47 13 1 31 | |
| | 4 10 15 16 30 51 17 | 30 47 61 60 51 40 42 | |
| | 50 35 2 21 7 19 40 | 12 32 35 44 6 22 48 | |
| | 25 52 23 57 11 43 3 | 61 16 47 54 54 15 31 | |
| | 56 32 31 62 49 5 30 | 10 48 51 24 3 7 6 | |
| | 58 44 26 9 58 40 48 | 7 15 48 50 12 47 32 | |
| | 22 24 36 15 43 46 26 | 23 63 55 38 27 31 56 | |
| | 3 57 18 44 51 61 57 | 51 57 11 55 32 29 | |
| | 39 48 50 11 54 64 50 | 7 14 24 14 54 61 25 | |
| | 32 10 63 6 5 10 25 | 42 41 4 35 5 50 64 | |
| | 23 31 60 56 20 44 3 | 5 23 27 25 51 26 25 | |
| | 62 16 6 55 36 55 41 | 37 19 16 40 58 60 51 | |
| | 37 43 28 56 28 21 13 | 1 33 23 6 51 30 58 | |
| | 43 39 4 1 37 54 53 | 14 43 43 14 54 29 7 | |
| | 46 9 58 30 20 50 29 | 38 44 36 8 46 46 32 | |
| | 57 8 23 61 34 31 34 | 39 45 41 6 4 28 | |
| | 46 20 56 35 25 28 37 | 56 58 58 56 33 12 48 | |
| | 60 25 8 53 49 15 49 | 46 38 7 37 1 2 37 | |
| | 9 43 47 60 43 19 57 | 29 21 43 9 2 19 53 | |
| | 3 52 7 60 46 10 56 | 53 33 47 3 17 48 61 | |
| | 49 13 14 54 13 18 53 | 32 5 36 26 35 40 60 | |
| | 17 45 30 25 37 47 3 | 50 52 52 27 4 23 10 | |
| | 9 54 3 24 7 36 7 62 | 10 2 54 30 15 18 19 | |
| | 31 26 57 33 53 12 46 | 52 29 11 10 50 64 57 | |
| | 56 46 2 22 26 42 54 | 46 21 44 11 53 20 8 | |
| | 23 63 11 10 14 55 61 | 25 59 2 20 50 56 27 | |
| | 19 42 19 32 53 45 11 | 34 25 61 57 61 1 2 | |
| | 5 22 25 16 38 11 41 | 40 50 5 28 32 28 53 | |
| | 40 31 26 9 33 3 29 | 61 7 6 33 56 22 21 | |
| | 33 24 34 61 21 14 26 | 5 36 26 3 41 1 48 | |
| | 47 12 56 41 23 58 21 | 46 20 29 5 36 41 47 | |
| | 49 62 47 9 18 10 49 | 9 45 62 20 37 46 32 | |
| | 13 8 63 28 48 29 26 | 44 63 56 31 31 34 50 | |
| | 43 9 5 61 55 58 3 8 | 55 54 25 55 62 36 40 | |
| | 4 36 2 48 2 45 29 41 | 49 42 25 51 53 26 35 | |
| | 42 13 39 15 9 12 13 | 60 17 11 31 25 12 15 | |
| | 32 7 51 2 30 55 49 | 43 42 11 33 48 34 34 | |
| | 52 49 56 11 58 30 17 | 62 47 47 63 60 52 4 | |
| | 17 4 32 25 1 24 53 | 5 45 59 63 41 42 13 | |
| | 24 50 50 48 42 4 38 | 9 25 64 22 59 59 62 | |
| | 56 50 15 27 51 53 31 | 22 30 42 52 19 3 45 | |
| | 27 22 9 16 34 63 43 | 24 6 16 20 14 52 64 | |
| | 19 13 15 38 63 57 11 | 23 17 21 58 31 24 4 | |
| | 38 19 6 19 48 37 19 | 2 20 23 61 35 56 25 | |
| | 54 20 54 24 11 11 3 | 21 64 17 24 56 7 45 | |
| | 59 1 33 47 54 5 57 | 38 49 46 18 63 7 21 | |
| | 45 7 60 39 18 17 23 | 49 16 8 57 47 45 57 | |
| | 3 56 55 6 11 42 60 | 51 36 16 55 59 9 1 | |
| | 53 22 40 12 62 62 38 | 11 56 33 48 18 24 46 | |
| | 49 34 27 48 25 17 31 | 5 11 25 42 23 32 19 | |
| | 29 12 47 27 7 23 61 | 48 48 55 4 15 16 18 | |
| | 51 25 40 18 53 27 15 | 4 4 24 27 45 45 38 | |
| | 17 10 7 58 21 53 53 | 32 21 47 32 22 7 29 | |
| | 45 11 41 21 2 57 39 | 54 34 25 25 4 30 34 | |
| | 23 54 34 43 13 29 5 58 | 36 20 20 50 54 10 27 9 24 8 36 42 53 | |
| Ncb = 4, Nifft = 4096 | 1 19 49 4 30 55 48 | 42 42 28 13 24 58 27 | PAPR2048: 2.6136 |
| | 36 22 60 35 13 12 48 | 15 36 48 63 50 7 38 | PAPR4096: 2.6136 |
| | 52 7 61 32 31 53 29 | 33 11 26 40 48 44 5 | |
| | 19 6 30 35 40 37 15 | 12 13 6 13 4 7 64 | |
| | 55 40 3 64 5 25 63 | 22 8 58 18 5 18 21 | |
| | 9 5 20 41 13 54 62 | 41 21 25 33 50 31 30 | |
| | 20 54 34 57 52 34 24 | 21 1 19 41 49 54 35 | |
| | 43 4 64 60 17 64 43 | 2 46 52 37 64 32 14 | |
| | 51 32 12 46 41 23 49 | 5 12 27 15 21 11 4 | |
| | 1 18 23 16 23 56 27 | 2 38 31 2 51 64 18 | |
| | 22 32 31 7 48 64 61 | 59 42 19 51 46 32 43 | |
| | 6 24 39 48 5 44 33 | 63 2 62 46 46 31 2 | |
| | 62 61 48 41 20 58 34 | 26 58 19 48 54 20 41 | |
| | 37 19 57 6 45 25 57 | 45 32 9 57 34 17 41 | |
| | 23 52 14 50 18 6 54 | 38 9 50 38 33 17 46 | |
| | 40 44 56 54 9 48 33 | 55 19 35 57 31 46 21 | |
| | 14 52 34 32 20 34 27 | 53 12 22 37 14 20 52 | |
| | 25 39 5 27 2 63 12 | 28 37 53 3 15 29 55 | |
| | 9 38 58 4 62 37 21 | 51 54 8 52 45 56 62 | |
| | 52 31 64 47 32 59 59 | 1 22 16 25 34 20 9 | |
| | 55 37 12 57 46 1 5 | 30 2 11 38 40 49 37 | |
| | 32 7 22 50 11 54 26 | 61 57 42 46 18 4 29 | |
| | 51 49 26 22 7 53 50 | 36 23 60 63 14 16 39 | |
| | 19 58 54 13 39 17 25 | 22 43 59 6 54 30 18 | |
| | 8 34 2 41 56 27 59 | 49 5 26 28 18 19 26 | |
| | 23 62 17 63 7 38 59 | 29 18 46 1 55 45 58 | |
| | 39 31 32 58 10 22 8 | 12 52 33 5 28 23 58 | |
| | 35 44 30 1 19 54 38 | 63 4 53 9 43 42 4 | |
| | 49 59 46 7 64 61 61 | 61 4 8 45 24 55 3 | |
| | 45 18 44 38 48 7 10 | 3 22 35 1 24 19 11 | |
| | 32 31 48 13 24 31 39 | 5 54 33 34 36 55 34 | |
| | 31 16 47 18 55 42 21 | 44 38 36 45 17 29 25 | |
| | 34 15 48 10 9 15 24 | 52 29 37 44 1 27 32 | |
| | 45 48 51 12 54 6 60 | 54 26 26 30 28 36 14 | |
| | 48 64 61 8 34 34 41 | 9 39 45 61 6 28 | |
| | 57 62 51 28 25 24 39 | 9 4 41 10 39 26 20 | |
| | 58 56 64 36 52 28 58 | 5 9 13 15 20 26 63 | |
| | 28 59 13 31 2 42 19 | 54 22 10 36 23 60 39 | |
| | 26 46 58 64 3 22 52 | 62 52 47 61 13 52 23 | |
| | 39 26 24 46 18 15 46 | 49 25 57 24 25 29 48 | |

TABLE 3-continued

| Nifft = (Nominal IFFT size) | Sleft | Sright | PAPRN (N is the IFFT size used at transmitter) |
|---|---|---|---|
| | 45 54 24 16 34 16 44 | 50 36 30 29 51 23 57 | |
| | 31 49 54 55 62 6 39 | 62 9 29 20 53 13 11 | |
| | 8 1 23 9 39 49 4 58 | 40 62 27 48 46 17 37 | |
| | 27 47 13 5 58 47 46 | 60 55 37 57 52 10 17 | |
| | 1 37 43 33 34 29 17 | 4 41 20 33 55 57 29 | |
| | 52 18 11 5 26 44 33 | 45 11 54 53 22 20 41 | |
| | 2 17 64 28 64 61 62 | 47 39 22 64 14 4 35 | |
| | 57 48 19 29 30 56 31 | 2 38 2 1 59 10 49 | |
| | 49 46 43 64 31 9 47 | 6 40 53 37 43 38 29 | |
| | 57 9 62 17 2 4 54 | 51 43 5 62 42 63 18 | |
| | 22 63 8 11 7 40 47 | 35 44 44 40 48 38 34 | |
| | 16 56 33 15 48 33 17 | 2 22 34 45 60 51 33 | |
| | 15 30 27 27 7 5 44 | 38 46 44 18 49 31 40 | |
| | 22 21 24 25 35 12 27 | 30 64 15 64 64 5 40 | |
| | 51 2 48 22 38 39 34 | 42 29 43 43 44 31 21 | |
| | 6 49 41 2 19 56 1 25 | 38 22 14 31 57 25 43 | |
| | 3 24 39 45 26 38 12 | 11 36 34 19 21 38 43 | |
| | 57 26 49 17 23 24 40 | 54 14 54 12 50 33 49 | |
| | 58 4 29 27 43 41 6 | 25 40 18 40 8 57 34 | |
| | 47 3 14 15 39 2 59 | 19 12 11 29 20 62 18 | |
| | 17 55 43 29 19 32 33 | 59 37 40 61 37 56 43 | |
| | 3 34 61 51 53 28 24 | 44 20 21 28 7 9 11 | |
| | 2 38 45 35 22 53 42 | 22 8 46 33 39 42 60 | |
| | 34 29 6 46 55 29 39 | 35 27 64 14 35 21 11 | |
| | 44 55 1 32 62 26 22 | 39 55 46 54 47 58 2 | |
| | 23 49 23 20 64 36 58 | 15 18 52 36 47 36 19 | |
| | 49 18 60 28 47 47 25 | 17 5 16 35 17 59 56 | |
| | 10 39 61 56 2 34 38 | 47 5 14 58 5 13 20 | |
| | 30 44 21 6 18 13 40 | 6 60 11 64 59 4 43 | |
| | 42 23 16 34 33 43 47 | 64 45 30 27 7 8 28 | |
| | 46 16 56 50 58 11 25 | 34 64 48 32 44 18 19 | |
| | 62 17 60 5 33 45 47 | 5 21 16 6 55 38 63 | |
| | 63 43 60 46 1 11 24 | 29 44 62 18 26 60 15 | |
| | 27 29 63 40 29 45 59 | 11 43 6 34 19 38 20 | |
| | 40 29 11 33 36 31 55 | 61 23 44 37 17 24 52 | |
| | 34 17 52 31 20 56 43 | 56 38 35 51 19 57 26 | |
| | 1 40 1 19 37 58 19 2 | 33 32 33 15 57 31 39 | |
| | 50 3 51 11 49 6 26 | 59 62 43 44 24 4 58 | |
| | 13 23 57 46 22 60 19 | 12 53 51 23 15 37 47 | |
| | 28 7 17 49 54 21 35 | 44 21 63 1 56 36 54 | |
| | 24 12 48 33 14 30 7 | 40 14 10 7 48 43 44 | |
| | 24 60 39 20 8 57 22 | 37 57 8 28 61 16 47 | |
| | 37 8 55 22 40 30 9 | 12 15 64 57 46 32 43 | |
| | 16 59 47 40 29 37 42 | 12 8 51 61 63 29 6 | |
| | 15 32 60 39 7 53 41 | 2 37 2 16 33 64 61 | |
| | 8 41 14 32 47 12 40 | 16 41 8 20 38 40 38 | |
| | 25 57 44 14 8 33 53 | 30 37 4 14 11 56 35 | |
| | 30 51 18 45 28 46 45 | 64 1 4 3 59 14 25 | |
| | 6 34 5 47 53 56 44 | 28 32 1 46 61 12 46 | |
| | 28 56 7 61 44 16 61 | 54 21 41 51 46 63 63 | |
| | 20 20 62 59 33 54 25 | 14 28 29 53 62 64 5 | |
| | 53 19 19 6 34 22 14 | 4 57 47 23 42 46 1 | |
| | 35 57 14 30 47 35 30 | 61 24 34 41 23 22 61 | |
| | 10 11 20 57 58 47 7 | 52 61 15 15 46 64 31 | |
| | 15 58 3 53 61 45 39 | 54 6 20 54 57 48 28 | |
| | 4 43 60 55 1 9 50 16 | 42 30 40 19 18 32 49 | |
| | 40 39 13 57 16 34 45 | 5 43 31 44 38 64 22 | |
| | 3 42 20 3 61 46 15 | 47 9 16 53 1 39 2 | |
| | 51 19 23 34 42 8 54 | 42 5 30 36 60 10 42 | |
| | 57 16 12 1 14 41 21 | 43 60 60 5 63 47 39 | |
| | 51 53 3 41 19 8 29 | 35 63 40 49 22 19 14 | |
| | 48 7 33 27 10 34 58 | 40 49 63 54 30 28 30 | |
| | 15 39 33 12 33 43 30 | 12 56 2 52 7 4 55 | |
| | 64 7 14 51 20 31 35 | 45 42 37 27 64 24 60 | |
| | 16 15 17 43 32 28 24 | 17 54 17 7 30 14 7 | |
| | 4 6 48 3 58 1 62 17 | 16 38 40 62 1 38 39 | |
| | 25 15 34 6 10 16 48 | 11 64 45 20 24 61 64 | |
| | 30 11 6 55 1 32 46 | 16 31 52 40 9 37 58 | |
| | 17 7 64 63 37 1 12 | 16 23 50 13 32 19 27 | |
| | 55 21 20 21 29 56 34 | 63 10 42 47 31 27 47 | |
| | 51 45 16 12 30 19 63 | 59 28 24 40 15 19 50 | |
| | 21 46 17 36 45 22 49 | 61 27 29 15 50 56 21 | |
| | 40 13 57 31 24 27 24 | 43 18 23 25 46 40 27 | |
| | 61 35 36 54 26 31 17 42 | 37 45 17 6 53 59 33 8 63 41 3 60 46 | |

Figure 19:
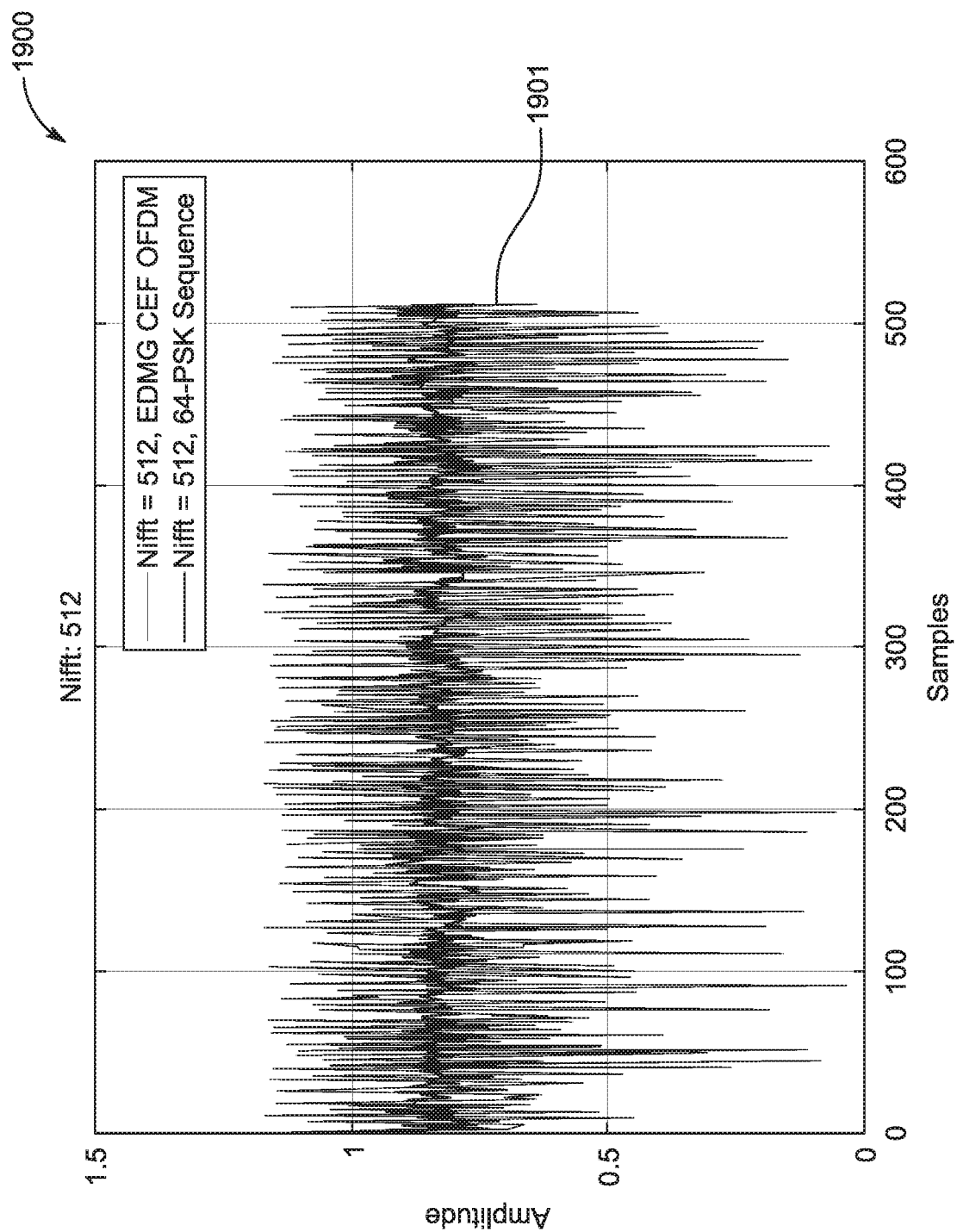
FIG. 19 is a diagram of an example of temporal characteristics in time domain for different cases.
Figure 20:
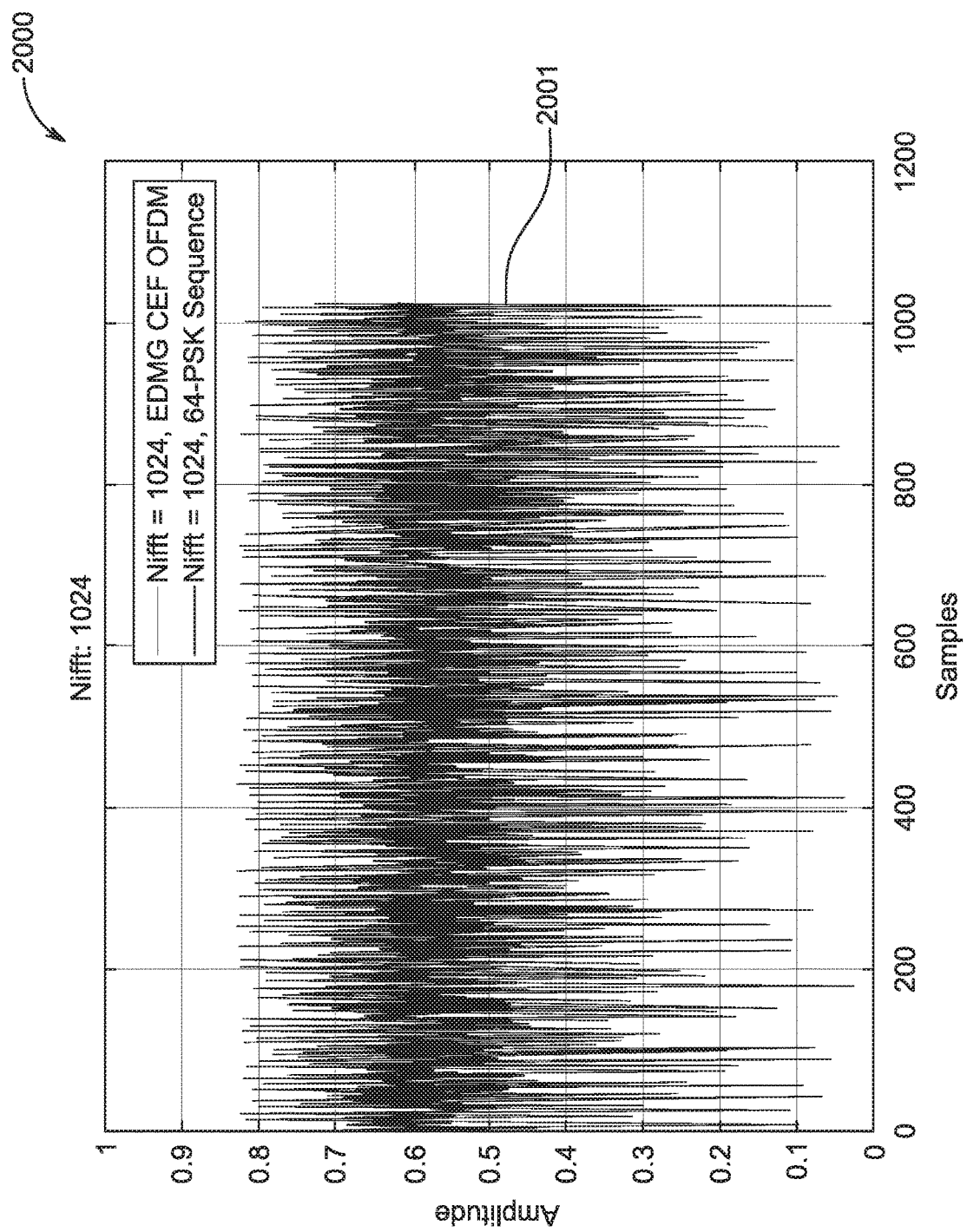
FIG. 20 is a diagram of an example of temporal characteristics in time domain for different cases.

A comparison between the existing sequences for CEF of 802.11ay and suggested 64-PSK sequences is provided by showing temporal characteristics in time domain for different cases in FIG. 19 and FIG. 20. For the example chart 1900 shown in FIG. 19 Ncb=1, Nifft=512 (Nominal) and the temporal characteristics in the time domain are shown by 1901. For the example chart 2000 shown in FIG. 20 Ncb=1, Nifft=1024 (Nominal) and the temporal characteristics in the time domain are shown by 2001.

Figure 21:
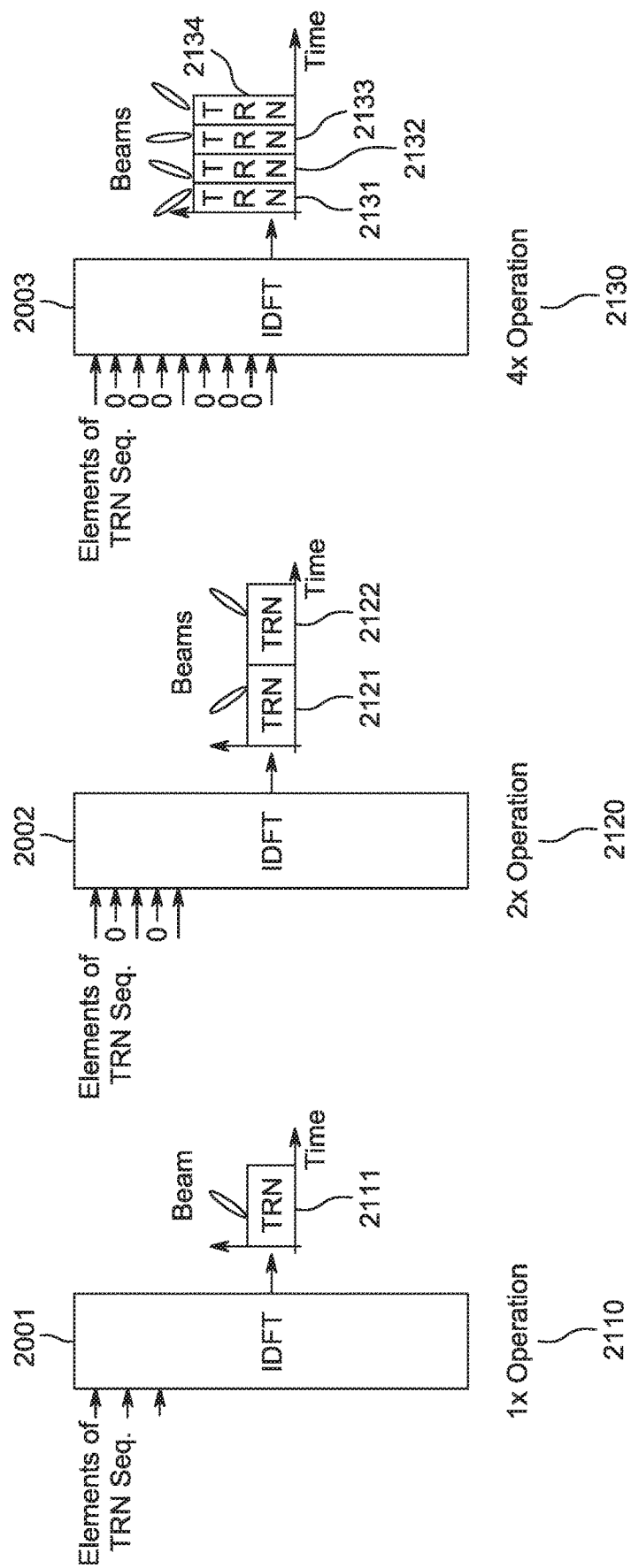
FIG. 21 is a diagram of an example of flexible TRN generation with OFDM and beams.

FIG. 21 shows a diagram of an example of flexible TRN generation with OFDM and beams. According to an implementation, TRN may be configurable such that the output of OFDM symbol may include repetitions. Accordingly, the TRN sequence may be interleaved in the frequency domain, such as, before IDFT operation (2001/2002/2003). The beam may change depending on the interleaving factor. For example, 1× 2110, 2× 2120, and 4× 2130 operations are illustrated in FIG. 21. While 1× 2110 generates only one TRN 2111 in time, 2× 2120 and 4× 2130 generate two 2121/2122 and four 2131/2132/2133/2134 TRN in the time domain, respectively, and the beam on each TRN may be changed. The configuration of TRN may be set through the bit that corresponds to "TRN Subfield Sequence Length" of the 802.11ay EDMG header. The values related to M, N, P described in 802.11ay EDMG header may be a function of the interleaving factor.

Figure 22:
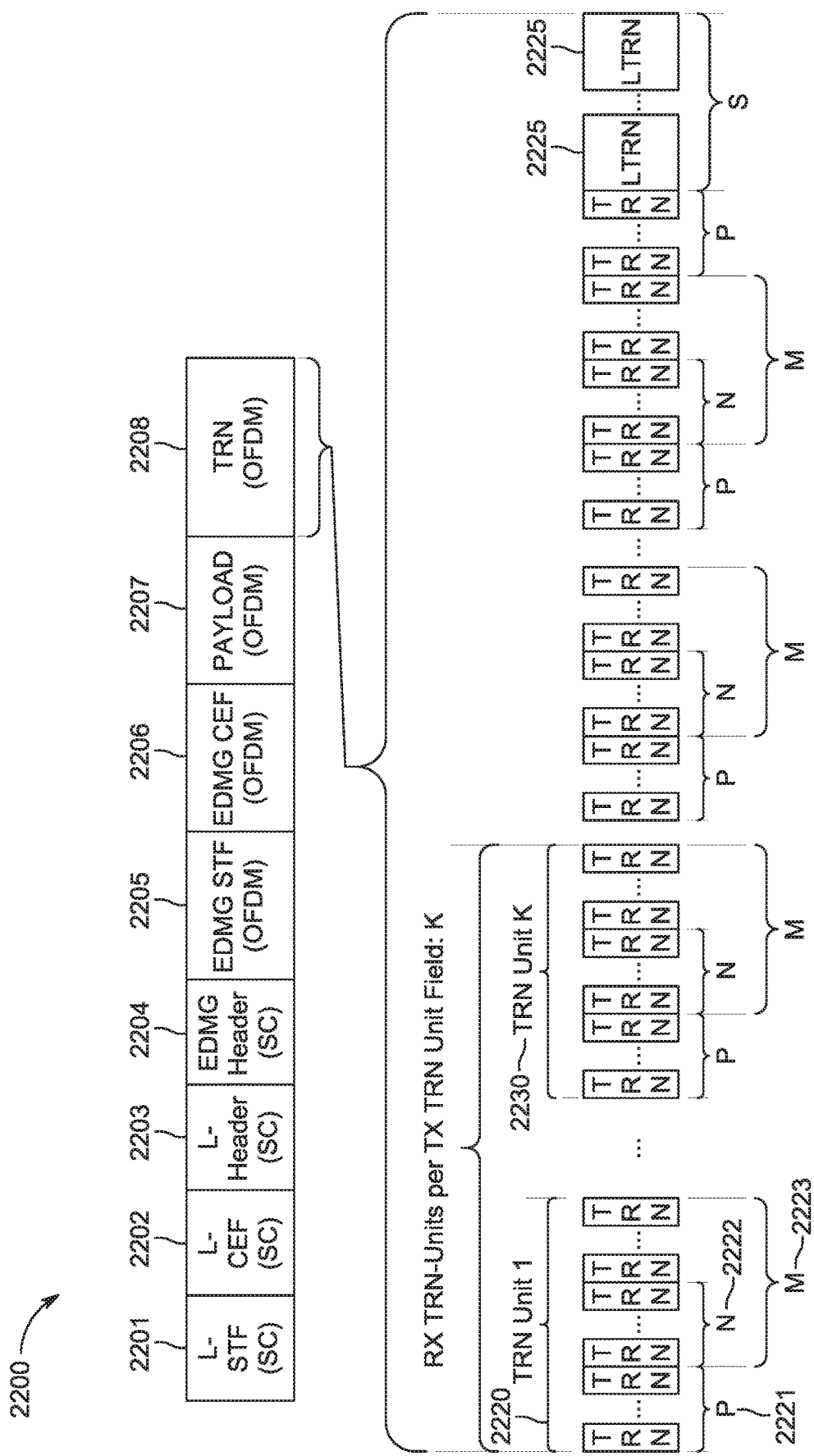
FIG. 22 is a diagram of an example of TRN structure for hardware non-linearities.

FIG. 22 shows a diagram of an example of a TRN structure of an implementation where the TRN field may include another field, called linearity training field (LTRN) 2225 to allow the receiver to estimate the non-linearity in the link. As shown, PPDU 2200 includes an L-STF (SC) 2201, a L-CEF (SC) 2202, a L-Header (SC) 2203, an EDMG Header (SC) 2204, a EDMG STF (OFMD) 2205, an EDMG CEF (OFMD) 2206, a Payload (OFDM) 2207, a TRN (OFDM) 2208, TRN Units including TRN Unit 1 2220 through TRN Unit K 2230 where RX TRN-Units per TX TRN Unit Field: K and which include parameters P 2221, N 2222, and M 2223. The LTRN field 2225 may contain two different reference symbols to estimate AM-AM and AM-PM nonlinearity (not shown). The number of LTRN fields 2225 may be indicated in the header (2203/2204) or it may be a receive capability that is indicated prior to the transmission. The initiator may ask the responder to send LTRN fields 2225. The LTRN fields 2225 may be a function of a modulation and coding scheme (MCS) table and the sequence content may be a function of the modulation symbols. For example, the elements of the sequence for LTRN field 2225 may be modulation symbols (e.g., 64 QAM). The frequency domain sequence may be precoded with a DFT operation. LTRN signals may be a chirp signal or amplitude-varying signal. The feedback for LTRN may indicate the non-linearity function in the channel (e.g., PA non-linearity).

Figure 23:
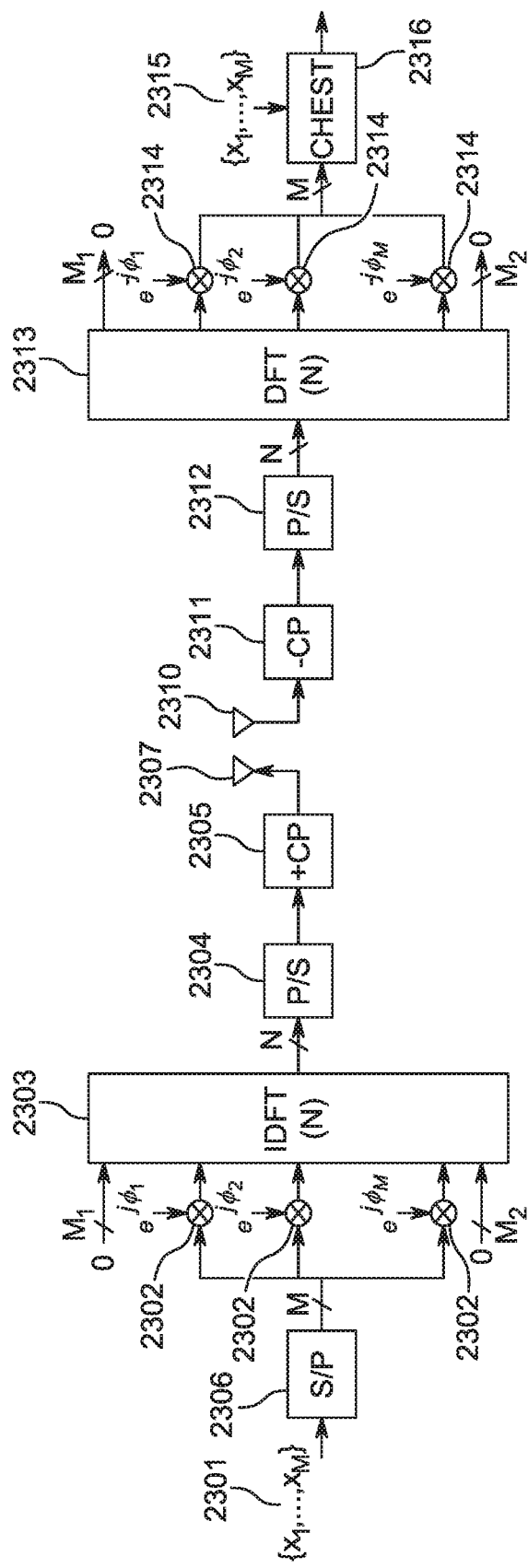
FIG. 23 is a diagram of an example of transmission and reception of CEF with phase rotations.

FIG. 23 shows a diagram of an example transmission and reception of CEF with phase rotations. The CEF for OFDM PHY in 802.11ay may be defined as shown in Table 1. The PAPR of such a signal may be further reduced by applying a set of phase rotations $\{\phi_1, \phi_2, \ldots, \phi_M\}$ 2302 to the CEF symbols $\{x_1, x_2, \ldots, x_M\}$ 2301 at the input of IDFT via S/P 2306. The phase rotations may be selected such that the PAPR at the output of IDFT 2303 is minimized. The output of the IDFT 2303 may be provided to the P/S 2304, the +CP 2305 and transmitted via antenna 2307. FIG. 23 includes the receiver structure such that the transmission from antenna 2307 is received by receive antenna 2310 and provided to the −CP 2311, then the P/S 2312 and to the DFT 2313. Phase rotations 2314, reciprocal to the phase rotations 2302, may be applied to the output of the DFT 2313 and may be provided to the Channel Estimation (CHEST) 2316. Note that in FIG. 23, M may be the size of CEF and the FFT size mahy be N=M+M_1+M_2. Equivalently, the CEF in Table 1, $\{x_1, x_2, \ldots, x_M\}$, may be redefined as $\{x_1 e^{j\Phi_1}, x_2 e^{j\Phi_2}, \ldots, x_M e^{j\Phi_M}\}$, which may be used as the input to the IFFT directly at the transmitter and used as reference for the CHEST 2316 at the receiver. This concept may also be used for the TRN field.

Figure 24:
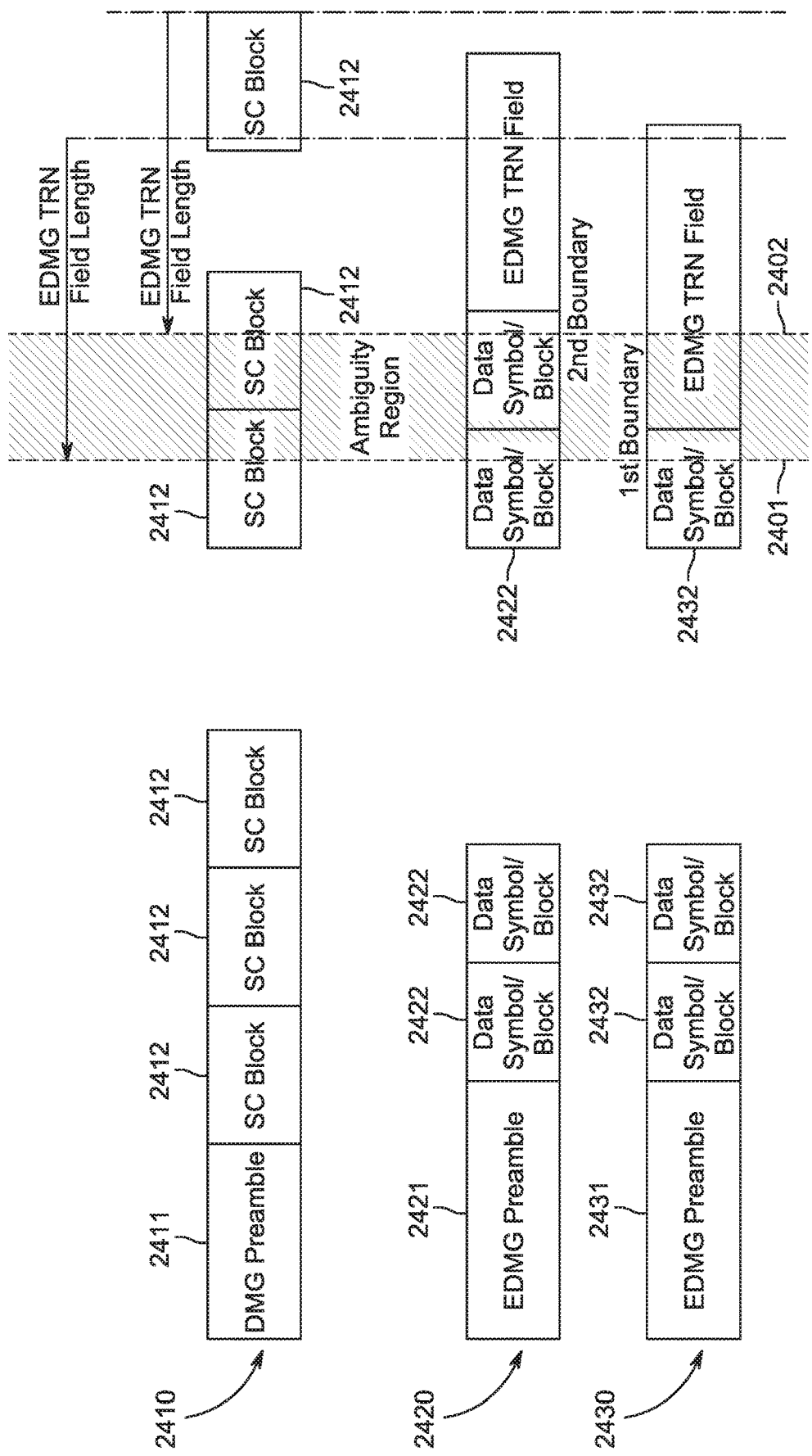
FIG. 24 is a diagram of an example process of determining the starting point of a TRN field.

TRN starting point ambiguity may be addressed herein. FIG. 24 is a diagram of an example process for determining the starting point of a TRN field. A PPDU may have padding of either MAC or PHY level padding that occupies one or more data blocks/symbols. This may occur in a MU-PPDU where the end of data blocks/symbols for different users have to be aligned such that the TRN field continues after the aligned data field. To accurately determine the starting point of a TRN field, the receiver may need to know the number of data symbols/blocks N.

There may be more than one way to derive N, the number of data symbols/blocks. A first way to derive N may be based on the PSDU, either with or without MAC padding, and the number of padding symbols/blocks in the PHY padding. This way may require signaling of two numbers. A second way to derive N may be based on PSDU length, either with or without MAC passing, and the L header length field, where this way may only require signaling of 1 number (i.e., PSDU length). A third way to derive N may assume a PHY padding which is less than 1 data block/symbol. The receiver may determine the N based on L header length. Further, in this way there may be no required signaling of additional numbers.

In the second and third way of determining the TRN starting point (also referred to as N), N may be derived correctly if the length of data blocks/symbols is greater than or equal to a spoof error limit of 512 Tc (i.e., 1 DMG SC block) such as a DMG SC block 2412 of DMG unit 2410 with DMG preamble 2411. As shown in FIG. 24, the second or third method may be utilized to determine the starting point of a TRN field. However, for EDMG units 2420 and 2430 with respective EMG preambles 2421 and 2431, the data symbol/block (2422/2432) length is less than 512 Tc and, accordingly, the receiver may not be able determine whether data field ends at "1st boundary" 2401 or "2nd boundary" 2402, as shown.

To address the TRN starting point determination, the EDMG header may provide one or more bits to signal the boundary between data field and TRN field (or at the start of a buffering period between data and TRN field). This indication may be in an EDMG-header B in a MU-PPDU or the indication may be included in a PPDU transmitted using OFDM PHY in which case the data symbol length including guard interval GI may be less than 512 Tc. For example, a bit value 0 may indicate the data field ends at the $1^{st}$ data symbol/block boundary within the ambiguity region, while bit value 1 may indicate the data field ends at the $2^{nd}$ symbol/block boundary within the ambiguity region.

According to an implementation, there may be a hybrid precoding protocol for SU-MIMO and MU-MIMO. An EDMG STA may be hybrid precoding capable if the hybrid precoding supported field in the STA's EDMG capabilities element is one. A hybrid precoding capable STA may support any known hybrid precoding protocols and/or those described herein. A hybrid precoding capable STA may be SU-MIMO capable, MU-MIMO capable, or both. For example: the hybrid precoding supported field and SU-MIMO support field in the STA's EDMG capabilities may be the same and may be set to an affirmative value, such as 1; the hybrid precoding supported field and MU-MIMO supported field in the STA's EDMG capabilities element may be the same and may be set to an affirmative value, such as 1; and/or, the hybrid precoding supported field, the SU-MIMO supported field, and the MU-MIMO supported field in the STA's EDMG capabilities element may be the same and may be set to an affirmative value, such as 1.

Hybrid beamforming may be the transmission and reception of multiple spatial streams using a combination of analog beamforming, such as by determining appropriate AWVs and digital beamforming, such as by determining appropriate spatial mapping matrices, between an SU-MIMO capable initiator and an SU-MIMO capable responder or between an MU-MIMO capable initiator and one or more MU-MIMO capable responders. The baseband beamformer may be determined based on the DMG antenna configuration selected as a result of the SU-MIMO or MU-MIMO beamforming protocol.

The hybrid beamforming protocol may support digital baseband sounding and hybrid beamforming information feedback for subsequent hybrid beamforming transmission.

The hybrid beamforming protocol can also be used to support the transmission of a single spatial stream using multiple DMG antennas with a combination of analog beamforming and digital beamforming between an SU-MIMO capable initiator and an SU-MIMO capable responder The analog beamformer may be selected during the SU-MIMO beamforming protocol or MU-MIMO beamforming protocol procedures that enable the determination of the antenna configuration for the simultaneous transmission of single or multiple spatial streams from the initiator to the responder(s), or vice versa in the case of SU-MIMO.

Additionally, the hybrid precoding protocol may enable the determination of the baseband beamformer based on the antenna configuration selected in the SU-MIMO or MU-MIMO beamforming protocol.

The relationship between the transmitted signal, x, and received signal, Y, can be represented as:

$$Y_{i,j} = Q_{Br,i,j} H_{BB,i,j} Q_{Bt,i,j} x_{i,j} + Q_{Br,i,j} Q_{Ar,j} n_{i,j}; H_{BB,i,j} = Q_{Ar,i,j} H_{i,j} Q_{At}$$

where $H_{i,j}$ is the channel between the transmit DMG antennas and receive DMG antennas of the jth STA in an MU-MIMO transmission. $n_{i,j}$ is additive white noise at the receiver of the jth STA in an MU-MIMO transmission. $H_{BB,i,j}$ is the effective baseband channel at the receiver of the jth STA in an MU-MIMO transmission, i.e., the channel observed by the baseband processor of the receiver when including the effect of their DMG antennas at the transmitter and receiver. $Q_{At}$ is the $N_{TX,A} \times N_{TX}$ response of the DMG antennas of the transmitter. $Q_{Ar,i,j}$ is the $N_{RX,j} \times N_{RX,j,A}$ response of the DMG antennas at the receiver of the jth STA in an MU-MIMO transmission. $Q_{Bt,i,j}$ is the $N_{TX} \times N_{STS}$ transmit spatial mapping matrix. $Q_{Br,i,j}$ is the $N_{STS,j} \times N_{RX,j}$ receive equalizer at the receiver of the jth STA in an MU-MIMO transmission. $x_{i,j}$ is the transmitted Single User (SU) or Multi-user (MU) MIMO signal. i is the subcarrier Index. For an EDMG SC mode PPDU transmission, i=0; for and EDMG OFDM mode PPDU transmission, $0-N_{SR} \le i \le N_{SR}$. j=index of jth STA in an MU-MIMO transmission. For an SU-MIMO transmission, j=0.

The hybrid beamforming (HBF) protocol may be a forward HBF protocol or a reverse HBF protocol. In the forward HBF protocol the transmitter may acquire hybrid beamforming information based on feedback from the receiver derived from the channel in the direction between the transmitter and receiver. In the reverse HBF, also referred to as an implicit HBF protocol without loss of generality, the transmitter may acquire hybrid beamforming information directly from the channel in the direction between the receiver and the transmitter without the need for feedback. An initiator or responder may initiate a reverse HBF protocol procedure if the Antenna Pattern Reciprocity subfield in the DMG STA Capability Information field of the responder and the Antenna Pattern Reciprocity subfield in the DMG STA Capability Information field of the initiator both include an affirmative indication, such as if they are equal to 1.

The HBF protocol may include an announcement phase for forward and reverse HBF protocol that may also be considered a configuration/request phase, a sounding phase for forward and reverse HBF protocol, a feedback phase for forward HBF protocol only, and/or a HBF transmission phase.

As further described herein, FIG. 25A-C show examples of forward HBF protocol frame exchange for SU-MIMO. FIG. 25A shows a forward HBF protocol for an initiator only. As shown, an initiator 2510 may transmit a forward announcement 2511. Upon receipt, a responder 2520 may transmit a forward ACK announcement 2521. The initiator 2510 may then transmit forward sounding data and, upon receipt, the responder 2520 may transmit a forward feedback 2522. At the last block in FIG. 25A, the initiator 2510 may transmit an HBF transmission 2513 based on the forward feedback 2522 from the responder 2520.

FIG. 25B shows a forward HBF protocol for a responder only. As shown, a responder 2540 may transmit a forward announcement 2541 and, upon receipt, an initiator 2530 may transmit a forward ACK announcement 2531. The responder 2540 may then transmit forward sounding data 2542 and, upon receipt, the initiator 2530 may transmit a forward feedback 2532. At the last block in FIG. 25B, the responder 2540 may transmit an HBF transmission 2543 based on the forward feedback 2532 from the initiator 2530.

FIG. 25C shows a forward HBF protocol for both an initiator and a responder. As shown, an initiator 2550 may transmit a forward announcement 2551. Upon receipt, a responder 2560 may transmit a forward ACK announcement 2561 and, additionally, the responder 2560 may also transmit a forward announcement 2562. Upon receipt of the announcement ACK 2561, the initiator 2550 may transmit forward sounding data 2553 and upon receipt of the forward announcement 2562, the initiator 2550 may transmit a forward announcement ACK 2552. The responder 2560 may transmit forward sounding data 2563 and, upon receipt of the sounding data 2563, the initiator 2550 may transmit forward feedback 2554. Upon receipt of the forward sounding data 2553, the responder 2560 may transmit forward feedback 2564. Upon receipt of the forward feedback 2564 from the responder 2560, the initiator 2550 may transmit a HBF transmission 2555. Upon receipt of the forward feedback 2554 from the initiator 2550, the responder 2560 may transmit a HBF transmission 2565.

Figure 26C:
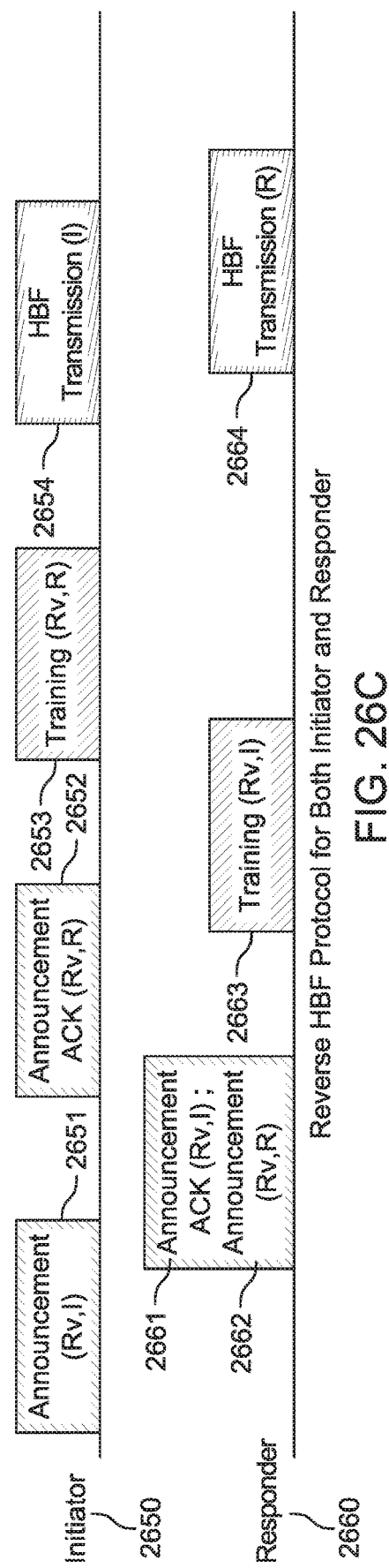
FIG. 26C is a diagram of an example reverse initiator and responder HBF protocol frame exchange for SU-MIMO.

As further described herein, FIG. 26A-D show an examples of reverse HBF protocol frame exchanges for SU-MIMO. FIG. 26A shows a reverse HBF protocol for an initiator only. As shown, an initiator 2610 may transmit a reverse announcement 2611 and a responder 2620 may transmit an announcement ACK 2622 and reverse sounding data 2623. The announcement ACK 2622 and reverse sounding data 2623 may be transmitted simultaneously or in the same transmission 2621. The initiator 2610 may transmit a reverse HBF transmission 2612 upon receiving the announcement ACK 2622 and/or reverse sounding data 2623.

FIG. 26B shows a reverse HBF protocol for a responder only. As shown, a responder 2640 may transmit a reverse announcement 2641 and an initiator 2630 may transmit an announcement ACK 2632 and reverse sounding data 2633. The announcement ACK 2632 and reverse sounding data 2633 may be transmitted simultaneously or in the same transmission 2631. The responder 2640 may transmit a reverse HBF transmission 2642 upon receiving the announcement ACK 2632 and/or reverse sounding data 2633.

FIG. 26C shows a reverse HBF Protocol for both initiator and responder. As shown, an initiator 2650 may transit a reverse announcement 2651 and a responder 2660 may transmit a reverse announcement ACK 2661 upon receipt of the reverse announcement 2651. The responder 2660 may also transmit a reverse announcement 2662 and the initiator 2650 may transmit a reverse announcement ACK 2652 upon receipt of the reverse announcement 2662. The responder 2660 may transmit reverse sounding data 2663 upon receipt of the reverse announcement ACK 2652. The initiator 2650 may transmit reverse sounding data 2653 upon receipt of the reverse announcement ACK 2652. Additionally, the initiator 2650 may transmit an HBF transmission 2654 based on the reverse sounding data 2663 transmitted by the responder 2660. The responder 2660 may transmit a reverse HBF transmission 2664 based on the reverse sounding data 2653 transmitted by the initiator 2650.

Figure 26D:
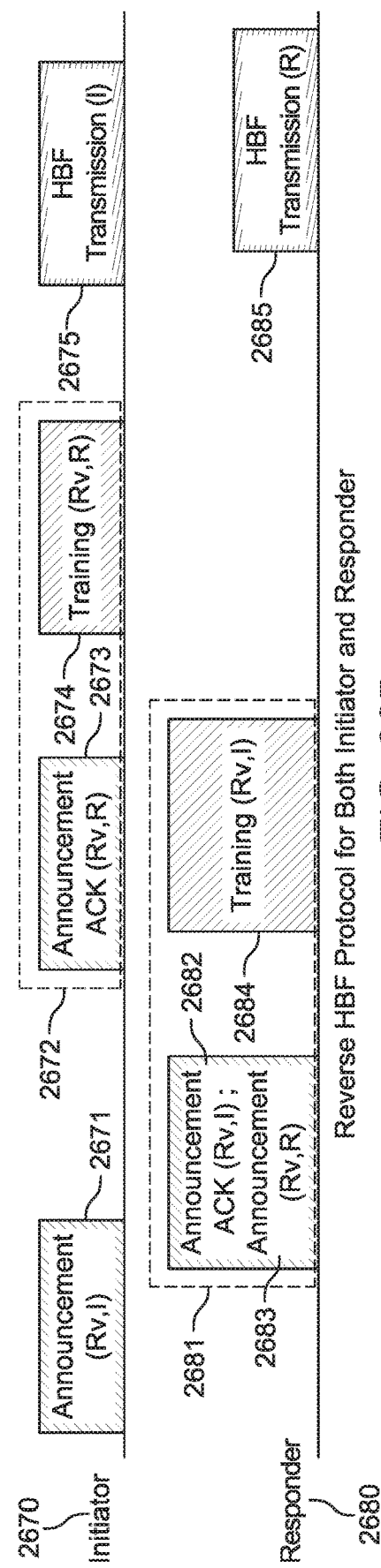
FIG. 26D is a diagram of another example reverse initiator and responder HBF protocol frame exchange for SU-MIMO.

FIG. 26D shows an alternate reverse HBF protocol for both an initiator and responder. As shown, an initiator 2670 may transmit a reverse announcement 2671 and, upon receipt of the reverse announcement 2671, a responder 2680 may transmit a reverse announcement ACK 2682. The responder 2680 may also transmit a reverse announcement 2683 as well as reverse sounding data 2684. The announcement ACK 2632, announcement 2683, and reverse sounding data 2684 may be transmitted simultaneously or in the same transmission 2681. Upon receipt of the reverse announcement 2683, the initiator 2670 may transmit a reverse announcement 2673. The initiator 2670 may also transmit reverse sounding data 2674. The announcement ACK 2673 and reverse sounding data 2674 may be transmitted simultaneously or in the same transmission 2672. The initiator 2670 may transmit a HBF transmission 2675 based on the reverse sounding data 2684 transmitted by the responder 2680. The responder 2680 may transmit a HBF transmission 2685 based on the reverse sounding data 2674 transmitted by the initiator 2670.

Figure 27:
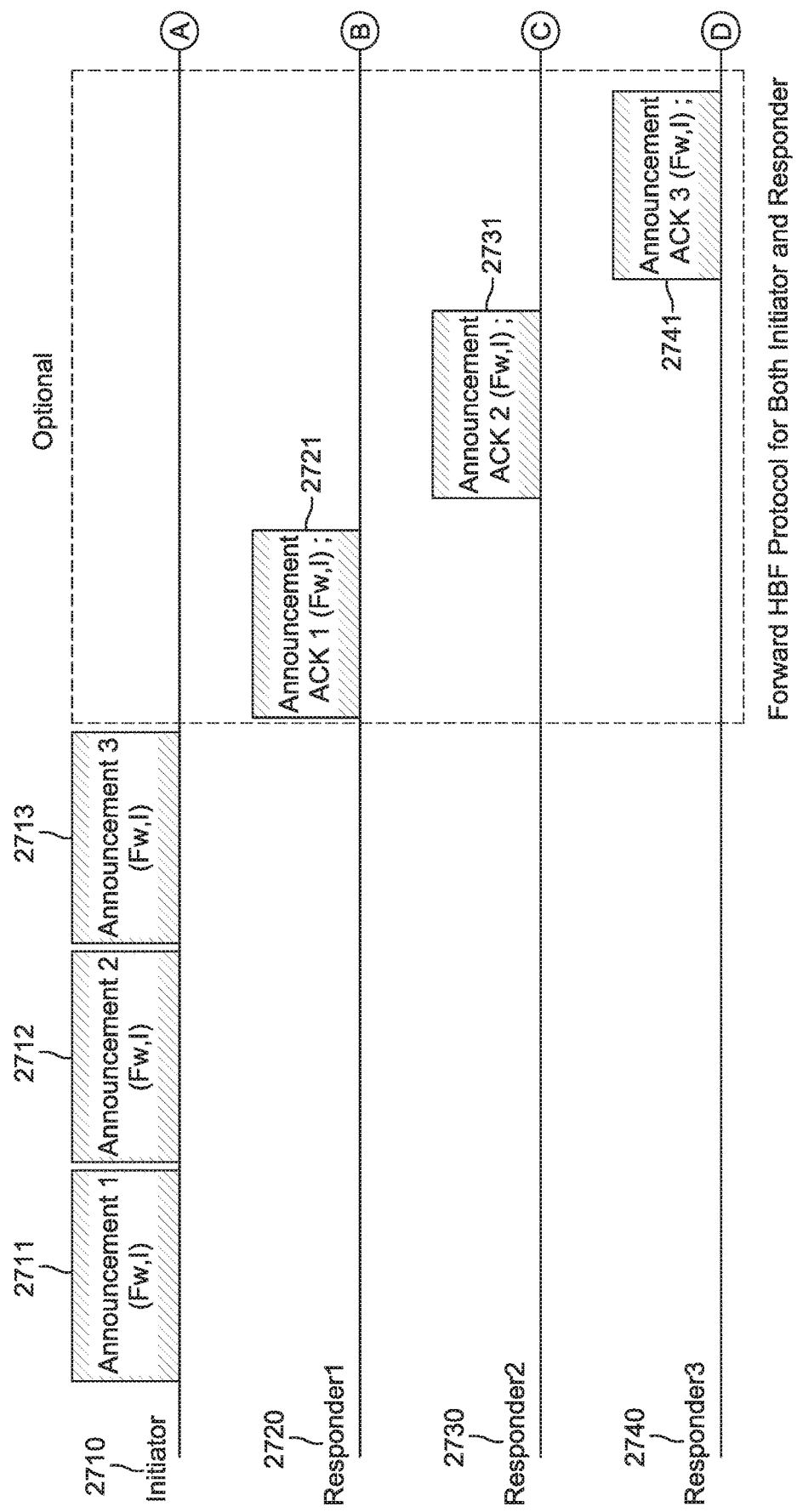
FIG. 27 is a diagram of an example of forward HBF protocol frame exchange for MU-MIMO.
Figure 27:
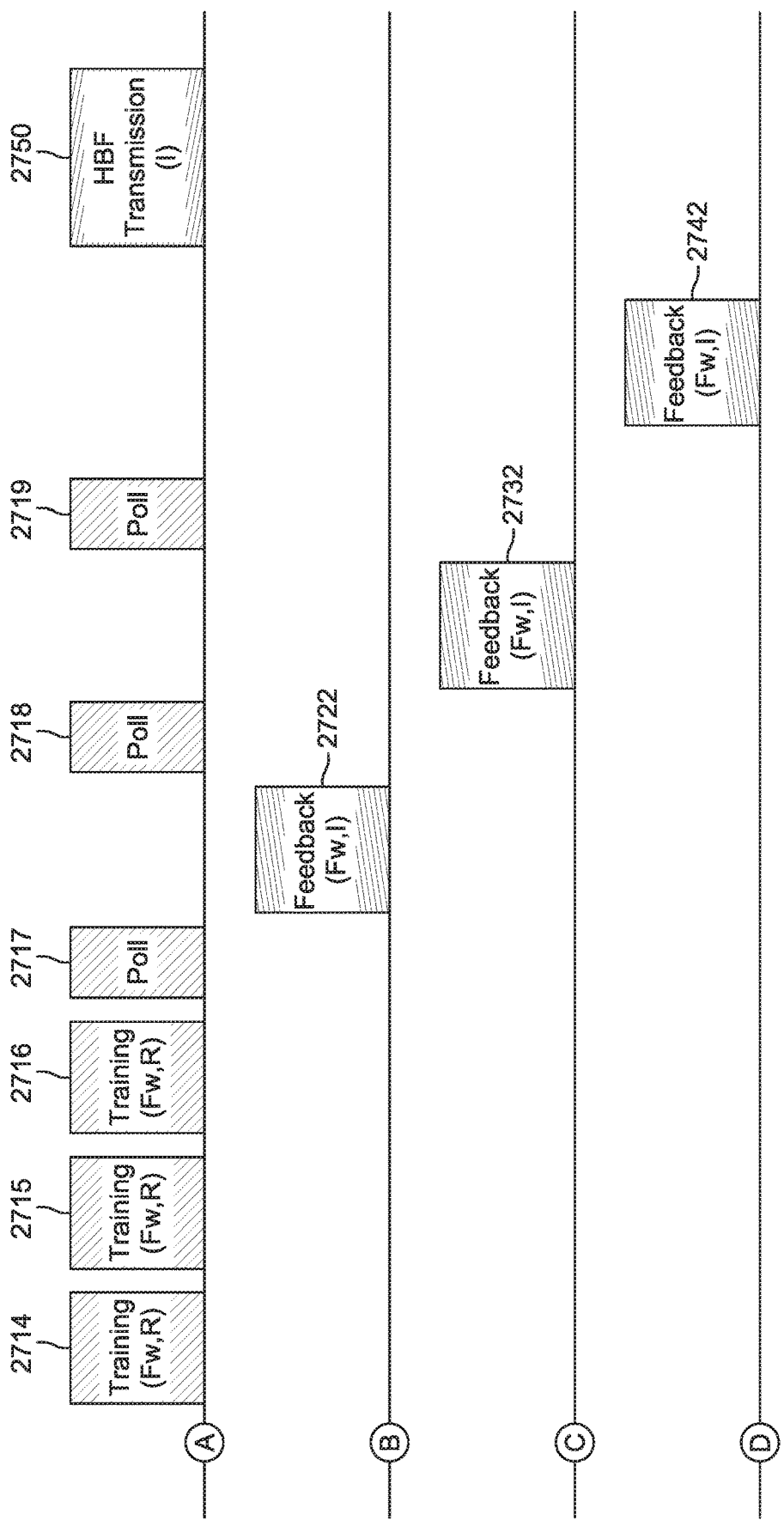

FIG. 27 shows an example of a forward HBF protocol frame exchange for MU-MIMO for both initiator and responder. As shown, an initiator 2710 may transmit a first forward announcement 2711, a second forward announcement 2712, and a third forward announcement 2713. Responders 2720, 2730, and 2740 may optionally transmit forward announcement ACKs 2721, 2731, and 2741, respectively, upon receipt of the respective forward announcements 2711, 2712, or 2713. It should be noted that the announcement ACKs may be transmitted successively one after the other or may be transmitted simultaneously. The initiator 2710 may transmit forward sounding data 2714, 2715 and 2716 to the responders 2720, 2730, and 2740, respectively. Further, the initiator 2710 may transmit polls 2717, 2718, and 2719 such that, upon receipt of a respective poll, responders 2720, 2730, and 2740 transmit applicable forward feedback 2722, 2732, and 2742. Based on the respective feedback from each responder 2720, 2730, and 2740, the initiator 2710 may transmit a HBF transmission 2750.

Figure 28:
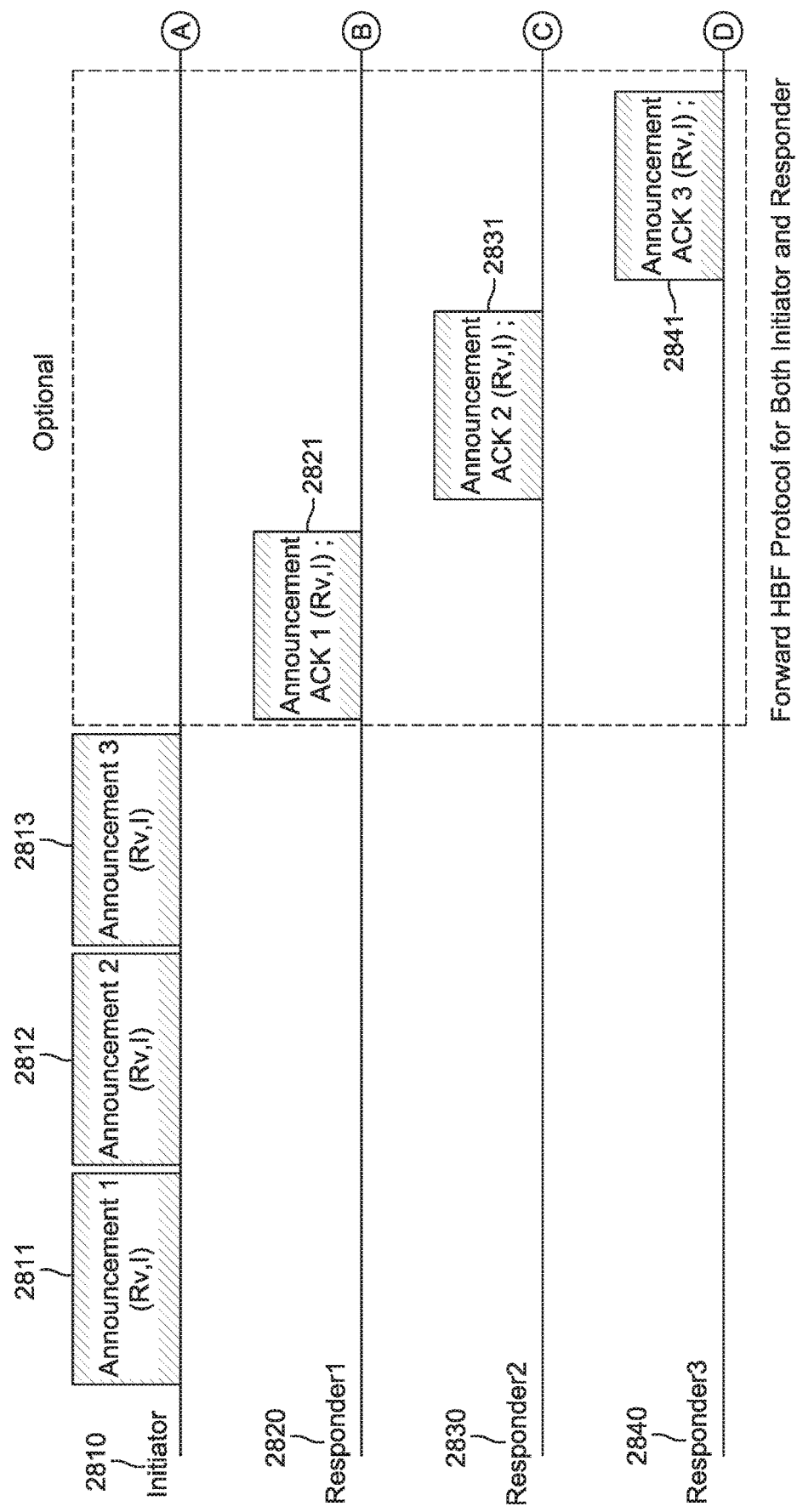
FIG. 28 is a diagram of an example of reverse (uplink) HBF protocol for MU-MIMO.
Figure 28:
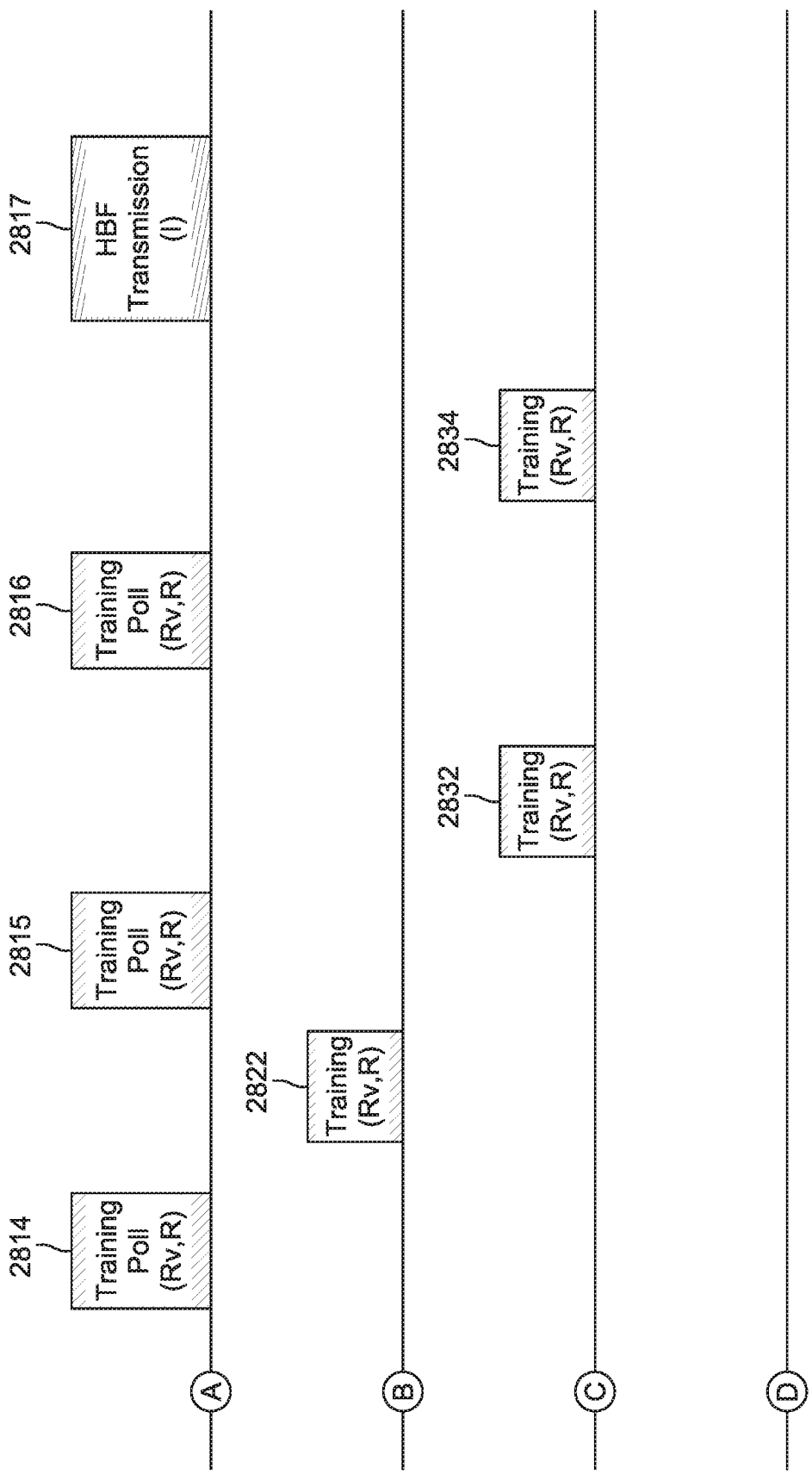

FIG. 28 shows an example of reverse HBF protocol for MU-MIMO. As shown, an initiator 2810 may transmit a first reverse announcement 2811, a second reverse announcement 2812, and a third reverse announcement 2813. Responders 2820, 2830, and 2840 may optionally transmit reverse announcement ACKs 2821, 2831, and 2841, respectively, upon receipt of the respective reverse announcements 2811, 2812, or 2813. It should be noted that the announcement ACKs may be transmitted successively one after the other or may be transmitted simultaneously. The initiator 2710 may transmit reverse sounding polls 2814, 2815 and 2816 to the responders 2820, 2830, and 2840, respectively. Upon receipt of the reverse sounding poll 2814, the responder 2820 may transmit reverse sounding data 2822. Upon receipt of the reverse sounding poll 2815, the responder 2830 may transmit reverse sounding data 2832. Additionally, the responder 2830 may also receiver sounding poll 2816 and may transmit reverse sounding data 2834 accordingly. As shown, the responder 2840 may not transmit reverse sounding data. The initiator 2810 may transmit a HBF transmission based on the reverse sounding data 2822, 2832, and 2834.

In the case where the responder may not be able to estimate the feedback at the time when the initiator requests for the feedback, the responder may send back an estimate of the minimum amount of time needed for the feedback to be ready. The initiator may poll the responder at any time after this or the responder may autonomously decide to feed back the information once it is ready.

In one solution, the initiator may set signal specific times for the responder(s) to feedback its data. This may be signaled in the announcement or the sounding signal and eliminates the need for the sounding poll frame.

In one solution, each responder may implicitly estimate the specific time for which it is to feed back its data. This may be estimated, for example, by its position in the setup frame or its relative position in the MU group.

The HBF protocol announcement phase may use an announcement acknowledgement frame exchange between initiator(s) and responder(s) to enable initiator(s) and/or responder(s) to set up their antenna configurations to the desired transmit and receive antenna sectors and to indicate the start of an HBF protocol. This announcement phase may also include parameters that indicate the type of HBF sounding to be used and the specific HBF information to be sent to the transmitter for HBF transmission. In some cases, an announcement ACK may be implicitly sent to the transmitter of the announcement. Further, if the initiator and responder are already in the correct configuration and have previously set up their HBF protocol information, the announcement phase may be skipped. The announcement phase may also indicate the time at which the actual protocol may start. According to an implementation, the protocol may be started immediately. According to another implementation, the protocol may start after a delay in time. When the configuration is already correct due to, for example, the initiator and responder previously setting up their HBF protocol information, and there is no need for an announcement phase, then a QOS Null with tracking setup may be sent or an HBF Control Field may be sent. When there is a MU-MIMO transmission as shown in FIGS. 27 and 28, for example, the announcement may be sent to multiple users one after the other or simultaneously. The use of a decline to send (DTS), a reverse CT, or an EDMG HBF Announcement ACK frame may ensure a mechanism to allow for transmission in one direction only. Additionally, with associated signaling there may be a mechanism to allow for a forward transmission in one direction and a reverse protocol in the other direction.

For a SU-MIMO announcement phase, as shown in FIGS. 25A-C and FIGS. 26A-C, the announcement and the announcement acknowledgement may be implemented by using one or more of a plurality of possible techniques including a Grant frame and Grant ACK frame with control trailers for signaling, an RTS and clear to send CTS with control trailers for signaling, and/or a dedicated announcement and announcement ACK with associated signaling.

In accordance with the SU-MIMO announcement phase Grant scenario, an EDMG STA transmits a Grant frame with a control trailer to a peer EDMG STA to indicate the intent to announce the start of a HBF protocol if the Grant Required field within the peer STA's EDMG Capabilities element is affirmative, such as, for example, 1. Alternatively, if the Grant Required field within the peer STA's EDMG Capabilities is not affirmative, such as, for example, 0, the STA may determine whether to transmit a Grant frame with a control trailer signaling the start of the HBF protocol and, based on the determination, may transmit a Grant frame with a control trailer signaling the start of the HBF protocol.

In the transmitted Grant frame, the value of the Allocation Duration field plus the Duration field of the Grant frame may indicate the time offset from the PHY-TXEND.indication primitive of the Grant frame transmission when the EDMG STA intends to initiate the start of the HBF protocol to the peer EDMG STA. For the transmitted Grant frame, a TXVECTOR parameter CONTROL_TRAILER may be set to Present and the parameter CT_TYPE may be set to GRANT_RTS_CTS2Self. The SISO/MIMO field may be set to an affirmative value, such as 1, and the SU/MU MIMO field may be set to a non-affirmative value, such as 0, to indicate that the following HBF sounding is performed in SU-MIMO. The control trailer may also indicate the corresponding DMG antenna configuration for the upcoming HBF protocol and the associated HBF protocol sounding and feedback parameters or HBF sounding. The HBF protocol announcement field may be set to an affirmative value, such as 1, and the parameters governing the subsequent HBF protocol may be configured. The parameters may include the HBF protocol type, the HBF protocol Training Type, the HBF Information Domain, the HBF Information Feedback Type, the HBF Feedback Compression, the HBF Feedback Tap Delay Present, the HBF Feedback Number of Taps Present, the HBF Compressed Nc Index, the HBF Compressed Nr Index, the HBF Compressed Feedback Type, the HBF Compressed CB Info, the HBF Compressed Channel Width, the HBF Feedback carrier grouping, and/or the HBF Feedback Carrier Grouping Factor.

If an EDMG STA that receives a Grant frame with a control trailer indicating an HBF protocol announcement to itself is able to perform the HBF protocol at the target time indicated by the Grant frame, the STA may configure its DMG antennas according to the settings included in the control trailer of the received Grant frame within a time period determined by the value of the Allocation Duration field plus the value of the Duration field of the received Grant frame starting from the PHY-TXEND.indication primitive of the Grant frame transmission. The STA may transmit a Grant ACK frame in response to the received Grant frame. For this transmitted Grant ACK frame, the TXVECTOR parameter CONTROL_TRAILER may be set to Present and the parameter CT_TYPE set to GRANT_RTS_CTS2Self. If SU-MIMO is used for the transmission of the reverse direction and HBF sounding is desired, the SISO/MIMO field may be set to an affirmative value, such as 1, and the SU/MU MIMO field may be set to a non-affirmative value, such as 0. The control trailer may also indicate the corresponding DMG antenna configuration for the upcoming SU-MIMO transmission, the associated HBF protocol sounding, and the feedback parameters of the upcoming HBF protocol in the reverse direction. The HBF protocol announcement field may be set to an affirmative value, such as 1, and the parameters governing the subsequent HBF protocol may be configured. If the STA does not intend to perform HBF sounding in the reverse direction, the SISO/MIMO field may be set to a non-affirmative value, such as 0.

For the SU-MIMO announcement phase RTS/CTS frames, an EDMG STA may transmit an RTS frame with a control trailer to a peer EDMG STA to access the channel and announce an HBF protocol. This RTS frame may be transmitted using all SU-MIMO sectors by using Cyclic Shift Diversity between the transmissions in different sectors. For the transmitted RTS frame, the TXVECTOR parameter CONTROL_TRAILER may be set to Present and the parameter CT_TYPE set to GRANT_RTS_CTS2Self. The SISO/MIMO field may be set to an affirmative value, such as 1, and the SU/MU MIMO field may be set to a non-affirmative value, such as 0, to indicate that the following transmission is performed in SU-MIMO. The control trailer may also indicate the corresponding DMG antenna configuration for the upcoming HBF sounding. The HBF protocol announcement field may be set to an affirmative value, such as 1, and the parameters governing the subsequent HBF protocol may be configured. These parameters may include the HBF protocol type, the HBF protocol Training Type, the HBF Information Domain, the HBF Information Feedback Type, the HBF Feedback Compression, the HBF Feedback Tap Delay Present, the HBF Feedback Number of Taps Present, the HBF Compressed Nc Index, the HBF Compressed Nr Index, the HBF Compressed Feedback Type, the HBF Compressed CB Info, the HBF Compressed Channel Width, the HBF Feedback carrier grouping, and/or the HBF Feedback Carrier Grouping Factor.

If an EDMG STA that receives an RTS frame with a control trailer indicating the start of an HBF sounding protocol is able to perform the HBF protocol, it may configure its antennas according to the settings included in the control trailer of the received RTS frame. It may also transmit a CTS (e.g., DMG CTS) frame with a control trailer in response to the received RTS frame. For this transmitted CTS frame, the TXVECTOR parameter CONTROL_TRAILER may be set to Present and the parameter CT_TYPE may be set to CTS_DTS.

If SU-MIMO is used for the transmission in the reverse direction, as shown in FIGS. 26A-D, the SISO/MIMO field may be set to an affirmative value, such as 1, and the SU/MU MIMO field may be set to a non-affirmative value, such as 0. The CTS frame may be transmitted using CSD, with a small delay between each sector. The control trailer may also indicate the corresponding antenna configuration for the upcoming SU-MIMO transmission in the reverse direction. For this transmitted CTS frame, the TXVECTOR parameter CONTROL_TRAILER may be set to Present and the parameter CT_TYPE may be set to GRANT_RTS_CTS2SELF_CTS.

If the receiving EDMG STA does not intend to perform HBF sounding in the reverse direction, the SISO/MIMO field may be set to a non-affirmative value, such as 0. The CTS frame may be sent using the SISO sector. Alternatively, if the EDMG STA is not able to perform the HBF sounding, it may transmit a DTS frame with a control trailer to the TXOP initiator to provide further information. The DTS frame may be sent using a SISO transmission.

All the RTS/CTS procedures may follow the MIMO channel access rules to establish an HBF protocol.

For the SU-MIMO announcement phase dedicated announcement scenario, a dedicated EDMG HBF Announcement Frame and EDMG HBF Announcement ACK Frame may be used for announcement and acknowledgement in the SU HBF protocol. They may function as a Null Data Packet Announcement and ACK.

An EDMG STA may transmit an EDMG HBF Announcement Frame at the start of the HBF protocol to a peer EDMG STA to indicate the intent to initiate an HBF protocol to the peer STA. In the STA info field, the SISO/MIMO field may be set to an affirmative value, such as 1, and the SU/MU MIMO field may be set to a non-affirmative value, such as 0, to indicate that the following transmission is performed in SU-MIMO. The frame may also indicate the corresponding antenna configuration for the upcoming HBF protocol and the associated HBF protocol sounding and feedback parameters. The HBF protocol announcement field may be set to an affirmative value, such as 1, and the parameters governing the subsequent HBF protocol may be configured. These parameters may include the HBF protocol type, the HBF protocol Training Type, the HBF Information Domain, the HBF Information Feedback Type, the HBF Feedback Compression, the HBF Feedback Tap Delay Present, the HBF Feedback Number of Taps Present, the HBF Compressed Nc Index, the HBF Compressed Nr Index, the HBF Compressed Feedback Type, the HBF Compressed CB Info, the HBF Compressed Channel Width, the HBF Feedback carrier grouping, and/or the HBF Feedback Carrier Grouping Factor.

If an EDMG STA that receives an EDMG HBF Announcement Frame indicating the start of a HBF protocol to itself is able to perform the HBF protocol, it may configure its antennas according to the settings included in the control trailer of the received EDMG HBF Announcement Frame. It may also transmit an EDMG HBF Announcement ACK Frame in response of the received EDMG HBF Announcement Frame. For this ACK frame, the STA info ACK field may be a replica of the STA field in the original transmission. In the case that there is a desire for a change in parameters, the STA ACK field may set its parameters to the desired values. There may be multiple transmissions and receptions of these fields, until there is a match.

If SU-MIMO is used for the transmission in the reverse direction, as shown in FIGS. 26A-D, the SISO/MIMO field of the STA info request field in the EDMG HBF Announcement ACK Frame may be set to an affirmative value, such as 1, and the SU/MU MIMO field may be set to a non-affirmative value, such as 0. The EDMG HBF Announcement ACK Frame may be transmitted using all SU-MIMO sectors, with a small delay between each sector. The STA info request field in the EDMG HBF Announcement ACK Frame indicates the corresponding antenna configuration for the upcoming SU-MIMO transmission in the reverse direction.

If SISO is used for the transmission of the reverse direction, the SISO/MIMO field of the STA info request field in the EDMG HBF Announcement ACK Frame may be set to a non-affirmative value, such as 0. The EDMG HBF Announcement ACK Frame may be sent using the SISO sector. Alternatively, if the EDMG STA is not able to perform the SU-MIMO transmission, it may transmit a DTS frame with a control trailer to the TXOP initiator to provide further information. The DTS frame may be sent using a SISO transmission.

All RTS/CTS procedures may follow the MIMO channel access rules to establish an HBF protocol.

For MU-MIMO, the announcement and announcement acknowledgement may use one or more of: MU-Grant frames and Grant ACK frames with control trailers for signaling; Grant frames and Grant ACK frames with MU-control trailers for signaling, where the control trailer contains an MU-MIMO Configuration ID identifying the STAs and the corresponding sectors/spatial streams to be used in the MU transmission; a dedicated MU-announcement and MU-announcement ACK with associated signaling; and/or an RTS and CTS with MU-control trailers for signaling, where the control trailer contains the MU-MIMO Configuration ID identifying the STAs and the corresponding sectors/spatial streams to be used in the MU transmission. For the RTS/CTS scenario, the RTS may be a repeated RTS for each STA or an MU-RTS that is simultaneously sent to all STAs in the MU-MIMO configuration group, and the CTS may be a repeated CTS for each in the group or an MU-CTS that is simultaneously sent from all STAs in the MU-MIMO configuration group.

For the MU-MIMO announcement phase MU-Grant/Grant ACK frames or Grant frames and Grant ACK frames with MU-control trailers for signaling scenarios where there is an HBF protocol to a specific MU-MIMO configuration ID, the MU-MIMO initiator may transmit one or more MU-Grant frames to each responder in the MU configuration ID group. The TA field of the MU-Grant frame may be set to the BSSID of the initiator and the RA field may be set to the group address. Note that the term MU-Grant frames may refer to MU-Grant frames with a control trailer of a Grant frame with an MU-control trailer. In the transmitted MU-Grant frame, the value of the Allocation Duration field plus the Duration field of the Grant frame multiplied by the number of STAs in the MU configuration ID group including the SIFS interval between MU-Grant frames may indicate the time offset from the PHY-TXEND.indication primitive of the Grant frame transmission when the MU-MIMO initiator intends to initiate the start of the HBF protocol to the responder EDMG STAs. For the transmitted MU-Grant frames, the TXVECTOR parameter CONTROL_TRAILER may be set to Present and the parameter CT_TYPE may be set to GRANT_RTS_CTS2Self. The SISO/MIMO field may be set to a non-affirmative value, such as 0, and the SU/MU MIMO field may be set to an affirmative value, such as 1, to indicate that the following transmission is performed in MU-MIMO. The control trailer may also indicate the corresponding antenna configuration for the upcoming HBF protocol (by the MU-MIMO configuration ID) and the associated HBF protocol sounding and feedback parameters. The HBF protocol announcement field may be set to an affirmative value, such as 1, and the parameters governing the subsequent HBF protocol may be configured. These parameters may include the HBF protocol type, the HBF protocol Training Type, the HBF Information Domain, the HBF Information Feedback Type, the HBF Feedback Compression, the HBF Feedback Tap Delay Present, the HBF Feedback Number of Taps Present, the HBF Compressed Nc Index, the HBF Compressed Nr Index, the HBF Compressed Feedback Type, the HBF Compressed CB Info, the HBF Compressed Channel Width, the HBF Feedback carrier grouping, and/or the HBF Feedback Carrier Grouping Factor.

If an EDMG STA that receives a Grant frame with a control trailer indicating an HBF protocol announcement to itself is able to perform the HBF protocol at the target time indicated by the Grant frame, the STA may configure its antennas according to the settings included in the control trailer of the received Grant frame within a time period determined by the value of the Allocation Duration field plus the value of the Duration field of the received Grant frame starting from the PHY-TXEND.indication primitive of the Grant frame transmission.

The STA may transmit a Grant ACK frame in response of the received Grant frame. For this transmitted Grant ACK frame, the TXVECTOR parameter CONTROL_TRAILER may be set to Present and the parameter CT_TYPE may be set to GRANT_RTS_CTS2Self. Note that if the xx field is set to an affirmative value, such as 1, then no Grant ACK may be required.

For the MU-MIMO announcement phase RTS/CTS scenario, a MU-MIMO initiator may transmit one or more RTS frames with a control trailer to responder STAs to access the channel and announce a HBF protocol. For the transmitted RTS frame, the TXVECTOR parameter CONTROL_TRAILER may be set to Present and the parameter CT_TYPE may be set to GRANT_RTS_CTS2Self. Note that if the MU-MIMO initiator does not require a reply, it may transmit a CTS2Self. The SISO/MIMO field may be set to a non-affirmative value, such as 0, and the SU/MU MIMO field may be set to an affirmative value, such as 1, to indicate that the following transmission is performed in MU-MIMO. The control trailer may also indicate the corresponding antenna configuration for the upcoming HBF protocol, by the MU-MIMO configuration ID, and the associated HBF protocol sounding and feedback parameters. The HBF protocol announcement field may be set to an affirmative value, such as 1, and the parameters governing the subsequent HBF protocol may be configured. These parameters may include the HBF protocol type, the HBF protocol Training Type, the HBF Information Domain, the HBF Information Feedback Type, the HBF Feedback Compression, the HBF Feedback Tap Delay Present, the HBF Feedback Number of Taps Present, the HBF Compressed Nc Index, the HBF Compressed Nr Index, the HBF Compressed Feedback Type, the HBF Compressed CB Info, the HBF Compressed Channel Width, the HBF Feedback carrier grouping, and/or the HBF Feedback Carrier Grouping Factor.

If an EDMG STA that receives an RTS frame with a control trailer indicating the start of a HBF protocol to itself is able to perform the HBF protocol, it may configure its antennas according to the settings included in the control trailer of the received RTS frame. It may also transmit a CTS frame with a control trailer in response of the received RTS frame. For this transmitted CTS frame, the TXVECTOR parameter CONTROL_TRAILER may be set to Present and the parameter CT_TYPE may be set to CTS_DTS.

If an EDMG STA that receives a CTS2Self frame with a control trailer indicating the start of a HBF protocol to itself is able to perform the HBF protocol, it may configure its antennas according to the settings included in the control trailer of the received RTS frame. In this case, it may then prepare for the sounding phase.

If the EDMG STA is not able to perform the HBF protocol, it may transmit a DTS frame with a control trailer to the TXOP initiator to provide further information. The DTS frame may be sent using a SISO transmission.

All the RTS/CTS procedures may follow the MIMO channel access rules to establish an HBF protocol.

According to an implementation, prior to the start of HBF sounding with a set of responder STAs within an MU group, the initiator may include the MU group within an EDMG Group ID Set element and communicate the resulting element to the STAs in the BSS and may also perform MU-MIMO beamforming with the responders of the MU group. The EDMG STA may transmit the RTS frame or DMG CTS-to-self frame with a control trailer to the intended MU-MIMO group of responders to indicate the intent to initiate a HBF sounding protocol with the responders. The RTS and DMG CTS-to-self frame may be transmitted using the MU-MIMO antenna setting obtained through the last successful MU-MIMO beamforming sounding with the group of responders. The transmitted RTS and DMG CTS-to-self frame may append a control trailer in which the parameter CT_TYPE may be set to GRANT_RTS_CTS2self. In the control trailer, the SISO/MIMO field shall be set to an affirmative value, such as 1, and the SU/MU MIMO field shall be set to an affirmative value, such as 1, to indicate that there is an upcoming HBF sounding for the MUs. The EDMG Group ID field may be set to the value that identifies the corresponding group of responders for the upcoming hybrid beamforming sounding. The RA field of the RTS may be set to the broadcast MAC address. After transmitting the RTS frame, the initiator may configure it's receive antenna to a quasi-omni receive pattern to receive the DMG CTS.

An STA that receives an RTS frame addressed to an MU group that the STA belongs to may transmit a DMG CTS frame back to the initiator employing the most recent SISO antenna configuration used between the responder and the initiator. The DMG CTS frame may be transmitted a SIFS interval following the reception of the RTS frame. The TA field of the DMG CTS may be set to the broadcast MAC address and the Scrambler Initialization field in the PHY header may be set to the same value as the Scrambler Initialization field of the PPDU that contained in the received RTS frame. Following transmission of the DMG CTS, the responder may then configure its antennas based on the antenna setting obtained during the last MU-MIMO beamforming sounding for the MU group. The HBF sounding may begin a SIFS interval following the reception or expected reception of the DMG CTS frame by the initiator.

An STA that receives a DMG CTS-to-self frame addressed to an MU group that the STA belongs to may configure its antennas based on the antenna setting obtained during the last successful MU-MIMO beamforming sounding for the MU group. The hybrid beamforming sounding begins a SIFS interval following the end of the DMG CTS-to-self frame transmission by the initiator For the MU-MIMO announcement phase dedicated MU-announcement scenario, a dedicated EDMG HBF Announcement Frame and ACK Frame may be used for announcement and acknowledgement in a MU HBF protocol. These may function as a Null Data Packet Announcement and ACK.

According to an implementation, a sounding phase, also known as the training phase, may follow the announcement phase, if an announcement phase is implemented. For the sounding phase of hybrid precoding for SU and MU MIMO, sounding signals may be sent to the STA(s) for measurement using the CEF or TRN subfields to or from the transmitter to enable the STA to measure the baseband channel. The sounding phase may have different types of sounding including Beam Refinement Phase (BRP) sounding, beam tracking sounding, and/or CEF based sounding with QoS Null frames with the CEF dimensioned for the SU and the MU antenna configuration. The HBF protocol sounding type field in the CT may signal the type of sounding by, for example, 1, 2, and 3, respectively.

For BRP sounding in a SU-MIMO forward scenario for both initiator and responder, as shown in FIGS. 26C-D, the initiator may initiate the sounding phase at MBIFS following reception of the Announcement ACK frame from the responder. In the initiator sounding subphase, the initiator may transmit EDMG BRP-RX/TX packets to the responder. Each EDMG BRP-RX/TX packet may be separated by a SIFS for the desired configuration. Each transmitted EDMG BRP-RX/TX packet may be used to train one or more transmit sectors and, for each transmit sector, to train a number of receive AWVs, for the configuration setup in the announcement frame. In each EDMG BRP-RX/TX packet, the initiator may include, for each selected transmit sector, TRN subfields in the TRN field of the PPDU for the responder to receive AWV sounding. For each EDMG BRP-RX/TX packet, the TXVECTOR parameter EDMG_TRN_LEN may be set to a value greater than zero, and the parameters RX_TRN_PER_TX_TRN and EDMG_TRN_M may be set to the values of the L-TX-RX and EDMG TRN-Unit M subfields received in the feedback from the responder in the SISO phase, respectively. The initiator may transmit each EDMG BRP-RX/TX packet to train multiple TX DMG antennas simultaneously by using the TRN subfields, which may reduce sounding time. The TX Antenna Mask field of each EDMG BRP-RX/TX packet may indicate the TX DMG antenna(s) that is being used by the initiator to transmit the EDMG BRP-RX/TX packet. The BRP CDOWN field of each EDMG BRP-RX/TX packet may indicate the number of remaining EDMG BRP RX/TX packets to be transmitted by the initiator in the initiator SMBT subphase.

If the responder indicates that it will use SU-MIMO in the opposite direction, such as from the responder to the initiator, during the announcement phase, then the responder may initiate sounding subphase at an appropriate interframe spacing such as, for example, SIFS or MBIFS, following the reception of an EDMG BRP-RX/TX packet with the BRP CDOWN field set to a non-affirmative value, such as 0, from the initiator. In the responder sounding subphase, the responder may transmit EDMG BRP-RX/TX packets to the initiator. Each EDMG BRP-RX/TX packet may be separated by a SIFS. For each EDMG BRP-RX/TX packet, the TXVECTOR parameter EDMG_TRN_LEN may be set to a value greater than zero, and the parameters RX_TRN_PER_TX_TRN and EDMG_TRN_M may be set to the values of the L-TX-RX and Requested EDMG TRN-Unit M subfields in the MIMO BF Setup frame received from the initiator in the SU-MIMO BF setup subphase, respectively. The responder may transmit each EDMG BRP-RX/TX packet to train multiple TX DMG antennas simultaneously by using the TRN subfields, which may reduce sounding time. The TX Antenna Mask field of each EDMG BRP-RX/TX packet may indicate the TX DMG antenna(s)

that is being used by the responder to transmit the EDMG BRP-RX/TX packet. The BRP CDOWN field of each EDMG BRP-RX/TX packet may indicate the number of remaining EDMG BRP RX/TX packets to be transmitted by the responder in the responder SMBT subphase.

According to an implementation, if the sounding is for the initiator only or responder only, only the STA sounding its channel may send the BRP.

According to an implementation, for BRP sounding in a SU-MIMO reverse scenario, as shown in FIGS. 26A-D, the announcement and announcement ACKs may be completed in both directions and the sounding commences an MBIFS duration after the completion of the announcement ACK to the responder. The responder may transmit EDMG BRP-RX/TX packets to the initiator based on the fixed configuration of the forward link. If indicated, the initiator may then transmit an EDMG BRP-RX/TX to the responder based on the fixed configuration of the reverse link. In another example, the announcement and announcement ACKs may not be completed in both directions and the sounding commences an MBIFS duration after the reception of the announcement ACK to the initiator. The responder may transmit EDMG BRP-RX/TX packets to the initiator based on the fixed configuration of the forward link. If indicated, the initiator may send an announcement ACK to the responder and then the initiator may then transmit an EDMG BRP-RX/TX to the responder based on the fixed configuration of the reverse link.

For BRP sounding in a MU-MIMO forward scenario, as shown in FIG. 27, the initiator may initiate the HBF sounding subphase an MBIFS following the transmission of the Announcement ACK frame. In the HBF sounding subphase, the initiator may transmit one or more EDMG BRP-RX/TX packets to the remaining responders in the MU group. Each EDMG BRP-RX/TX packet may be separated by a SIFS. Each transmitted EDMG BRP-RX/TX packet may be used to train one or more transmit sectors and, for each transmit sector, to train a number of receive AWVs. In each EDMG BRP-RX/TX packet, the initiator may include, for each selected transmit sector, TRN subfields in the TRN field for remaining responders to perform receive AWV sounding. For each EDMG BRP-RX/TX packet, the TXVECTOR parameter EDMG_TRN_LEN may be set to a value greater than zero. The parameters RX_TRN_PER_TX_TRN and EDMG_TRN_M may be set in such a manner that the number of TRN subfields included in the TRN field used for receive AWV(s) sounding is the maximum number of receive sectors across all the remaining responders based on the L-TX-RX subfields and the EDMG TRN-Unit M subfields in the feedback from all the remaining responders in the SISO phase. The initiator may transmit each EDMG BRP-RX/TX packet to train multiple TX DMG antennas simultaneously using TRN subfields to reduce the sounding time. The TX Antenna Mask field of each EDMG BRP-RX/TX packet may indicate the TX DMG antenna(s) that is being used by the responder to transmit the EDMG BRP-RX/TX packet. The BRP CDOWN field of each EDMG BRP-RX/TX packet may indicate the number of remaining EDMG BRP RX/TX packets to be transmitted by the initiator in the HBF sounding subphase.

For BRP sounding in a MU-MIMO reverse scenario, as shown in FIG. 28, the initiator may initiate an HBF protocol reverse sounding subphase an MBIFS following the transmission of the last Announcement frame or receipt of the last announcement ACK if required. In the HBF protocol reverse sounding subphase, the initiator may transmit a MIMO BF Poll frame with the Poll Type field set to an affirmative value, such as 1, to each remaining responder in the MU Configuration ID group. Each MIMO BF Poll frame may be sent using the DMG control mode. The TA field of each MIMO BF Poll frame may be set to the BSSID of the initiator and the RA field may be set to the MAC address of the corresponding responder. Each MIMO BF Poll frame may carry the dialog token in the Dialog Token field that identifies the MU-MIMO BF sounding. Additionally, in order to reduce sounding time, the initiator may reduce the number of TRN subfields used for receiving AWV sounding in the following EDMG BRP-RX/TX packets transmitted by each remaining responder based on the SNRs of transmit sectors collected from each remaining responder in the SISO phase. The L-TX-RX subfield and the Requested EDMG TRN-Unit M subfield of each MIMO BF Poll frame may indicate the number of TRN subfields required for receiving AWV sounding in the following EDMG BRP-RX/TX packets to be transmitted by the corresponding responder. The Requested EDMG TRN-Unit P subfield of each MIMO BF Poll frame may indicate the number of TRN subfields in a TRN-Unit that need to be transmitted with the same AWV as the preamble and Data field in the following EDMG BRP-RX/TX packets to be transmitted by the corresponding responder.

Upon receiving a MIMO BF Poll frame for which a remaining responder is the addressed recipient, the responder may transmit one or more EDMG BRP-RX/TX packet(s) to the initiator, where the TXVECTOR parameter EDMG_TRN_LEN may be set to a value larger than zero, and the parameters RX_TRN_PER_TX_TRN, EDMG_TRN_M and EDMG_TRN_P may be set to the values of the L-TX-RX field, the Requested EDMG TRN-Unit M field and the Requested EDMG TRN-Unit P field in the corresponding MIMO BF Poll frame received from the initiator, respectively. Additionally, the responder may transmit each EDMG BRP-RX/TX packet to train multiple TX DMG antennas simultaneously using TRN subfields to reduce sounding time. The TX Antenna Mask field of each EDMG BRP-RX/TX packet may indicate the TX DMG antenna(s) that are being used by the responder to transmit the EDMG BRP-RX/TX packet. The BRP CDOWN field of each EDMG BRP-RX/TX packet may indicate the number of remaining EDMG BRP RX/TX packets to be transmitted by the responder.

Each MIMO BF Poll frame and each EDMG BRP-RX/TX packet may be separated by a SIFS.

For tracking sounding in a SU-MIMO forward scenario the initiator may initiate the sounding phase an MBIFS following reception of the Announcement ACK frame from the responder. The initiator may transmit a frame, such as a QOS Null frame with the DMG header and EDMG header-A fields setting up the EDMG initiator transmit beam tracking procedure with HBF Feedback requested. The feedback used may be based on the HBF feedback requested in the announcement frame.

According to an implementation for tracking sounding in a SU-MIMO reverse scenario, the announcement and announcement ACKs may be completed in both directions and the sounding may commence an MBIFS duration after the completion of the announcement ACK to the responder. The responder may transmit a frame (e.g., a QOS Null frame) with the DMG header and EDMG-header-A setting up an EDMG initiator to receive beam tracking. Alternatively, the initiator may transmit a frame (e.g., a QOS null frame) with the DMG header and EDMG header-A for setting up, and the EDMG responder may transmit the beam tracking procedure.

If indicated, the initiator may then transmit a frame (e.g., a QOS Null frame) with the DMG header and EDMG-header-A setting up an EDMG initiator to receive beam tracking. Alternatively, the responder may transmit a frame (e.g. a QOS null frame) with the DMG header and EDMG header-A for setting up and the EDMG responder may transmit a beam tracking procedure.

According to another implementation for tracking sounding in a SU-MIMO reverse scenario, the announcement and announcement ACKs may not be completed in both directions and the sounding may commence an MBIFS duration after the reception of the announcement ACK to the initiator. The responder may transmit a frame, such as a QOS Null frame with the DMG header and EDMG-header-A setting up an EDMG initiator to receive beam tracking. Alternatively, the initiator may transmit a frame, such as a QOS null frame, with the DMG header and EDMG header-A for setting up and the EDMG responder may transmit a beam tracking procedure.

If indicated, the initiator may send an announcement ACK to the responder and then the initiator may then transmit a frame, such as a QOS Null frame, with the DMG header and EDMG-header-A setting up an EDMG initiator to receive beam tracking. Alternatively, the responder may transmit a frame, such as a QOS Null frame, with the DMG header and EDMG header-A for setting up and the EDMG responder may transmit a beam tracking procedure.

For CEF sounding in a forward scenario the initiator may initiate the sounding phase an MBIFS following reception of the Announcement ACK frame from the responder. The initiator may transmit a frame, such as a QOS Null frame, with the CEF field set to the forward channel configuration requested in the announcement. The channel measurements may be made from the CEF field. The feedback used may be based on the HBF feedback requested in the announcement frame.

According to an implementation of CEF sounding in a reverse scenario, the announcement and announcement ACKs may be completed in both directions and the sounding may commence an MBIFS duration after the completion of the announcement ACK to the responder. The responder may transmit a frame, such as a QOS Null frame, with the CEF field set to the forward channel configuration requested in the announcement. If indicated, the initiator may then transmit a frame, such as a QOS Null frame, with the CEF field set to the forward channel configuration requested in the announcement.

According to another implementation of CEF sounding in a reverse scenario, the announcement and announcement ACKs may not be completed in both directions and the sounding commences an MBIFS duration after the reception of the announcement ACK to the initiator. The responder may transmit a frame, such as a QOS Null frame, with the CEF field set to the forward channel configuration requested in the announcement.

If indicated, the initiator may send an announcement ACK to the responder and then the initiator may then transmit a frame, such as a QOS Null frame, with the CEF field set to the forward channel configuration requested in the announcement.

The tracking and the CEF techniques may be used for MU HBF protocol sounding.

According to implementations disclosed herein, the feedback phase of hybrid precoding for SU and MU MIMO may only be activated in the forward HBF protocol to send back the HBF information to the transmitter for use in an HBF transmission. The feedback may be primarily affected by one or more of at least three parameters in the CT or the HBF control element including HBF Information Feedback Type such as channel feedback or precoder feedback, HBF Feedback Compression, such as compressed or uncompressed, and HBF Information Domain, such as time domain or frequency domain. This feedback may be implemented in the SC PPDUs and the OFDM PPDUs as noted in Tables 4A and 4B below.

TABLE 4A

SC PPDU

| HBF Information Domain | HBF Information Feedback Type | HBF Feedback Compression | Comment |
| --- | --- | --- | --- |
| Time | Channel | No | Channel Feedback |
| Time | Channel | Yes | Channel Feedback with compression. Use the compression framework to send back the effective channel. |
| Time | Precoder | No | Feedback for time domain precoder with no compression |
| Time | Precoder | Yes | Feedback for time domain precoder with compression framework. |
| Frequency | Channel | No | N/A |
| Frequency | Channel | Yes | N/A |
| Frequency | Precoder | No | N/A |
| Frequency | Precoder | Yes | N/A |

TABLE 4B

OFDM PDU

| HBF Information Domain | HBF Information Feedback Type | HBF Feedback Compression | Comment |
| --- | --- | --- | --- |
| Time | Channel | No | Channel Feedback |
| Time | Channel | Yes | Channel Feedback with compression. Use the compression framework to send back the effective channel. |
| Time | Precoder | No | N/A |
| Time | Precoder | Yes | N/A |
| Frequency | Channel | No | Feedback for frequency domain channel. May be converted to frequency and then used to design HBF. |
| Frequency | Channel | Yes | Feedback for compressed frequency domain channel. May be converted to frequency and then used to design HBF |
| Frequency | Precoder | No | Feedback for uncompressed precoder. |
| Frequency | Precoder | Yes | Feedback for compressed precoder. |

As noted in Table 4A and 4B3, there may be different categories of feedback that may be used, such as, Channel Feedback (SU MIMO/SC) which may use MIMO feedback, Channel Feedback (MU MIMO/SC) which may use MIMO feedback, Precoder Feedback (SU-MIMO/SC) which may use 802.11n/ac feedback framework (e.g., Nc, Nv, etc.) but for time domain channel elements, Precoder Feedback (MU-MIMO/SC) which may use 802.11n/ac feedback framework (e.g., Nc, Nv, etc.) but for time domain channel elements, Channel Feedback (SU MIMO/OFDM), Channel Feedback (MU MIMO/OFDM), Precoder Feedback (SU-MIMO/OFDM) which may use 11n/11ac feedback, and/or Precoder Feedback (MU-MIMO/OFDM), which may use 11n/11ac feedback.

According to implementations disclosed herein, for HBF transmission, if channel feedback is used or if the channel is based on reciprocity, then the transmitter may use a channel to design a digital beamformer. Additionally, if an HBF transmission is based on precoder feedback, then the transmitter may use the precoder, unchanged.

FIG. 29 shows an example of a beamforming capability field 2900. Row 2910 shows the bit locations for the example beamforming capability field and row 2920 shows the number of bits per field. The example beamforming capability field 2900 includes Request BRP SC blocks (5 bits) 2931, a MU-MIMO Supported field (1 bit) 2932, a SU-MIMO Supported field (1 bit) 2933, a Grant Required field (1 bit) 2934, a NoRSS Supported field (1 bit) 2935, a HBF Supported field (1 bit) 2936, a SU MIMO HBF Supported field (1 bit) 2937, a MU-MIMO HBF Supported field (1 bit) 2938, and a reserved field (4 bits) 2939. The HBF Supported field may be set to an affirmative value, such as 1, to indicate that the STA supports the HBF protocol and may be set to a non-affirmative value, such as 0, to indicate that the STA does not support the HBF protocol. The SU-MIMO HBF Supported field may be set to an affirmative value, such as 1, to indicate that the STA supports SU-MIMO and the HBF protocol and may be set to a non-affirmative value, such as 0, to indicate that the STA does not support the HBF protocol. The MU MIMO HBF Supported field may be set to an affirmative value, such as 1, to indicate that the STA supports MU-MIMO and the HBF protocol and may be set to a non-affirmative value, such as 0, to indicate that the STA does not support the HBF protocol.

Table 5 shows an example of the control trailer in HBF.

TABLE 5

Control Trailer in HBF

| Field | Number of bits | Start bit | Description |
|---|---|---|---|
| Channel Aggregation | 1 | 0 | |
| BW | 8 | 1 | |
| Primary Channel Number | 3 | 9 | |
| SISO/MIMO | 1 | 12 | Set to a non-affirmative value, such as 0, to indicate that the following transmission from this STA is performed in SISO. Set to an affirmative value, such as 1, to indicate that the following transmission from this STA is performed in MIMO. |
| SU/MU MIMO | 1 | 13 | Set to a non-affirmative value, such as 0, to indicate SU-MIMO, and set to an affirmative value, such as 1, to indicate MU-MIMO. Reserved when SISO/MIMO is set to a non-affirmative value, such as 0. |
| Number of SS | 3 | 14 | The value of this field plus one may indicate the number of SSs transmitted to the EDMG STA that is the recipient of the control trailer. Reserved if SISO/MIMO is set to a non-affirmative value, such as 0. |
| TX Sector ID for SS1 | 6 | 17 | This field may indicate the sector that the transmitter of this control trailer uses for SS1. Reserved if SISO/MIMO is set to a non-affirmative value, such as 0. |
| TX DMG antenna ID for SS1 | 2 | 23 | This field may indicate the DMG antenna that the transmitter of this control trailer uses for SS1. Reserved if SISO/MIMO is set to a non-affirmative value, such as 0. |
| RX DMG antenna ID for SS1 | 2 | 25 | This field may indicate the DMG antenna that the recipient of this control trailer uses for SS1. Reserved if SISO/MIMO is set to a non-affirmative value, such as 0. |
| TX Sector ID for SS2 | 6 | 27 | This field may indicate the sector that the transmitter of this control trailer uses for SS2. Reserved if SISO/MIMO is set to a non-affirmative value, such as 0. |
| TX DMG antenna ID for SS2 | 2 | 33 | This field may indicate the DMG antenna that the transmitter of this control trailer uses for SS2. Reserved if SISO/MIMO is set to a non-affirmative value, such as 0. |
| RX DMG antenna ID for SS2 | 2 | 35 | This field may indicate the DMG antenna that the recipient of this control trailer uses for SS2. Reserved if SISO/MIMO is set to a non-affirmative value, such as 0. |
| TX Sector ID for SS3 | 6 | 37 | This field indicates the sector that the transmitter of this control trailer uses for SS3. Reserved if SISO/MIMO is set to a non-affirmative value, such as 0. |
| TX DMG antenna ID for SS3 | 2 | 43 | This field may indicate the DMG antenna that the transmitter of this control trailer uses for SS3. Reserved if SISO/MIMO is set to a non-affirmative value, such as 0. |
| RX DMG antenna ID for SS3 | 2 | 45 | This field may indicate the DMG antenna that the recipient of this control trailer uses for SS3. Reserved if SISO/MIMO is set to a non-affirmative value, such as 0. |
| TX Sector ID for SS4 | 6 | 47 | This field may indicate the sector that the transmitter of this control trailer uses for SS4. Reserved if SISO/MIMO is set to a non-affirmative value, such as 0. |
| TX DMG antenna ID for SS4 | 2 | 53 | This field may indicate the DMG antenna that the transmitter of this control trailer uses for SS4. Reserved if SISO/MIMO is set to a non-affirmative value, such as 0. |
| RX DMG antenna ID for SS4 | 2 | 55 | This field may indicate the DMG antenna that the recipient of this control trailer uses for SS4. Reserved if SISO/MIMO is set to a non-affirmative value, such as 0. |
| TX Sector ID for SS5 | 6 | 57 | This field may indicate the sector that the transmitter of this control trailer uses for SS5. Reserved if SISO/MIMO is set to a non-affirmative value, such as 0. |

TABLE 5-continued

Control Trailer in HBF

| Field | Number of bits | Start bit | Description |
|---|---|---|---|
| TX DMG antenna ID for SS5 | 2 | 63 | This field may indicate the DMG antenna that the transmitter of this control trailer uses for SS5. Reserved if SISO/MIMO is set to a non-affirmative value, such as 0. |
| RX DMG antenna ID for SS5 | 2 | 65 | This field may indicate the DMG antenna that the recipient of this control trailer uses for SS5. Reserved if SISO/MIMO is set to a non-affirmative value, such as 0. |
| TX Sector ID for SS6 | 6 | 67 | This field may indicate the sector that the recipient of this control trailer uses for SS6. Reserved if SISO/MIMO is set to a non-affirmative value, such as 0. |
| TX DMG antenna ID for SS6 | 2 | 73 | This field may indicate the DMG antenna that the transmitter of this control trailer uses for SS6. Reserved if SISO/MIMO is set to a non-affirmative value, such as 0. |
| RX DMG antenna ID for SS6 | 2 | 75 | This field may indicate the DMG antenna that the recipient of this control trailer uses for SS6. Reserved if SISO/MIMO is set to a non-affirmative value, such as 0. |
| TX Sector ID for SS7 | 6 | 77 | This field may indicate the sector that the transmitter of this control trailer uses for SS7. Reserved if SISO/MIMO is set to a non-affirmative value, such as 0. |
| TX DMG antenna ID for SS7 | 2 | 83 | This field may indicate the DMG antenna that the transmitter of this control trailer uses for SS7. Reserved if SISO/MIMO is set to a non-affirmative value, such as 0. |
| RX DMG antenna ID for SS7 | 2 | 85 | This field may indicate the DMG antenna that the recipient of this control trailer uses for SS7. Reserved if SISO/MIMO is set to a non-affirmative value, such as 0. |
| TX Sector ID for SS8 | 6 | 87 | This field may indicate the sector that the recipient of this control trailer uses for SS8. Reserved if SISO/MIMO is set to a non-affirmative value, such as 0. |
| TX DMG antenna ID for SS8 | 2 | 93 | This field indicates the DMG antenna that the transmitter of this control trailer uses for SS8. Reserved if SISO/MIMO is set to a non-affirmative value, such as 0. |
| RX DMG antenna ID for SS8 | 2 | 95 | This field indicates the DMG antenna that the recipient of this control trailer uses for SS8. Reserved if SISO/MIMO is set to a non-affirmative value, such as 0. |
| HBF protocol announcement | 1 | 96 | Set to a non-affirmative value, such as 0, to indicate that this control trailer is not a HBF announcement. Set to an affirmative value, such as 1, to indicate that this control trailer is a HBF protocol announcement. |
| HBF protocol type | 1 | 97 | The value of this field may indicate the type of HBF protocol requested. Set to a non-affirmative value, such as 0, to indicate a Forward HBF Protocol. Set to an affirmative value, such as 1, to indicate a Reverse HBF announcement. Reserved if HBF protocol is set to a non-affirmative value, such as 0. |
| HBF protocol Sounding Type | 2 | 98 | The value of this field may indicate the type of sounding to be used for the HBF protocol. 0: BRP sounding, 1. Beam tracking sounding 2. CEF based sounding. 3. Reserved. The Beam Tracking and CEF based sounding may use suitable frames such as the QOS Null. Reserved if HBF protocol is set to a non-affirmative value, such as 0. |
| HBF Information Domain | 1 | 100 | The value of this field may indicate whether the HBF Information is in the frequency domain (more suitable for OFDM PPDUs) or in the time domain (more suitable for SC PPDUs but can be post-processed for OFDM PPDUs) Set to a non-affirmative value, such as 0, to indicate Time Domain training, and set to an affirmative value, such as 1, for Frequency Domain training. Reserved if HBF protocol is set to a non-affirmative value, such as 0. |
| HBF Information Feedback Type | 1 | 101 | The value of this field may indicate the type of HBF information. Set to a non-affirmative value, such as 0, to indicated Channel Feedback, and set to an affirmative value, such as 1, to indicate Precoder Feedback. Reserved if HBF protocol is set to a non-affirmative value, such as 0. |
| HBF Feedback Compression | 1 | | The value of this field may indicate if the HBF information is compressed or uncompressed. Set to a non-affirmative value, such as 0, to indicate non-compressed HBF information, and set to an affirmative value, such as 1, to indicate Compressed HBF information. Reserved if HBF protocol is set to a non-affirmative value, such as 0. |
| HBF Feedback Tap Delay Present | 1 | 102 | If the feedback type field is set to a non-affirmative value, such as 0, and the HBF protocol field is set to an affirmative value, such as 1, and the HBF protocol type is set to a non-affirmative value, such as 0, this subfield is set to an affirmative value, such as 1, to indicate that the Tap Delay subfield is present as part of the HBF information. This subfield is set to a non-affirmative value, such as 0, in all |

TABLE 5-continued

Control Trailer in HBF

| Field | Number of bits | Start bit | Description |
|---|---|---|---|
| | | | other cases. Reserved if HBF protocol is set to a non-affirmative value, such as 0. |
| HBF Feedback Number of Taps Present | 2 | 103 | If the Tap Delay Present subfield is set to an affirmative value, such as 1, this subfield indicates the Number of taps in each channel measurement:<br>0x0 - 1 tap<br>0x1 - 4 × NCB + 1 taps<br>0x2 - 14 × NCB + 1 taps<br>0x3 - 62 × NCB + 1 taps<br>Where NCB is the integer number of contiguous 2.16 GHz channels over which the measurement was taken. Reserved if HBF protocol is set to a non-affirmative value, such as 0. |
| HBF Compressed Nc Index | 3 | 105 | If the HBF compression subfield is set to an affirmative value, such as 1, this subfield indicates the number of columns, Nc, in the compressed beamforming feedback matrix minus 1:<br>Set to a non-affirmative value, such as 0, for Nc = 1<br>Set to an affirmative value, such as 1, for Nc = 2<br>. . .<br>Set to 7 for Nc = 8<br>Reserved if HBF protocol is set to a non-affirmative value, such as 0. |
| HBF Compressed Nr Index | 3 | 108 | If the HBF compression subfield is set to an affirmative value, such as 1, this subfield indicates the number of rows, Nr, in the compressed beamforming feedback matrix minus 1:<br>Set to a non-affirmative value, such as 0, for Nr = 1<br>Set to an affirmative value, such as 1, for Nr = 2<br>. . .<br>Set to 7 for Nr = 8<br>Reserved if HBF protocol is set to a non-affirmative value, such as 0. |
| HBF Compressed Feedback Type | 1 | 111 | If the HBF compression subfield is set to an affirmative value, such as 1, this subfield indicates if the feedback is for SU-MIMO or MU-MIMO transmission. Set to a non-affirmative value, such as 0, to indicate SU-MIMO and set to an affirmative value, such as 1, to indicate MU-MIMO. Reserved if HBF protocol is set to a non-affirmative value, such as 0. |
| HBF Compressed CB Info | 1 | 112 | If the HBF compression subfield is set to an affirmative value, such as 1, this subfield indicates the size of codebook entries:<br>If Compressed Feedback Type field is SU:<br>Set to a non-affirmative value, such as 0, for 2 bits for $\psi$, 4 bits for $\phi$<br>Set to an affirmative value, such as 1, for 4 bits for $\psi$, 6 bits for $\phi$<br>If Compressed Feedback Type field is MU:<br>Set to a non-affirmative value, such as 0, for 5 bits for $\psi$, 7 bits for $\phi$<br>Set to an affirmative value, such as 1, for 7 bits for $\psi$, 9 bits for $\phi$<br>Reserved if HBF protocol is set to a non-affirmative value, such as 0. |
| HBF Compressed Channel Width | 2 | 113 | If the HBF compression subfield is set to an affirmative value, such as 1, this subfield indicates the width of the channel in which the measurement to create the compressed beamforming feedback matrix was made:<br>Set to a non-affirmative value, such as 0, for 2.16 GHz<br>Set to an affirmative value, such as 1, for 4.32 GHz or 2.16 + 2.16 GHz<br>Set to 2 for 6.48 GHz<br>Set to 3 for 8.64 GHz or 4.32 + 4.32 GHz<br>Reserved if HBF protocol is set to a non-affirmative value, such as 0. |
| HBF Feedback carrier grouping | 4 | 115 | Option 1: Update the granularity based on 512 subcarriers<br>Ng = 1, 2, 4, 8, 16, 32, 64, 128, 256, 512<br>Option 2: Bandwidth dependent Grouping |
| HBF Feedback Carrier Grouping Factor | 1 | 118 | Multiplies the carrier grouping by a factor in the case of flat channel.<br>1<br>4 => single tap |
| MU-MIMO Configuration ID | TBD | 119 | To indicate the selected STAs and their associated antenna configuration: MU-CT signaling, In this case bits 17 to 95 are reserved. |

TABLE 5-continued

Control Trailer in HBF

| Field | Number of bits | Start bit | Description |
|---|---|---|---|
| MU-MIMO No ACK | 1 | | May indicate that no Announcement ACK may be sent by the MU-MIMO responders. Set to a non-affirmative value, such as 0, if Grant ACK is required, Set to an affirmative value, such as 1, if Grant ACK is not required (may be optional for SU). |
| Reserved | xx | xx | Set to a non-affirmative value, such as 0, by the transmitter and ignored by the receiver. |
| CTCS | 16 | 127 | Contains the CRC-16 computed over the content of the control trailer. This field is computed. |

An EDMG HBF Control Field may be used to manage the exchange of HBF channel state or transmit beamforming feedback information and to start the HBF protocol, as shown in the example field of FIG. 30. Row 3010 may indicate the number of bits allocated to each subfield in row 3020. The subfields in row 3020 may use the definitions provided in the example shown in Table 6.

TABLE 6

Example HBF Control Field

| | | |
|---|---|---|
| HBF protocol announcement 3021 | 1 | Set to a non-affirmative value, such as 0, to indicate that this control trailer is not a HBF announcement. Set to an affirmative value, such as 1, to indicate that this control trailer is a HBF protocol announcement. |
| HBF protocol type 3022 | 1 | The value of this field may indicate the type of HBF protocol requested. Set to a non-affirmative value, such as 0, to indicate a Forward HBF Protocol. Set to an affirmative value, such as 1, to indicate a Reverse HBF announcement. Reserved if HBF protocol is set to a non-affirmative value, such as 0. |
| HBF protocol Sounding Type 3023 | 2 | The value of this field may indicate the type of sounding to be used for the HBF protocol. 0: BRP sounding, 1. Beam tracking sounding 2. CEF based sounding. 3. Reserved. The Beam Tracking and CEF based sounding may use suitable frames such as the QOS Null. Reserved if HBF protocol is set to a non-affirmative value, such as 0. |
| HBF Information Domain 3024 | 1 | The value of this field may indicate whether the HBF Information is in the frequency domain (more suitable for OFDM PPDUs) or in the time domain (more suitable for SC PPDUs but can be post-processed for OFDM PPDUs) Set to a non-affirmative value, such as 0, to indicate Time Domain sounding, and set to an affirmative value, such as 1, for Frequency Domain sounding. Reserved if HBF protocol is set to a non-affirmative value, such as 0. |
| HBF Information Feedback Type 3025 | 1 | The value of this field may indicate the type of HBF information. Set to a non-affirmative value, such as 0, to indicated Channel Feedback, and set to an affirmative value, such as 1, to indicate Precoder Feedback. Reserved if HBF protocol is set to a non-affirmative value, such as 0. |
| HBF Feedback Compression 3026 | 1 | The value of this field may indicate if the HBF information is compressed or uncompressed. Set to a non-affirmative value, such as 0, to indicate non-compressed HBF information, and set to an affirmative value, such as 1, to indicate Compressed HBF information. Reserved if HBF protocol is set to a non-affirmative value, such as 0. |
| HBF Feedback Tap Delay Present 3027 | 1 | If the feedback type field is set to a non-affirmative value, such as 0, and the HBF protocol field is set to an affirmative value, such as 1, and the HBF protocol type is set to a non-affirmative value, such as 0, this subfield is set to an affirmative value, such as 1, to indicate that the Tap Delay subfield is present as part of the HBF information. This subfield is sSet to a non-affirmative value, such as 0, in all other cases otherwise. Reserved if HBF protocol is set to a non-affirmative value, such as 0. |
| HBF Feedback Number of Taps Present 3028 | 2 | If the Tap Delay Present subfield is set to an affirmative value, such as 1, this subfield indicates the Number of taps in each channel measurement:<br>0x0 - 1 tap<br>0x1 - 5 4 × NCB + 1 taps<br>0x2 - 15 14 × NCB + 1 taps<br>0x3 - 63 62 × NCB + 1 taps<br>Where NCB is the integer number of contiguous 2.16 GHz channels over which the measurement was taken. Reserved if HBF protocol is set to a non-affirmative value, such as 0. |
| HBF Compressed Nc Index 3029 | 3 | If the HBF compression subfield is set to an affirmative value, such as 1, this subfield may indicate the number of columns, Nc, in the compressed beamforming feedback matrix minus 1:<br>Set to a non-affirmative value, such as 0, for Nc = 1<br>Set to an affirmative value, such as 1, for Nc = 2 |

TABLE 6-continued

Example HBF Control Field

| | | |
|---|---|---|
| HBF Compressed Nr Index 3030 | 3 | Set to 7 for Nc = 8<br>Reserved if HBF protocol is set to a non-affirmative value, such as 0.<br>If the HBF compression subfield is set to an affirmative value, such as 1, this subfield may indicate the number of rows, Nr, in the compressed beamforming feedback matrix minus 1:<br>Set to a non-affirmative value, such as 0, for Nr = 1<br>Set to an affirmative value, such as 1, for Nr = 2<br>Set to 7 for Nr = 8<br>Reserved if HBF protocol is set to a non-affirmative value, such as 0. |
| HBF Compressed Feedback Type 3031 | 1 | If the HBF compression subfield is set to an affirmative value, such as 1, this subfield may indicate if the feedback is for SU-MIMO or MU-MIMO transmission. Set to a non-affirmative value, such as 0, to indicate SU-MIMO and set to an affirmative value, such as 1, to indicate MU-MIMO.<br>Reserved if HBF protocol is set to a non-affirmative value, such as 0. |
| HBF Compressed CB Info 3032 | 1 | If the HBF compression subfield is set to an affirmative value, such as 1, this subfield may indicate the size of codebook entries:<br>If Compressed Feedback Type field is SU:<br>Set to a non-affirmative value, such as 0, for 2 bits for ψ, 4 bits for □<br>Set to an affirmative value, such as 1, for 4 bits for ψ, 6 bits for □<br>If Compressed Feedback Type field is MU:<br>Set to a non-affirmative value, such as 0, for 5 bits for ψ, 7 bits for □<br>Set to an affirmative value, such as 1, for 7 bits for ψ, 9 bits for □<br>Reserved if HBF protocol is set to a non-affirmative value, such as 0. |
| HBF Compressed Channel Width 3033 | 2 | If the HBF compression subfield is set to an affirmative value, such as 1, this subfield may indicate the width of the channel in which the measurement to create the compressed beamforming feedback matrix was made:<br>Set to a non-affirmative value, such as 0, for 2.16 GHz<br>Set to an affirmative value, such as 1, for 4.32 GHz or 2.16 + 2.16 GHz<br>Set to 2 for 6.48 GHz<br>Set to 3 for 8.64 GHz or 4.32 + 4.32 GHz<br>Reserved if HBF protocol is set to a non-affirmative value, such as 0. |
| HBF Feedback carrier grouping 3034 | 4 | Option 1: Update the granularity based on 512 subcarriers<br>Ng = 1, 2, 4, 8, 16, 32, 64, 128, 256, 512<br>Option 2: Bandwidth dependent Grouping |
| MU-MIMO Configuration ID 3035 | TBD | To indicate the selected STAs and their associated antenna configuration: MU-CT signaling, In this case bits 17 to 95 are reserved. |
| MU-MIMO No ACK 3036 | 1 | Indicates that no Announcement ACK shall be sent by the MU-MIMO responders. Set to a non-affirmative value, such as 0, if Grant ACK is required, Set to an affirmative value, such as 1, if Grant Ack is not required (may be optional for SU). |

Table 7 shows an example of compressed beamforming frame information.

TABLE 7

Example compressed beamforming frame

| Order | Information |
|---|---|
| 1 | Category |
| 2 | EDMG Action |
| 3 | EDMG HBF Control |
| 4 | Compressed Beamforming Report |

FIG. 31 shows an example of an EDMG HBF Announcement Frame 3100, where the STA info may be in the EDMG HBF Control Field or a subset of the fields in the Control Field. As shown, the EDMG HBF Announcement Frame 3100 may include a Frame Control field 3101, a Duration field 3102, a RA field 3103, a TA field 3104, a Sounding Dialog Token 3105, and an STA information field 3106.

FIG. 32 shows an example of an EDMG HBF Announcement ACK frame 3200, where both the STA ACK information 3206 and the STA information request 3207 fields may be the EDMG HBF Control field or a subset of the fields in the Control Field. As shown, the EDMG HBF Announcement ACK Frame 3200 may include a Frame Control field 3201, a Duration field 3202, an RA field 3203, a TA field 3204, a Sounding Dialog Token 3205, an STA ACK information field 3206, and an STA information request field 3207.

FIGS. 33A and 33B show an example of an MU-Grant Frame 3300. As show, the MU-Grant Frame 3300 may include a Frame Control field 3301, a Duration field 3302, an RA field 3303, a TA field 3304, a Dynamic Allocation Info field 3305, a beamforming sounding field 3307, an isInitiatorTXSS field 3307, an isREspnderTXSS field 3309, an RXSS Length field 3310, a RXSSTxRate field 3311, a MU-MIMO Config_Idi field 3312, and a Reserved field 3313. In the MU-grant frame 3300, a MU-MIMO configuration ID 3312 may be added, where there is a number to indicate the selected STAs and their associated antenna configurations. The configurations may have been communicated to STAs previously through a MIMO selection frame with the MIMO selection frame communicating N, which is a number of MU-MIMO Transmission Configurations. An example of these configurations may be MU-MIMO Config_ID 1: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), and so on. Continuing the example, a second example configuration may be MU-MIMO Config_ID 2: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), and so on. Further continuing the example, the Nth example configuration may be MU-MIMO Config._N: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), and so on. The BFi bit, where i is a number, may indicate TX Any_Sec_Idi (non-beamed) or SS_IDi (beamformed). The RA may be set to MU-MIMO Group ID and the TA may be set to the MU-MIMO BSSID.

The EDMG Compressed Beamforming Report field may be used by the EDMG Compressed Beamforming feedback to carry explicit feedback information in the form of angles representing compressed beamforming feedback matrices V for use by a transmit beamformer to determine steering matrices Q.

The size of the EDMG Compressed Beamforming Report field may depend on the values in the EDMG MIMO Control field or the EDMG Control Trailer of parameter CT_TYPE set to GRANT_RTS_CTS2Self. The EDMG Compressed Beamforming Report field contains EDMG Compressed Beamforming Report information. EDMG Compressed Beamforming Report information may always be included in the VHT Compressed Beamforming feedback.

The EDMG Compressed Beamforming Report information may contain the channel matrix elements indexed, first, by matrix angles in the order shown in Table 7 and, second, by data subcarrier index from lowest frequency to highest frequency.

According to an implementation, feedback may be needed for HBF. Feedback may be needed for explicit HBF protocols only and may be send back HBF information needed by a transmitter for HBF transmission. The hybrid beamforming information may differ for SC versus OFDM PPDUs.

Figure 34:
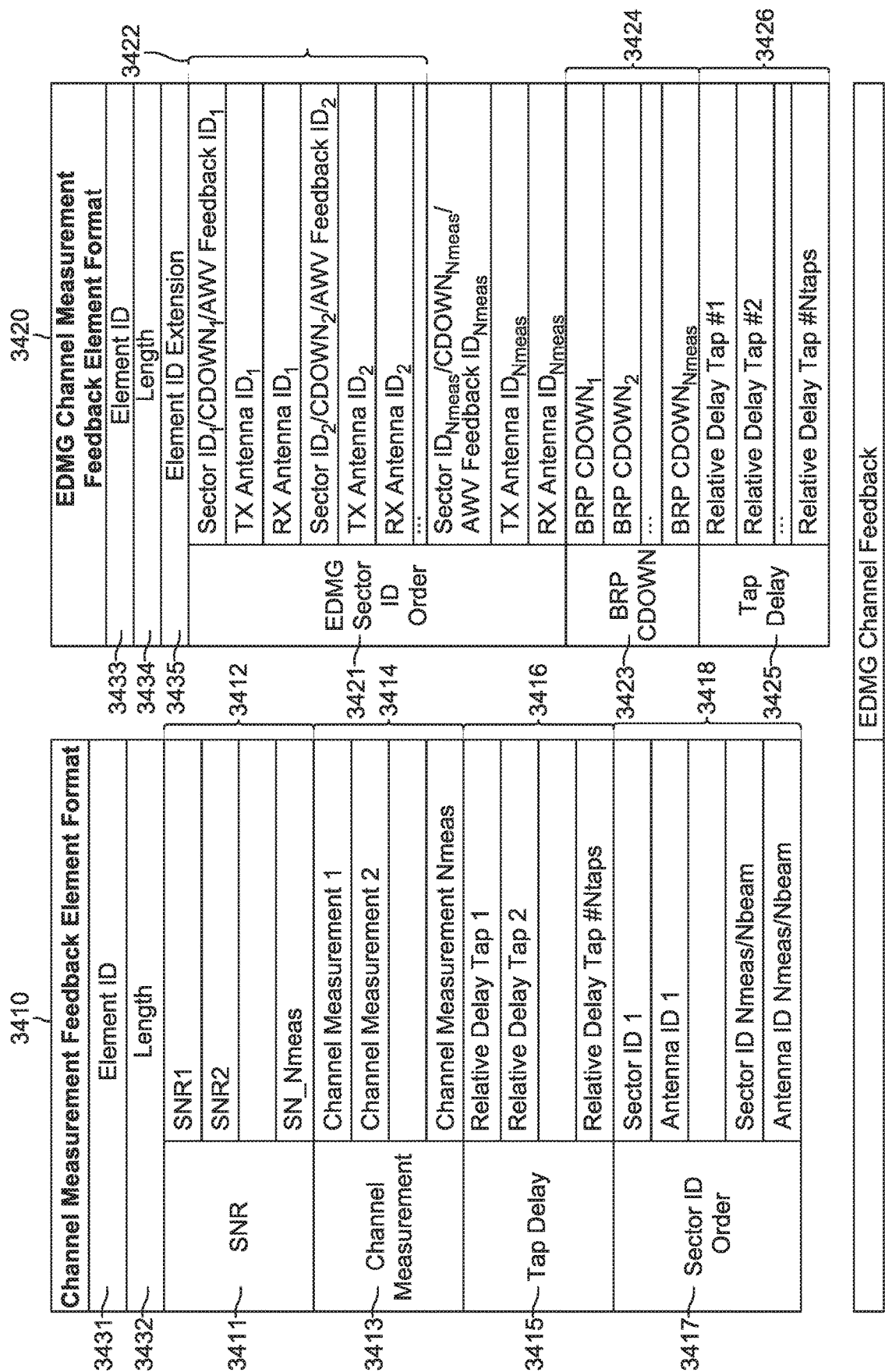
FIG. 34 is a diagram of an example EDMG Channel Feedback for PPDU Mode.

For SC PPDUs, there may be only time domain information with respect to the precoder and/or channel. FIG. 34 shows an example of EDMG channel feedback for SC PPDU mode. For channel HBF information in the SC-PDU mode, it may re-use existing MIMO channel feedback in, for example, 802.11ay, as shown in FIG. 34. As shown, the Channel Measurement Feedback element format 3410 may include an element ID 3431, length 3432, an SNR field 3411 with corresponding SNR information 3412, a Channel Measurement field 3413 with corresponding channel measurement information 3414, a Tap Delay field 3415 with corresponding tap delay information 3416, and a Sector ID order field 3417 with corresponding Sector and antenna ID information 3418. As also shown in FIG. 34, a EDMG Channel Measurement Feedback element format 3420 may include an element ID 3433, a Length 3434, an element ID extension 3435, a EDMG Sector ID order field 3421 with corresponding EDMG Sector ID, TX, and RX Antenna ID information 3422, BRP CDOWN field 3423 with corresponding BRP CDOWN information 3424, and a Tap Delay field 3425 with corresponding relative delay tap information 3426.

Figure 36:
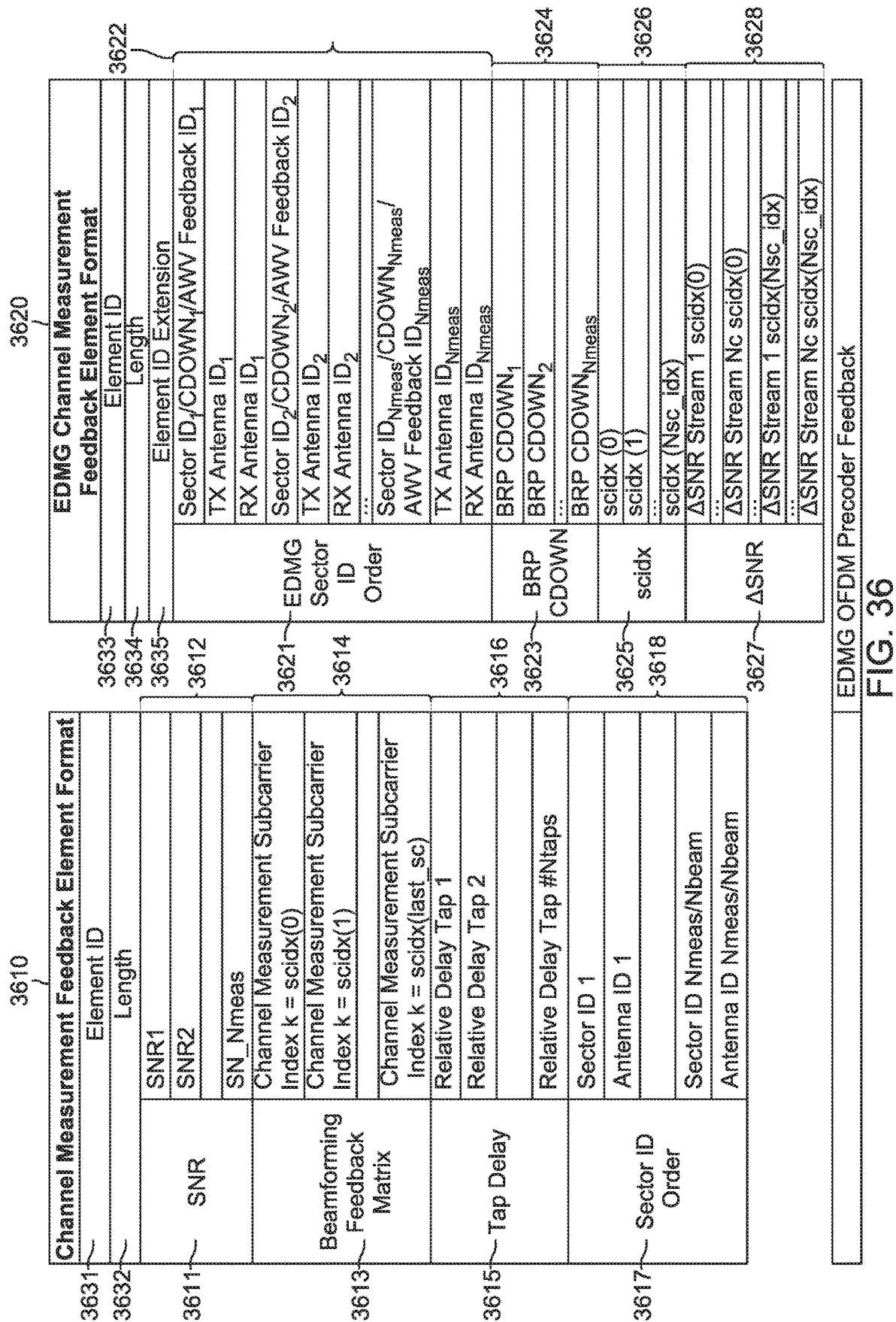
FIG. 36 is a diagram of an example EDMG HBF Feedback for OFDM PPDU Mode.

FIG. 35 shows an example of EDMG precoder feedback for SC PPDU mode. For precoder HBF information in the SC PPDU mode, it may re-use the existing MIMO channel feedback framework with elements in the channel measurements field set to precoder elements, as shown in FIG. 36. As shown, the Channel Measurement Feedback element format 3510 may include an element ID 3531, length 3532, an SNR field 3511 with corresponding SNR information 3512, a Beamforming Feedback Matrix field 3513 with corresponding channel measurement information 3514, a Tap Delay field 3515 with corresponding tap delay information 3516, and a Sector ID order field 3517 with corresponding Sector and antenna ID information 3518. As also shown in FIG. 35, an EDMG Channel Measurement Feedback element format 3520 may include an element ID 3533, a Length 3534, an element ID extension 3535, a EDMG Sector ID order field 3521 with corresponding EDMG Sector ID, TX, and RX Antenna ID information 3522, BRP CDOWN field 3523 with corresponding BRP CDOWN information 3524, and a Tap Delay field 3525 with corresponding relative delay tap information 3526.

For OFDM PPDUs, frequency domain precoder information may be available. FIG. 36 shows an example of EDMG HBF feedback for OFDM PPDU mode. As shown, the Channel Measurement Feedback element format 3610 may include an element ID 3631, length 3632, an SNR field 3611 with corresponding SNR information 3612, a Beamforming Feedback Matrix field 3613 with corresponding channel measurement information 3614, a Tap Delay field 3615 with corresponding tap delay information 3616, and a Sector ID order field 3617 with corresponding Sector and antenna ID information 3618. As also shown in FIG. 36, an EDMG Channel Measurement Feedback element format 3620 may include an element ID 3633, a Length 3634, an element ID extension 3635, a EDMG Sector ID order field 3621 with corresponding EDMG Sector ID, TX, and RX Antenna ID information 3622, BRP CDOWN field 3623 with corresponding BRP CDOWN information 3624, a scidx field 3625 with corresponding scidx information 3626, and a change in SNR ($\Delta$SNR) field 3627 with corresponding $\Delta$SNR information 3628. Precoder feedback in the OFDM PPDU mode may re-use an existing MIMO channel feedback framework with elements in the channel measurement field set to compressed feedback. For an MU-transmission, additional fields may be added to send feedback for the MU exclusive beamforming report field and/or the $\Delta$SNR, as shown in FIG. 36.

FIG. 37 shows an example of HBF feedback in a frame for SC and OFDM PPDU modes. The HBF information for SC and OFDM may use a new frame that includes fields for the time domain channel and precoder based SC feedback and also frequency domain, compressed, precoder-based OFDM feedback. As shown in FIG. 37, the Channel Measurement Feedback element format 3710 may include an element ID 3720, length 3721, an SNR field 3711 with corresponding SNR information 3712, a Precoder/Channel/Beamforming Feedback Matrix field 3713 with corresponding channel measurement information 3714, a Tap Delay/scidx field 3715 with corresponding scodx information 3716, and a $\Delta$SNR field 3717 with corresponding Sector and antenna ID information 3718.

According to an implementation, one or more frames may be used for the HBF protocol and may include one or more of a Control Trailer (CT) for announcement, BRP, and/or feedback, an EDMG BRP Request Element for BRP parameters, a DMG Beam Refinement Element for BRP parameters, a MIMO Feedback Control Element for SC and OFDM feedback, and/or HBF Feedback Control Element for SC and OFDM feedback. Details of the parameters signaled and example packets they may signal are shown in Table 8.

TABLE 8

| | | | |
|---|---|---|---|
| Setup/Announcement | | | |
| HBF protocol announcement | 1 | CT | Set to a non-affirmative value, such as 0, to indicate that this control trailer is not a HBF announcement. Set to an affirmative value, such as 1, to indicate that this control trailer is a HBF protocol announcement. |
| HBF protocol type | 1 | CT | The value of this field indicates the type of HBF protocol requested. Set to a non-affirmative value, such as 0, to indicate an explicit HBF Protocol. Set to an affirmative value, such as 1, to indicate an implicit HBF announcement. Reserved if HBF protocol is set to a non-affirmative value, such as 0. |
| HBF protocol Sounding Type | 1 | CT | The value of this field indicates the type of sounding to be used for the HBF protocol. 0: BRP sounding, 1. Beam tracking sounding. Reserved if HBF protocol is set to a non-affirmative value, such as 0. |
| Sounding | | | |
| Digital Beamforming Request | 1 | EDMG BRP Request Element | BRP request for performing digital beamforming. |
| HBF Information Feedback Type (Request) | 1 | DMG Beam Refinement element: request | The value of this field indicates the type of HBF information. Set to a non-affirmative value, such as 0, to indicated Channel Feedback, and set to an affirmative value, such as 1, to indicate Precoder Feedback. Reserved if HBF protocol is set to a non-affirmative value, such as 0. Note: if OFDM PPDU, then always set to an affirmative value, such as 1. |
| HBF Information Feedback Type (Response) | 1 | MIMO Feedback Control element: feedback | The value of this field indicates the type of HBF information. Set to a non-affirmative value, such as 0, to indicated Channel Feedback, and set to an affirmative value, such as 1, to indicate Precoder Feedback. Reserved if HBF protocol is set to a non-affirmative value, such as 0. Note: if OFDM PPDU, then always set to an affirmative value, such as 1. |
| HBF Information Domain | 1 | May default based on PPDU Mode. If SC, then time domain, if OFDM then frequency domain. | The value of this field indicates whether the HBF Information is in the frequency domain (more suitable for OFDM PPDUs) or in the time domain (more suitable for SC PPDUs but can be post-processed for OFDM PPDUs) |
| HBF Feedback Compression | 1 | May default based on PPDU Mode. If SC then uncompressed, if OFDM then compressed. | The value of this field indicates if the HBF information is compressed or uncompressed. Set to a non-affirmative value, such as 0, to indicate non-compressed HBF information, and set to an affirmative value, such as 1, to indicate Compressed HBF information. Reserved if HBF protocol is set to a non-affirmative value, such as 0. |
| Feedback (SC) | | | |
| HBF Feedback: Number of Taps Requested {can be per STA or for all STAs} | 2 | CT: Option 1: as parameter in CT sent to each STA independently, we may have a single CT for each transmission that may change depending on STA. Option 2: as multiple parameters in a single CT DMG Beam Refinement element: FBCK-REQ field. For all STAs. Or for specific STA sent multiple times. MIMO Setup Control element format: MIMO-FBCK-REQ (can use existing frame for all STAs or add extra parameter for per STA). Option 1: use the parameters from the MIMO BF setup frame sent during MIMO phase Add MIMO-FBCK-REQ field to CT or new frame. | If the Tap Delay Present subfield is set to an affirmative value, such as 1, this subfield indicates the Number of taps in each channel measurement: 0x0 - 1 tap 0x1 - 4 × NCB + 1 taps 0x2 - 14 × NCB + 1 taps 0x3 - 62 × NCB + 1 taps Where NCB is the integer number of contiguous 2.16 GHz channels over which the measurement was taken. |

TABLE 8-continued

| | | | |
|---|---|---|---|
| HBF Feedback: Tap Delay Present | 1 | MIMO Feedback Control element (MIMO FBCK-TYPE field) | If the Tap Delay Present subfield is set to an affirmative value, such as 1, the Tap Delay subfield is present as part of the MIMO BF feedback. Otherwise, set to a non-affirmative value, such as 0. |
| HBF Feedback: Number of Taps Present | 2 | MIMO Feedback Control element (MIMO FBCK-TYPE field) | If the Tap Delay Present subfield is set to an affirmative value, such as 1, this subfield indicates the Number of taps in each channel measurement:<br>0x0 - 1 tap<br>0x1 - 4 × NCB + 1 taps<br>0x2 - 14 × NCB + 1 taps<br>0x3 - 62 × NCB + 1 taps<br>Where NCB is the integer number of contiguous 2.16 GHz channels over which the measurement was taken. Reserved if HBF protocol is set to a non-affirmative value, such as 0. |
| | | Feedback (OFDM) | |
| HBF Compressed Nc Index request {per be per STA or for all STAs} | 3 | CT:<br>Option 1: as parameter in CT sent to each STA independently, we may have a single CT for each transmission that may change depending on STA.<br>Option 2: as multiple parameters in a single CT DMG Beam Refinement element: FBCK-REQ field. Note that update may not be possible.<br>For all STAs. Or for specific STA sent multiple times.<br>MIMO Setup Control element format: MIMO-FBCK-REQ {add Nc to MIMO FBCK-REQ}<br>Option 1: use the parameters from the MIMO BF setup frame sent during MIMO phase EDMG BRP Request Element (Per STA): not enough space (4 bits) | If the HBF compression subfield is set to an affirmative value, such as 1, this subfield indicates the number of columns, Nc, in the compressed beamforming feedback matrix minus 1:<br>Set to a non-affirmative value, such as 0, for Nc = 1<br>Set to an affirmative value, such as 1, for Nc = 2<br>. . .<br>Set to 7 for Nc = 8<br>Reserved if HBF protocol is set to a non-affirmative value, such as 0. |
| HBF SU/MU Feedback Quantization request {per be per STA or for all STAs} | 1 | Same as above | Indicates the Feedback quantization type<br>0 indicates SU<br>1 indicates MU |
| HBF Compressed Nc Index response | 3 | MIMO Feedback Control Element, HBF Feedback Control Element: control field; | If the HBF compression subfield is set to an affirmative value, such as 1, this subfield indicates the number of columns, Nc, in the compressed beamforming feedback matrix minus 1:<br>Set to a non-affirmative value, such as 0, for Nc = 1<br>Set to an affirmative value, such as 1, for Nc = 2<br>. . .<br>Set to 7 for Nc = 8<br>Reserved if HBF protocol is set to a non-affirmative value, such as 0. |
| HBF Compressed Nr Index | 3 | MIMO Feedback Control Element, HBF Feedback Control Element: control field | If the HBF compression subfield is set to an affirmative value, such as 1, this subfield indicates the number of rows, Nr, in the compressed beamforming feedback matrix minus 1:<br>Set to a non-affirmative value, such as 0, for Nr = 1<br>Set to an affirmative value, such as 1, for Nr = 2<br>. . .<br>Set to 7 for Nr = 8<br>Reserved if HBF protocol is set to a non-affirmative value, such as 0. |
| HBF Compressed Feedback Type | 1 | MIMO Feedback Control Element, HBF Feedback Control Element: control field | If the HBF compression subfield is set to an affirmative value, such as 1, this subfield indicates if the feedback is for SU-MIMO or MU-MIMO transmission. Set to a non-affirmative value, such as 0, to indicate SU-MIMO and set to an affirmative value, such as 1, to indicate MU-MIMO. |

TABLE 8-continued

| | | | |
|---|---|---|---|
| HBF Compressed CB Information | 1, TBD | MIMO Feedback Control Element, HBF Feedback Control Element: control field | Reserved if HBF protocol is set to a non-affirmative value, such as 0. If the HBF compression subfield is set to an affirmative value, such as 1, this subfield indicates the size of codebook entries: If Compressed Feedback Type field is SU Feedback Quantization response: Set to a non-affirmative value, such as 0, for 2 bits for $\psi$, 4 bits for $\phi$ Set to an affirmative value, such as 1, for 4 bits for $\psi$, 6 bits for $\phi$ If Compressed Feedback Type field is MU Feedback Quantization response: Set to a non-affirmative value, such as 0, for 5 bits for $\psi$, 7 bits for $\phi$ Set to an affirmative value, such as 1, for 7 bits for $\psi$, 9 bits for $\phi$ Reserved if HBF protocol is set to a non-affirmative value, such as 0. |
| SU/MU Feedback Quantization response | 1 | MIMO Feedback Control Element, HBF Feedback Control Element: control field | Indicates the Feedback quantization type 0 indicates SU 1 indicates MU |
| HBF Compressed Channel Width | 2 | MIMO Feedback Control Element, HBF Feedback Control Element: control field | If the HBF compression subfield is set to an affirmative value, such as 1, this subfield indicates the width of the channel in which the measurement to create the compressed beamforming feedback matrix was made: Set to a non-affirmative value, such as 0, for 2.16 GHz Set to an affirmative value, such as 1, for 4.32 GHz or 2.16 + 2.16 GHz Set to 2 for 6.48 GHz Set to 3 for 8.64 GHz or 4.32 + 4.32 GHz Reserved if HBF protocol is set to a non-affirmative value, such as 0. |
| HBF Feedback carrier grouping | 4 | MIMO Feedback Control Element, HBF Feedback Control Element: control field | Option 1: Update the granularity based on 512 subcarriers vs 64 subcarriers (and channel model). Ng = 1, 2, 4, 8, 16, 32, 64, 128, 256, 512 Option 2: Bandwidth dependent Grouping |
| MU-MIMO No ACK | 1 | CT, MIMO Feedback Control Element, HBF Feedback Control Element: control field | Indicates that no Announcement ACK shall be sent by the MU-MIMO responders. Set to a non-affirmative value, such as 0, if Grant ACK is required, Set to an affirmative value, such as 1, if Grant Ack is not required (may be optional for SU). |

Although embodiments and examples described herein discuss placing information, types information, or fields in specific frames/fields, however, it is understood that the information, types of information, or fields may be placed within any frame/field to enable any of the desired functionality/features as discussed herein. The disclosed fields may be combined with existing or new packets. In other words, the placement of the fields disclosed herein is not limited to the examples and embodiments discussed, but may be implemented in any packet or field.

Although embodiments and examples described herein consider 802.11 specific protocols, it is understood that the features described herein are not restricted to these scenarios and are applicable to other wireless systems as well. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA) in a wireless local area network (WLAN), the method comprising:
    transmitting an enhanced directional multi-gigabit (EDMG) capabilities element indicating a hybrid beamforming (HBF) capability of the STA and at least one of a single user multiple input multiple output (SU-MIMO) capability of the STA or a multiple user multiple input multiple output (MU-MIMO) capability of the STA;
    receiving an announcement frame comprising an EDMG HBF control trailer to signal an antenna configuration to be used based on the HBF capability of the STA and one or more of the SU-MIMO capability of the STA or the MU-MIMO capability of the STA;
    receiving, based on the antenna configuration, at least one of a channel estimation field (CEF) or a training (TRN) field to enable measurement of a baseband channel by a receiver, wherein at least one of the CEF or TRN field is based on the antenna configuration;

transmitting HBF information based on the baseband channel; and receiving an HBF signal based on the HBF information and the antenna configuration.

2. The method of claim 1, further comprising:
configuring a directional multi-gigabit (DMG) antenna based on the antenna configuration.

3. The method of claim 1, further comprising:
transmitting an acknowledgement (ACK) after receiving the announcement frame, wherein the ACK is one of a grant ACK or a DMG clear to send (CTS) frame.

4. The method of claim 1, wherein the EDMG capabilities element indicates a capability if a field within the EDMG capabilities element is set to an affirmative value.

5. The method of claim 1, wherein the announcement frame is one of a grant frame or a request to send (RTS) frame on a condition that the STA is SU-MIMO capable.

6. The method of claim 1, wherein the announcement frame is one of an RTS frame or a DMG CTS-to-self frame on a condition that the STA is MU-MIMO capable.

7. The method of claim 2, wherein configuring the DMG antenna based on the antenna configuration comprises configuring the DMG antenna to a desired transmit antenna sector and a desired receive antenna sector.

8. The method of claim 1, wherein HBF information based on the baseband channel is waveform specific and received in one of a time domain or a frequency domain and comprises at least one of a channel estimate or a precoder.

9. A wireless station (STA) comprising:
a processor;
at least one transmitter; and
at least one receiver;
the processor and the at least one transmitter configured to:
transmit an enhanced directional multi-gigabit (EDMG) capabilities element indicating a hybrid beamforming (HBF) capability of the STA and at least one of a single user multiple input multiple output (SU-MIMO) capability of the STA or a multiple user multiple input multiple output (MU-MIMO) capability of the STA;

the processor and the at least one receiver configured to:
receive an announcement frame comprising an EDMG HBF control trailer to signal an antenna configuration to be used based on the HBF capability of the STA and one or more of the SU-MIMO capability of the STA or the MU-MIMO capability of the STA; and receive, based on the antenna configuration, at least one of a channel estimation field (CEF) or a training (TRN) field to enable measurement of a baseband channel, wherein at least one of the CEF or TRN field is based on the antenna configuration;

the processor and the at least one transmitter further configured to transmit HBF information based on the baseband channel; and the processor and the at least one receiver further configured to receive an HBF signal based on the HBF information and the antenna configuration.

10. The STA of claim 9, further comprising:
a directional multi-gigabit (DMG) antenna configured based on the antenna configuration.

11. The STA of claim 9, wherein the at least one transmitter is further configured to:
transmit an acknowledgement (ACK) after the at least one receiver receives the announcement frame; and
wherein the ACK is one of a grant ACK or a DMG clear to send (CTS) frame.

12. The STA of claim 9, wherein the EDMG capabilities element indicates a capability if a field within the EDMG capabilities element is set to an affirmative value.

13. The STA of claim 9, wherein the announcement frame is one of a grant frame or a request to send (RTS) frame on a condition that the STA is SU-MIMO capable.

14. The STA of claim 9, wherein the announcement frame is one of an RTS frame or a DMG CTS-to-self frame on a condition that the STA is MU-MIMO capable.

15. The STA of claim 10, further comprising configuring the DMG antenna to a desired transmit antenna sector and a desired receive antenna sector.

16. The STA of claim 9, wherein the HBF information based on the baseband channel is waveform specific and received in one of a time domain or a frequency domain and comprises at least one of a channel estimate or a precoder.

* * * * *